US012389282B2

(12) United States Patent
Purkayastha et al.

(10) Patent No.: US 12,389,282 B2
(45) Date of Patent: Aug. 12, 2025

(54) TECHNIQUES FOR CONNECTED STATE MOBILITY IN A SERVICE-BASED WIRELESS SYSTEM

(71) Applicant: QUALCOMM Incorporated, San Diego, CA (US)

(72) Inventors: Punyaslok Purkayastha, San Diego, CA (US); Ozcan Ozturk, San Diego, CA (US); Gavin Bernard Horn, La Jolla, CA (US); Miguel Griot, La Jolla, CA (US); Aziz Gholmieh, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 395 days.

(21) Appl. No.: 17/948,044

(22) Filed: Sep. 19, 2022

(65) Prior Publication Data
US 2024/0098577 A1 Mar. 21, 2024

(51) Int. Cl.
H04W 36/00 (2009.01)
H04W 36/24 (2009.01)

(52) U.S. Cl.
CPC ... *H04W 36/0016* (2013.01); *H04W 36/0033* (2013.01); *H04W 36/24* (2013.01); *H04W 36/0083* (2013.01)

(58) Field of Classification Search
None
See application file for complete search history.

(56) References Cited

U.S. PATENT DOCUMENTS

2011/0299429 A1* 12/2011 Tiwari ............... H04W 76/50
370/328
2016/0073301 A1* 3/2016 Yanagisako ....... H04W 36/0079
455/436
2019/0335366 A1* 10/2019 Jin ................. H04W 48/18
2021/0105690 A1 4/2021 Wu et al.
2021/0314060 A1* 10/2021 Shi .................. H04B 7/18504
2022/0232433 A1 7/2022 Xu et al.
2023/0413111 A1* 12/2023 Kotaru ............. H04W 28/0858

FOREIGN PATENT DOCUMENTS

WO WO-2022086933 A1 4/2022
WO WO-2022155139 A1 7/2022

OTHER PUBLICATIONS

International Search Report and Written Opinion—PCT/US2023/032348—ISA/EPO—Dec. 14, 2023 (2205704WO).

* cited by examiner

*Primary Examiner* — Xavier S Wong
(74) *Attorney, Agent, or Firm* — Holland & Hart LLP

(57) ABSTRACT

Methods, systems, and devices for wireless communications are described. A user equipment (UE) may receive a measurement configuration including trigger conditions for performance of handover procedures within a service-based wireless system. The UE may transmit a message indicating a satisfaction of a trigger condition to a source network entity, a mobility service offered by a service-based network, or both. After performance of a handover decision by the source network entity, the mobility service, or both, the mobility service may select a target network entity for the handover procedure. The mobility service may select a target network entity that supports at least one active core network service at the UE. The UE may then receive a handover command from the mobility service, and may perform a handover procedure to the target network entity.

29 Claims, 18 Drawing Sheets

TECHNIQUES FOR CONNECTED STATE MOBILITY IN A SERVICE-BASED WIRELESS SYSTEM

FIELD OF TECHNOLOGY

The following relates to wireless communications, including techniques for connected state mobility in a service-based wireless system.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some wireless communications systems, a UE may perform handover procedures from one cell to another and/or from one network entity to another as the UE moves around within the system. However, in the context of a service-based network, such as a Sixth Generation (6G) network, performance of handovers between network entities may disrupt ongoing communications between the UE and core network services to which the UE subscribes.

SUMMARY

The described techniques relate to improved methods, systems, devices, and apparatuses that support techniques for connected state mobility in a service-based wireless system. Generally, aspects of the present disclosure are directed to signaling for handover procedures in a service-based network. In particular, aspects of the present disclosure are directed to signaling that enables a user equipment (UE) to perform a handover procedure from one network entity to another (e.g., from one distributed unit (DU) to another) in such a manner to reduce or minimize disruptions to one or more active core network services at the UE. For example, a UE and/or a source network entity connected to the UE may identify a trigger condition for performing a handover procedure. Based on the trigger condition, the source network entity or a mobility service (e.g., core network mobility service that manages UE mobility within the network) may make a handover decision. Subsequently, the mobility service may identify a target network entity based on one or more active core network services at the UE. For instance, the mobility service may select a target network entity that supports all (or at least one) of the active core network services at the UE. The mobility service may then transmit a handover command to the source network entity (for relay to the UE) so that the UE can perform a handover procedure from the source network entity to the target network entity.

A method for wireless communication at a UE is described. The method may include communicating a set of multiple service messages with a first DU, the set of multiple service messages associated with a set of multiple core network services that are offered by a service-based network and are active at the UE, receiving, from a core network mobility service of the set of multiple core network services and via the first DU, a measurement configuration indicating one or more trigger conditions associated with a handover procedure at the UE, transmitting, to the first DU for relay to the core network mobility service, a second message indicating a satisfaction of a trigger condition of the one or more trigger conditions, receiving a handover command from the core network mobility service via the first DU based on the satisfaction of the trigger condition, the handover command indicating a second DU that supports at least one core network service of the set of multiple core network services that are active at the UE, and communicating with the second DU based on receiving the handover command.

An apparatus for wireless communication at a UE is described. The apparatus may include a processor, memory coupled with the processor, and instructions stored in the memory. The instructions may be executable by the processor to cause the apparatus to communicate a set of multiple service messages with a first DU, the set of multiple service messages associated with a set of multiple core network services that are offered by a service-based network and are active at the UE, receive, from a core network mobility service of the set of multiple core network services and via the first DU, a measurement configuration indicating one or more trigger conditions associated with a handover procedure at the UE, transmit, to the first DU for relay to the core network mobility service, a second message indicating a satisfaction of a trigger condition of the one or more trigger conditions, receive a handover command from the core network mobility service via the first DU based on the satisfaction of the trigger condition, the handover command indicating a second DU that supports at least one core network service of the set of multiple core network services that are active at the UE, and communicate with the second DU based on receiving the handover command.

Another apparatus for wireless communication at a UE is described. The apparatus may include means for communicating a set of multiple service messages with a first DU, the set of multiple service messages associated with a set of multiple core network services that are offered by a service-based network and are active at the UE, means for receiving, from a core network mobility service of the set of multiple core network services and via the first DU, a measurement configuration indicating one or more trigger conditions associated with a handover procedure at the UE, means for transmitting, to the first DU for relay to the core network mobility service, a second message indicating a satisfaction of a trigger condition of the one or more trigger conditions, means for receiving a handover command from the core network mobility service via the first DU based on the satisfaction of the trigger condition, the handover command indicating a second DU that supports at least one core network service of the set of multiple core network services that are active at the UE, and means for communicating with the second DU based on receiving the handover command.

A non-transitory computer-readable medium storing code for wireless communication at a UE is described. The code may include instructions executable by a processor to communicate a set of multiple service messages with a first DU, the set of multiple service messages associated with a set of multiple core network services that are offered by a service-based network and are active at the UE, receive, from a core network mobility service of the set of multiple core network services and via the first DU, a measurement configuration indicating one or more trigger conditions associated with a handover procedure at the UE, transmit, to the first DU for relay to the core network mobility service, a second message indicating a satisfaction of a trigger condition of the one or more trigger conditions, receive a handover command from the core network mobility service via the first DU based on the satisfaction of the trigger condition, the handover command indicating a second DU that supports at least one core network service of the set of multiple core network services that are active at the UE, and communicate with the second DU based on receiving the handover command.

Some examples of the method, apparatuses, and non-transitory computer-readable medium described herein may further include operations, features, means, or instructions for transmitting capability information associated with the UE to the first DU, the core network mobility service, an additional core network service of the set of multiple core network services, or any combination thereof, where receiving the handover command may be based on the capability information.

Some examples of the method, apparatuses, and non-transitory computer-readable medium described herein may further include operations, features, means, or instructions for receiving, via the handover command, a cell identifier associated with a serving cell supported by the second DU and a set of communication parameters for communicating with the serving cell, where communicating with the second DU may be based on the cell identifier and the set of communication parameters.

Some examples of the method, apparatuses, and non-transitory computer-readable medium described herein may further include operations, features, means, or instructions for transmitting, to a network address associated with the core network mobility service, a service request for establishing service with the core network mobility service and receiving control signaling indicating a service context for communicating with the core network mobility service based on the service request, where transmitting the second message, receiving the handover command, or both, may be based on the service context.

Some examples of the method, apparatuses, and non-transitory computer-readable medium described herein may further include operations, features, means, or instructions for performing measurements on signals received from the first DU and one or more candidate DUs including the second DU, where the measurements may be performed in accordance with the measurement configuration, and where transmitting the second message may be based on performing the measurements.

A method for wireless communication at a core network mobility service is described. The method may include receiving, from a first DU in wireless communication with a UE, a message associated with a satisfaction of a trigger condition for a handover procedure at the UE, selecting, based on the message, a second DU from a set of multiple candidate DUs based on the second DU being configured to support at least one core network service that is active at the UE of a set of multiple core network services of a service-based network, and transmitting, to the first DU for relay to the UE and based on selecting the second DU, a handover command indicating the second DU and an instruction to perform the handover procedure from the first DU to the second DU.

An apparatus for wireless communication at a core network mobility service is described. The apparatus may include a processor, memory coupled with the processor, and instructions stored in the memory. The instructions may be executable by the processor to cause the apparatus to receive, from a first DU in wireless communication with a UE, a message associated with a satisfaction of a trigger condition for a handover procedure at the UE, select, based on the message, a second DU from a set of multiple candidate DUs based on the second DU being configured to support at least one core network service that is active at the UE of a set of multiple core network services of a service-based network, and transmit, to the first DU for relay to the UE and based on selecting the second DU, a handover command indicating the second DU and an instruction to perform the handover procedure from the first DU to the second DU.

Another apparatus for wireless communication at a core network mobility service is described. The apparatus may include means for receiving, from a first DU in wireless communication with a UE, a message associated with a satisfaction of a trigger condition for a handover procedure at the UE, means for selecting, based on the message, a second DU from a set of multiple candidate DUs based on the second DU being configured to support at least one core network service that is active at the UE of a set of multiple core network services of a service-based network, and means for transmitting, to the first DU for relay to the UE and based on selecting the second DU, a handover command indicating the second DU and an instruction to perform the handover procedure from the first DU to the second DU.

A non-transitory computer-readable medium storing code for wireless communication at a core network mobility service is described. The code may include instructions executable by a processor to receive, from a first DU in wireless communication with a UE, a message associated with a satisfaction of a trigger condition for a handover procedure at the UE, select, based on the message, a second DU from a set of multiple candidate DUs based on the second DU being configured to support at least one core network service that is active at the UE of a set of multiple core network services of a service-based network, and transmit, to the first DU for relay to the UE and based on selecting the second DU, a handover command indicating the second DU and an instruction to perform the handover procedure from the first DU to the second DU.

Some examples of the method, apparatuses, and non-transitory computer-readable medium described herein may further include operations, features, means, or instructions for transmitting a handover request to the second DU based on the message and receiving an acknowledgment (ACK) message from the second DU based on the handover request, where transmitting the handover command may be based on the ACK message.

Some examples of the method, apparatuses, and non-transitory computer-readable medium described herein may further include operations, features, means, or instructions for transmitting, via the handover request, an indication of the set of multiple core network services that may be active at the UE, where the ACK message may be based on the set of multiple core network services that may be active at the UE.

Some examples of the method, apparatuses, and non-transitory computer-readable medium described herein may further include operations, features, means, or instructions for receiving, via the ACK message, an indication of the at least one core network service supported by the second DU, where transmitting the handover command may be based on receiving the indication of the at least one core network service.

Some examples of the method, apparatuses, and non-transitory computer-readable medium described herein may further include operations, features, means, or instructions for receiving capability information associated with the UE, where selecting the second DU from the set of multiple candidate DUs may be based on the capability information.

In some examples of the method, apparatuses, and non-transitory computer-readable medium described herein, the capability information may be received from a core network capability service included within the set of multiple core network services.

Some examples of the method, apparatuses, and non-transitory computer-readable medium described herein may further include operations, features, means, or instructions for selecting the second DU from the set of multiple candidate DUs may be based on a mobility history of the UE, a traffic load associated with the second DU, or both.

Some examples of the method, apparatuses, and non-transitory computer-readable medium described herein may further include operations, features, means, or instructions for receiving, via the message, an indication of the set of multiple candidate DUs, where selecting the second DU may be based on receiving the indication of the set of multiple candidate DUs.

In some examples of the method, apparatuses, and non-transitory computer-readable medium described herein, selecting the second DU may include operations, features, means, or instructions for selecting a serving cell supported by the second DU, where the handover command includes a cell identifier associated with the selected serving cell.

Some examples of the method, apparatuses, and non-transitory computer-readable medium described herein may further include operations, features, means, or instructions for receiving, from the second DU, a second message indicating a completion of the handover procedure and communicating with the UE via the second DU based on the second message.

Some examples of the method, apparatuses, and non-transitory computer-readable medium described herein may further include operations, features, means, or instructions for transmitting, to the first DU for relay to the UE, a measurement configuration indicating one or more trigger conditions including the trigger condition, where receiving the message may be based on the measurement configuration.

A method for wireless communication at a first DU is described. The method may include communicating a set of multiple service messages between a UE and a set of multiple core network services of a service-based network that are active at the UE, transmitting, to a core network mobility service of the set of multiple core network services, a message associated with a satisfaction of a trigger condition for a handover procedure at the UE, receiving, from the core network mobility service based on the message, a handover command indicating a second DU that supports at least one core network service of a set of multiple core network services that are active at the UE, and transmitting the handover command to the UE, the handover command including an instruction for the UE to perform the handover procedure from the first DU to the second DU.

An apparatus for wireless communication at a first DU is described. The apparatus may include a processor, memory coupled with the processor, and instructions stored in the memory. The instructions may be executable by the processor to cause the apparatus to communicate a set of multiple service messages between a UE and a set of multiple core network services of a service-based network that are active at the UE, transmit, to a core network mobility service of the set of multiple core network services, a message associated with a satisfaction of a trigger condition for a handover procedure at the UE, receive, from the core network mobility service based on the message, a handover command indicating a second DU that supports at least one core network service of a set of multiple core network services that are active at the UE, and transmit the handover command to the UE, the handover command including an instruction for the UE to perform the handover procedure from the first DU to the second DU.

Another apparatus for wireless communication at a first DU is described. The apparatus may include means for communicating a set of multiple service messages between a UE and a set of multiple core network services of a service-based network that are active at the UE, means for transmitting, to a core network mobility service of the set of multiple core network services, a message associated with a satisfaction of a trigger condition for a handover procedure at the UE, means for receiving, from the core network mobility service based on the message, a handover command indicating a second DU that supports at least one core network service of a set of multiple core network services that are active at the UE, and means for transmitting the handover command to the UE, the handover command including an instruction for the UE to perform the handover procedure from the first DU to the second DU.

A non-transitory computer-readable medium storing code for wireless communication at a first DU is described. The code may include instructions executable by a processor to communicate a set of multiple service messages between a UE and a set of multiple core network services of a service-based network that are active at the UE, transmit, to a core network mobility service of the set of multiple core network services, a message associated with a satisfaction of a trigger condition for a handover procedure at the UE, receive, from the core network mobility service based on the message, a handover command indicating a second DU that supports at least one core network service of a set of multiple core network services that are active at the UE, and transmit the handover command to the UE, the handover command including an instruction for the UE to perform the handover procedure from the first DU to the second DU.

Some examples of the method, apparatuses, and non-transitory computer-readable medium described herein may further include operations, features, means, or instructions for transmitting capability information associated with the UE to the core network mobility service, an additional core network service of the set of multiple core network services, or both, where receiving the handover command may be based on the capability information.

Some examples of the method, apparatuses, and non-transitory computer-readable medium described herein may further include operations, features, means, or instructions for transmitting, to the core network mobility service, an additional core network service of the set of multiple core network services, or both, an indication of the set of multiple core network services that may be active at the UE, where receiving the handover command may be based on transmitting the indication of the set of multiple core network services that may be active at the UE.

Some examples of the method, apparatuses, and non-transitory computer-readable medium described herein may further include operations, features, means, or instructions for establishing a communication tunnel with the second DU based on the handover command, receiving a second message for the UE prior to a completion of the handover procedure, and transmitting one or more packets to the second DU via the communication tunnel for relay to the UE based on receiving the second message.

Some examples of the method, apparatuses, and non-transitory computer-readable medium described herein may further include operations, features, means, or instructions for transmitting, via the message, an indication of a set of multiple candidate DUs including the second DU and one or more cell identifiers associated with one or more serving cells supported by the second DU, where receiving the handover command may be based on transmitting the indication of the set of multiple candidate DUs.

Some examples of the method, apparatuses, and non-transitory computer-readable medium described herein may further include operations, features, means, or instructions for receiving, via the handover command, an indication of the at least one core network service supported by the second DU and transmitting, to the UE via the handover command, the indication of the at least one core network service supported by the second DU.

Some examples of the method, apparatuses, and non-transitory computer-readable medium described herein may further include operations, features, means, or instructions for receiving, from the core network mobility service, a measurement configuration indicating one or more trigger conditions including the trigger condition and transmitting the measurement configuration to the UE, where transmitting the message associated with the satisfaction of the trigger condition may be based on the measurement configuration.

Some examples of the method, apparatuses, and non-transitory computer-readable medium described herein may further include operations, features, means, or instructions for receiving, from the UE based on the measurement configuration, a measurement report, a second message indicating the trigger condition, or both, where transmitting the message associated with the satisfaction of the trigger condition may be based on receiving the measurement report, the second message indicating the trigger condition, or both.

A method for wireless communication at a second DU is described. The method may include receiving, from a core network mobility service of a service-based network, a handover request associated with a handover procedure at a UE from a first DU to the second DU, transmitting an ACK message to the core network mobility service based on the handover request, the ACK message indicating at least one core network service of a set of multiple core network services that is active at the UE and supported by the second DU, communicating with the UE based on the handover request and the ACK message, and transmitting, to the core network mobility service based on communicating with the UE, a second message indicating a completion of the handover procedure.

An apparatus for wireless communication at a second DU is described. The apparatus may include a processor, memory coupled with the processor, and instructions stored in the memory. The instructions may be executable by the processor to cause the apparatus to receive, from a core network mobility service of a service-based network, a handover request associated with a handover procedure at a UE from a first DU to the second DU, transmit an ACK message to the core network mobility service based on the handover request, the ACK message indicating at least one core network service of a set of multiple core network services that is active at the UE and supported by the second DU, communicate with the UE based on the handover request and the ACK message, and transmit, to the core network mobility service based on communicating with the UE, a second message indicating a completion of the handover procedure.

Another apparatus for wireless communication at a second DU is described. The apparatus may include means for receiving, from a core network mobility service of a service-based network, a handover request associated with a handover procedure at a UE from a first DU to the second DU, means for transmitting an ACK message to the core network mobility service based on the handover request, the ACK message indicating at least one core network service of a set of multiple core network services that is active at the UE and supported by the second DU, means for communicating with the UE based on the handover request and the ACK message, and means for transmitting, to the core network mobility service based on communicating with the UE, a second message indicating a completion of the handover procedure.

A non-transitory computer-readable medium storing code for wireless communication at a second DU is described. The code may include instructions executable by a processor to receive, from a core network mobility service of a service-based network, a handover request associated with a handover procedure at a UE from a first DU to the second DU, transmit an ACK message to the core network mobility service based on the handover request, the ACK message indicating at least one core network service of a set of multiple core network services that is active at the UE and supported by the second DU, communicate with the UE based on the handover request and the ACK message, and transmit, to the core network mobility service based on communicating with the UE, a second message indicating a completion of the handover procedure.

Some examples of the method, apparatuses, and non-transitory computer-readable medium described herein may further include operations, features, means, or instructions for receiving, via the handover request, an indication of the set of multiple core network services that may be active at the UE, where transmitting the ACK message may be based on the set of multiple core network services that may be active at the UE.

Some examples of the method, apparatuses, and non-transitory computer-readable medium described herein may further include operations, features, means, or instructions for establishing a communication tunnel with the first DU based on the handover request, the ACK message, or both, receiving, from the first DU via the communication tunnel, one or more data packets associated with a second message for the UE prior to a completion of the handover procedure, and transmitting the one or more data packets associated with the second message to the UE based on receiving the one or more data packets via the communication tunnel.

Some examples of the method, apparatuses, and non-transitory computer-readable medium described herein may further include operations, features, means, or instructions for transmitting, to the core network mobility service via the ACK message, a set of communication parameters for communications between the UE and the second DU, where communicating with the UE may be based on the set of communication parameters.

DETAILED DESCRIPTION

Figure 1:
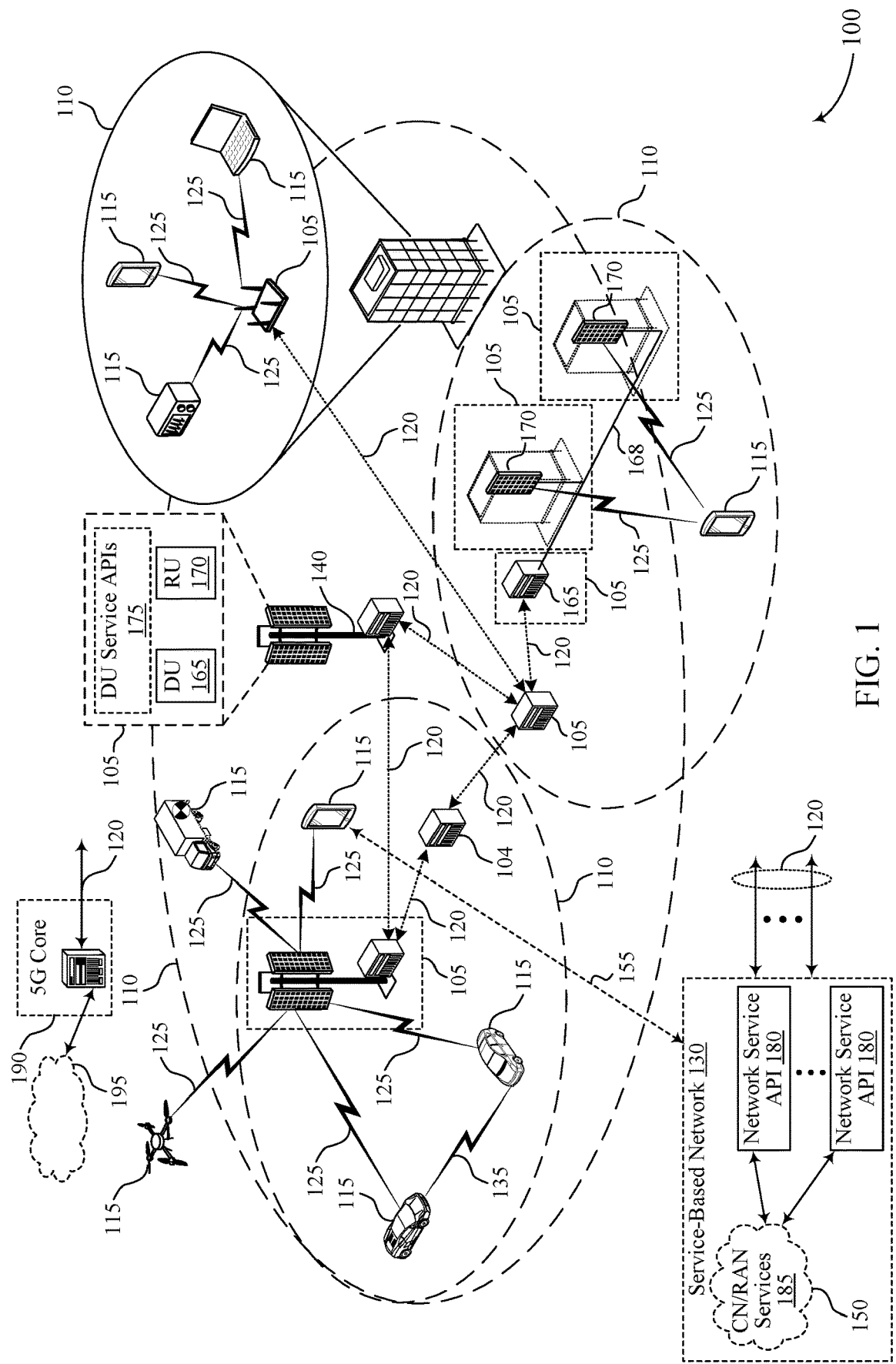
FIG. 1 illustrates an example of a wireless communications system that supports techniques for connected state mobility in a service-based wireless system in accordance with one or more aspects of the present disclosure.

Some wireless systems may exhibit a relatively vertical, hierarchical architecture that includes many "layers" of different devices that perform functions for the system. For example, a wireless system may include user equipments (UEs), base stations/network entities, and numerous back-end (e.g. core network) devices associated with one or more functions for the system. Such a hierarchical structure may result in processing and other functions being performed at multiple devices (e.g., duplicative processing or capabilities across multiple back-end devices), thereby leading to wasted resources and excess power consumption. Additionally, the back-end architecture of some wireless systems may be owned and maintained by a small handful of operators, which may make it difficult for other parties/entities to integrate with the systems and may complicate the ability of the systems to offer customized services and functionality to wireless devices.

Comparatively, some wireless systems, such as Sixth Generation (6G) systems, may exhibit a flatter, service-based architecture in which a radio access network (RAN) (e.g., network entities) interfaces with a service-based network in order to connect UEs to core network services maintained at various network addresses within the service-based network. In the context of a service-based system, operations and functions that may otherwise be performed by a few centralized back-end components (e.g., in some systems) may be distributed across a number of core network services that may be hosted at different network addresses, such as in a cloud-based architecture. As a result, UEs in a service-based system may be able to establish and maintain connections with (e.g., "subscribe" to) different core network services or groups thereof on an a la carte basis, where each core network service offers or provides a respective network functionality or service. For example, a service-based system may include a mobility service, a security service, a privacy service, a location service, and the like. In this regard, each UE within a service-based system may be able to select to which core network services the UE will subscribe based on the individualized characteristics or needs of the respective UE.

In the context of a service-based wireless system, a UE may subscribe to one or more core network services offered by a service-based network. In such cases, network entities of a RAN may interface with the service-based network and relay communications between the UE and the respective core network services. However, as the UE moves around within the network, the UE may perform handover procedures from one cell to another and/or from one network entity to another. In the context of service-based networks, such as a 6G network, performance of a handover between network entities may disrupt ongoing communications between the UE and one or more core network services to which the UE subscribes.

Accordingly, aspects of the present disclosure are directed to signaling for a handover procedure in a service-based network, such as a 6G network. In particular, aspects of the present disclosure are directed to signaling that enables a UE to perform a handover procedure from one network entity to another (or from one distributed unit (DU) to another) in such a manner to reduce or minimize disruptions to one or more active core network services at the UE.

For example, a UE and/or a source DU connected to the UE may identify a trigger condition for performing a handover procedure. Based on the trigger condition, the source DU or a mobility service (e.g., core network mobility service that manages UE mobility within the network) may make a handover decision. Subsequently, the mobility service may identify a target DU based on one or more active services at the UE. For instance, the mobility service may select a target DU that supports all (or at least one) of the active core network services at the UE. The mobility service may then transmit a handover command to the source DU (for relay to the UE) so that the UE can perform a handover procedure from the source DU to the target DU. Following completion of the handover procedure, the source DU may relay communications between the UE and the supported one or more core network services.

Aspects of the disclosure are initially described in the context of wireless communications systems. Additional aspects of the disclosure are described in the context of an example network architecture and example process flows. Aspects of the disclosure are further illustrated by and described with reference to apparatus diagrams, system diagrams, and flowcharts that relate to techniques for connected state mobility in a service-based wireless system.

FIG. 1 illustrates an example of a wireless communications system 100 that supports techniques for capability indication to multiple services in a service-based wireless system in accordance with one or more aspects of the present disclosure. The wireless communications system 100 may include one or more network entities 105, one or more UEs 115, and a service-based network 130. In some examples, the wireless communications system 100 may implement aspects of a 6G network, a 5G network (e.g., a New Radio (NR) network), a 4G network (e.g., a Long Term Evolution (LTE) network, an LTE-Advanced (LTE-A) network, an LTE-A Pro network), or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, access point, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the service-based network 130, or with one another, or both. For example, network entities 105 may communicate with the service-based network 130 via one or more backhaul communication links 120 (e.g., in accordance with an S1, N2, N3, or other interface protocol). Similarly, UEs 115 may communicate with the service-based network 130 via one or more communication links 155. In some examples, network entities 105 may communicate with one another via a backhaul communication link 120 (e.g., in accordance with an X2, Xn, or other interface protocol) either directly (e.g., directly between network entities 105) or indirectly (e.g., via a service-based network 130). In some examples, network entities 105 may communicate with one another via one or more communication links such as a fronthaul communication link 168 (e.g., between a radio unit 170 and a distributed unit 165). The backhaul communication links 120 or fronthaul communication links 168, or other communication links between network entities 105, may be or include one or more wired links (e.g., an electrical link, an optical fiber link), one or more wireless links (e.g., a radio link, a wireless optical link), among other examples or various combinations thereof.

In some examples, network entities 105 may communicate with a service platform 150 (e.g., a cloud platform) that provides one or more core network services (CN services), one or more radio access network services (RAN services), or any combinations thereof (CN/RAN services 185). The CN/RAN services may be provided via the service-based network 130, using one or more APIs. For example, one or more DU service APIs 175 may provide an interface for one or more services at a UE 115. The services at the UE 115 may correspond to one or more CN/RAN services 185 at service platform 150. For example, network service APIs 180 at service-based network 130 may interface with corresponding DU service APIs 175 at a DU 165, which interface with corresponding APIs at a UE 115 to provide service connectivity between the one or more UE 115 services and corresponding CN/RAN services 185.

One or more of the network entities 105 described herein may include or may be referred to as a base station 140 (e.g., a base transceiver station, a radio base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, a 6G NB, or other suitable terminology). In some examples, a network entity 105 (e.g., a base station 140) may be implemented in an aggregated (e.g., monolithic, standalone) base station architecture, which may be configured to utilize a service-based architecture and provide radio access within a single network entity 105 (e.g., a single RAN node, such as a base station 140, may include a RU 170, a DU 165, and DU APIs 175 for CN/RAN services 185). An RU 170 may also be referred to as a radio head, a smart radio head, a remote radio head (RRH), a remote radio unit (RRU), or a transmission reception point (TRP).

Additionally, in some examples, one or more network entities 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU), a DU 165, RU 170, a RAN Intelligent Controller (MC) (e.g., a Near-Real Time MC (Near-RT MC), a Non-Real Time MC (Non-RT MC)), a Service Management and Orchestration (SMO) system, or any combination thereof. One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between components (e.g., CU, DU, and RU) is flexible and may support different functionalities depending on which functions (e.g., network layer functions, protocol layer functions, baseband functions, RF functions, and any combinations thereof) are performed at a component. For example, a functional split of a protocol stack may be employed between a CU and a DU 165 such that the CU may support one or more layers of the protocol stack and the DU 165 may support one or more different layers of the protocol stack. In some examples, the CU may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). In some examples, the CU may host one or more service APIs for one or more CN/RAN services 185 via corresponding network service APIs 180 of service-based network 130. The CU may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU and a DU 165, or between a DU 165 and an RU 170 may be within a protocol layer (e.g., some functions for a protocol layer may be performed by one of a CU, a DU 165, or an RU 170, while other functions of the protocol layer are performed by a different one of the CU, the DU 165, or the RU 170). A DU 165 may be connected to one or more RUs 170 via a fronthaul communication link 168 (e.g., open fronthaul (FH) interface). In some examples, a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a service-based network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an TAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support techniques for capability indication to multiple services in a service-based wireless system as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs, RUs 170, RIC, SMO).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., 4G, 5G, 6G radio access technology). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

In some deployments, multiple RANs may be accessed by one or more UEs 115 or network entities 105 such as, for example, a 6G RAT and a 5G RAT. In some examples, the 6G RAT may be associated with service-based network 130 and the 5G RAT may be associated with a 5G Core 190. The 5G core 190 may provide user authentication, access authorization, tracking, Internet Protocol (IP) connectivity, and other access, routing, or mobility functions. The 5G core 190 may be an evolved packet core (EPC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the 5G core 190. User IP packets may be transferred through the user plane entity, which may provide IP address allocation as well as other functions. The user plane entity may be connected to IP services 195 for one or more network operators. The IP services 195 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

In some examples, the wireless communications system 100 may include a packet-based network that operates using a cloud platform, such as service platform 150, that provides CN/RAN services 185. The CN/RAN services 185, in some examples, may be hosted based on a deployment topology and capabilities for service parameters associated with each service. Providing CN/RAN services 185 allows for separation of particular services (e.g., mobility, connection state management, security, paging, radio access services, quality of service (QoS) configuration and data services, UE capability management, location, messaging, among others) from transport functions (e.g., data radio bearer (DRB) and logical channel (LC) management, data service configuration, among others). Service-based functions (e.g., a message broker decouple radio network procedures from network delivery mechanisms) may allow for flexibility of some functions (e.g., layer 2 (L2) functions) to be hosted anywhere in the cloud, and may enable enhanced scalability, resiliency, elasticity, agility, reuse, visibility, automation, failover, or any combinations thereof (e.g., each service across RAN and core network may scale independently by increasing or decreasing resources allocated across functions independently). Further, efficiency may be enhanced through providing real-time link management to the RAN edge, and allowing for adaptation at the DU 165 for more efficient activation, deactivation, or selection of features based on UE conditions.

In some implementations, the wireless communications system 100 support signaling that enables efficient handover procedures in a service-based network, such as a 6G network. In particular, aspects of the present disclosure are directed to signaling that enables UEs 115 to perform handover procedures from one network entity 105 to another (or from one DU to another) in such a manner to reduce or minimize disruptions to one or more active core network services (e.g., CN/RAN services 185) at the UE 115.

For example, a UE 115, a source DU 165 connected to the UE 165, a mobility service (e.g., core network service that manages mobility for UEs 115 within the network), or any combination thereof, may identify a trigger condition for performing a handover procedure. Based on the trigger condition, the source DU 165 or a mobility service (e.g., core network mobility service that manages UE 115 mobility within the network) may make a handover decision. Subsequently, the mobility service may identify a target DU 165 based on one or more active services at the UE 115. For instance, the mobility service may select a target DU 165 that supports all (or at least one) of the one or more active core network services at the UE 115. The mobility service may then transmit a handover command to the source DU 165 (for relay to the UE 115) so that the UE 115 can perform a handover procedure from the source DU 165 to the target DU 165. Following completion of the handover procedure, the source DU 165 may relay communications between the UE 115 and the supported one or more core network services.

Techniques described herein may enable UEs 115 to perform handover procedures between DUs 165 and/or between network entities 105 of a service-based wireless system while reducing or minimizing disruptions to one or more active core network services at the UE 115. In particular, aspects of the present disclosure support techniques which enable UEs 115 to perform handover procedures to target DUs/target network entities which support at least some of the active core network services at the UE 115. As such, aspects, of the present disclosure may reduce interruptions to communications performed with core network services, thereby reducing or preventing the need for UEs 115 to continually re-establish communications with core network services. In this regard, techniques described herein may reduce signaling associated with UEs 115 subscribing to core network services, reduce interruptions, and improve overall user experience.

Figure 2:
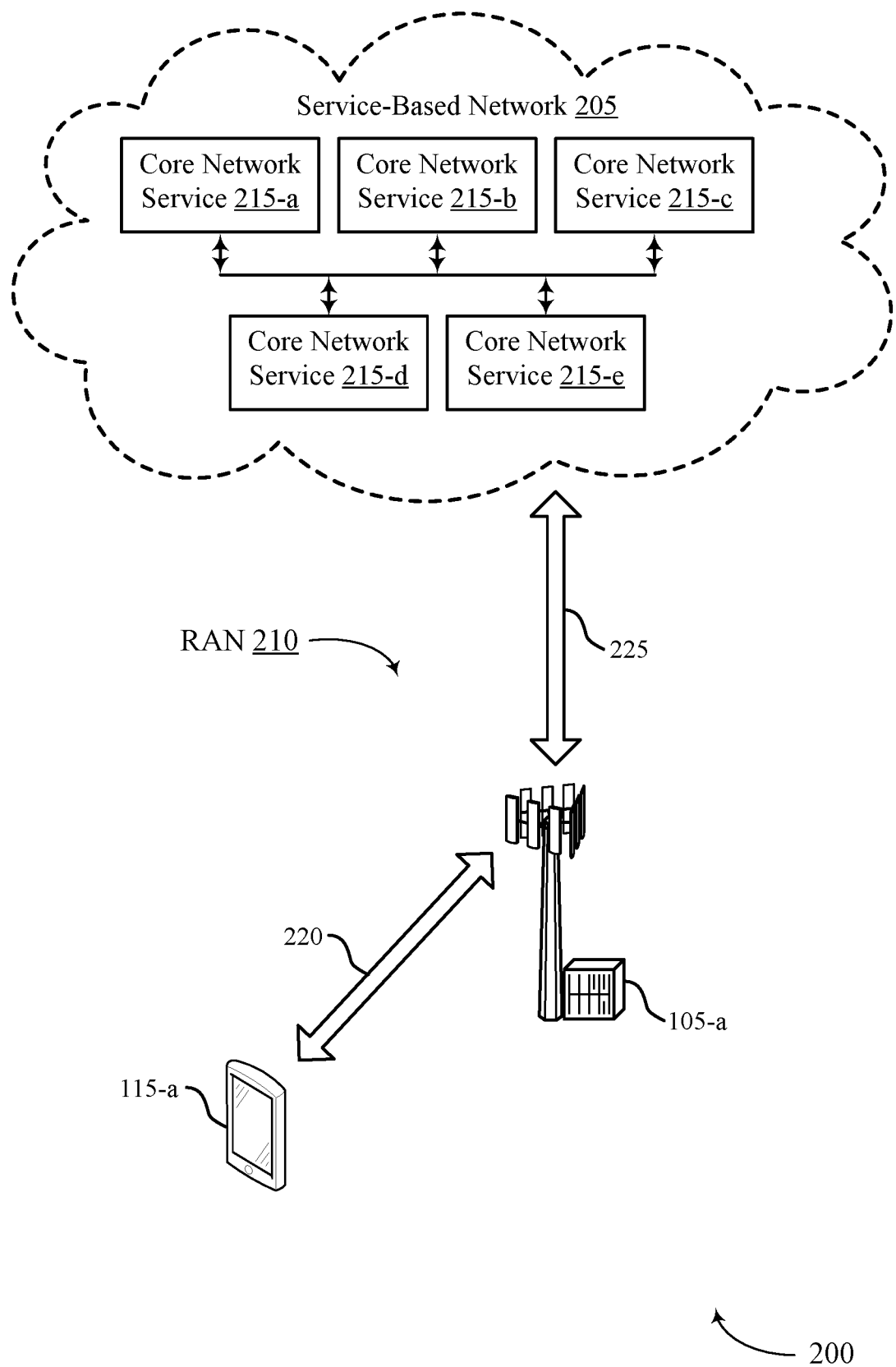
FIG. 2 illustrates an example of a wireless communications system that supports techniques for connected state mobility in a service-based wireless system in accordance with one or more aspects of the present disclosure.

FIG. 2 illustrates an example of a wireless communications system 200 that supports techniques for system information broadcast in a service-based wireless system in accordance with one or more aspects of the present disclosure. Aspects of the wireless communications system 200 may implement, or be implemented by, aspects of the wireless communications system 100. In some implementations, the wireless communications system 200 illustrates an example architecture of a service-based wireless communications system, such as a 6G network as described with reference to FIG. 1.

The wireless communications system 200 may include one or more UEs 115 (e.g., UE 115-*a*), one or more network entities (e.g., network entity 105-*a*), and a service-based network 205. In some aspects, the service-based network 205 may be configured to communicate or interface with a RAN 210 of the wireless communications system 200, where the RAN 210 includes the one or more network entities (e.g., network entity 105-*a*). The service-based network 205 may support or offer a set of core network services 215 (e.g., core network services 215-*a*, 215-*b*, 215-*c*, 215-*d*, 215-*d*, 215-*e*). In some implementations, the service-based network 205 may include or be associated with a cloud platform, where the respective core network services 215 are hosted at respective network addressees in the cloud platform.

The UE 115-*a* may communicate with the network entity 105-*a* using one or more communication links 220, which may include an example of an access link (e.g., a Uu link). The communication link 220 may include a bi-directional link that can include both uplink and downlink communication. Similarly, the network entity 105-*a* of the RAN 210 may be configured to communicate with (e.g., interface with) the service-based network 205 via one or more communication links (e.g., communication ink 225), where the communication link 215 may be configured to facilitate bi-directional communications between the network entity 105-*a* and each of the respective core network services 215 of the service-based network 205.

As shown in FIG. 2, the wireless communications system 200 may exhibit a service-based architecture where the entities of the RAN 210 (e.g., network entity 105-*a*) are configured to connect the UE 115-*a* to core network services 215 of the service-based network 205. In particular, the RAN 210 (e.g., network entity 105-*a*) may be configured to relay communications between the UE 115-*a* and the various core network services 215 of the service-based network to enable the UE 115-*a* to establish and maintain wireless connections with the respective core network services 215 in order to exchange communications associated with the various network functionalities that are supported by the respective core network services 215. In other words, the wireless communications system 200 may enable the UE 115-*a* to "subscribe" to the respective core network services 215 on an a la carte basis depending on the needs or requirements of the UE 115-*a*. In this regard, different UEs 115 within the wireless communications system 200 may be able to subscribe to different subsets of core network services 215 depending on the capabilities of the UEs 115, applications executed at the UEs 115, a mobility of the UEs 115, etc.

Each core network service 215 may be associated with a respective network address within the service-based network 205. Stated differently, each core network service 215 may be hosted at one or more components of a cloud-based network, where the components of each core network service 215 may be associated with a respective network address. The respective core network services 215 may be provided by network providers, third-party entities, etc., where each core network service 215 is configured to support a respective service or functionality offered to the components of the wireless communications system 200 (e.g., UE 115-*a*, network entity 105-*a*).

Different services, functionalities, and core network functions that may be supported or offered by the respective core network services 215 may include, but are not limited to, a mobility service, a security service, a privacy service, a location service, etc. For example, the first core network service 215-*a* may include a core network mobility service that that hosts information and provides signaling that facilitate the geographical movement of the UE 115-*a* throughout wireless communications system. By way of another example, the second core network service 215-*b* may include a security service that provides security and encryption services to subscribing UEs 115 within the wireless communications system 200.

In some aspects, each core network service 215 may include a respective API configured to facilitate wireless communications with the network entity 105-*a* and the UE 115-*a*, such as the network service APIs 180 illustrated in FIG. 1. APIs at the respective core network services 215 may include routing APIs, configuration APIs, or both. Routing APIs may be configured for service data unit communications between the UE 115-*a* and the respective core network services 215. Comparatively, configuration APIs may be configured to facilitate communications between the network entity 105-*a* and the respective core network services 215 to negotiate service requirements and service-specific operation.

In some aspects, the network entity 105-*a* (e.g., eDU) may facilitate traffic routing (e.g., service data unit routing) from the UE 115-*a* to the core network services 215, and vice versa. The network entity 105-*a* may facilitate traffic routing between the respective devices directly, via other network entities 105-*a*, via proxy, or any combination thereof. Moreover, in some cases, the UE 115-*a* may be communicatively coupled to multiple network entities 105 (e.g., dual connectivity), where the multiple network entities 105 facilitate traffic routing with the same or different sets of core network services 215. Additionally, the network entity 105-*a* may support service configurations or service contexts associated with communications parameters within the system, such as QoS flows, security, and UE 115 service contexts. In some aspects, the communication link 220 between the network entity 105-*a* and the UE 115-*a* may be associated with an access stratum configuration that facilitates over-the-air service awareness. The access stratum configuration may include including logical channels, access stratum security, access stratum context, and the like. For example, the access stratum configuration may be associated with a service-specific configuration (e.g., logical channels corresponding to QoS flows for each respective core network service 215) and a service-agnostic configuration (e.g., parameters which are common to all core network services 215).

The service-based wireless communications system 200 (e.g., 6G network) illustrated in FIG. 2 may exhibit several differences and advantages as compared to some other types of wireless systems, such as networks that instead exhibit a relatively more vertical, hierarchical architecture that includes many "layers" of different devices that perform functions for the network. A more hierarchical structure may result in processing and other functions being performed at multiple devices (e.g., network entity 105 and one or more back-end devices), thereby leading to inefficient use of resources and high power consumption. Additionally, the back-end architecture of a network with a more vertical, hierarchical architecture may be owned and maintained by a small handful of operators, which may render it difficult for other parties/entities to integrate with such systems, and services offered to UEs 115 and other devices may be difficult to customize within such systems.

Comparatively, service-based wireless communications system 200 illustrated in FIG. 2 exhibits a flatter, horizontal architecture which enables the respective functions of wireless communications systems to be distributed across different components (e.g., core network services 215) of the system. For example, such functions and protocols may be divided up and distributed across the set of core network services 215 such that each core network service 215 may support or enable a small portion of the capabilities and functionality of conventional wireless communications systems. In other words, the service-based architecture may enable functions and protocols to be split into self-contained services (e.g., core network services 215) as compared to components that provide all-encompassing network functions and protocols (e.g., modularization of network services/functionality across multiple core network services 215).

In this regard, the wireless communications system 200 may illustrate an example of a cloud-native platform configured to host a merger of CORE and RAN services, which may simplify protocols and reduce a duplication of processing operations across CORE and RAN (e.g., redistribution of CORE and RAN 210 services). In other words, the convergence of RAN 210 and CN functions may reduce repeated operations and functionality to serve one UE at different layers.

The wireless communications system 200 may extend benefits associated with the service-based architecture of the service-based network 205 to the RAN 210, including benefits of increased scalability, resiliency, elasticity, agility, reuse, visibility, automation, and failover. Additionally, the service-based architecture may enable each core network service 215 across RAN 210 and CORE to scale independently by increasing or decreasing resources allocated across the respective core network services 215 independently.

In some implementations, as will be described in further detail herein, the wireless communications system 200 may support signaling for handover procedures in the service-based network 205, such as a 6G network. In particular, aspects of the present disclosure are directed to signaling that enables the UE 115-*a* to perform handover procedures from one network entity 105 to another (or from one DU to another) in such a manner at to minimize disruptions to active core network services 215 at the UE 115-*a*.

Figure 3:
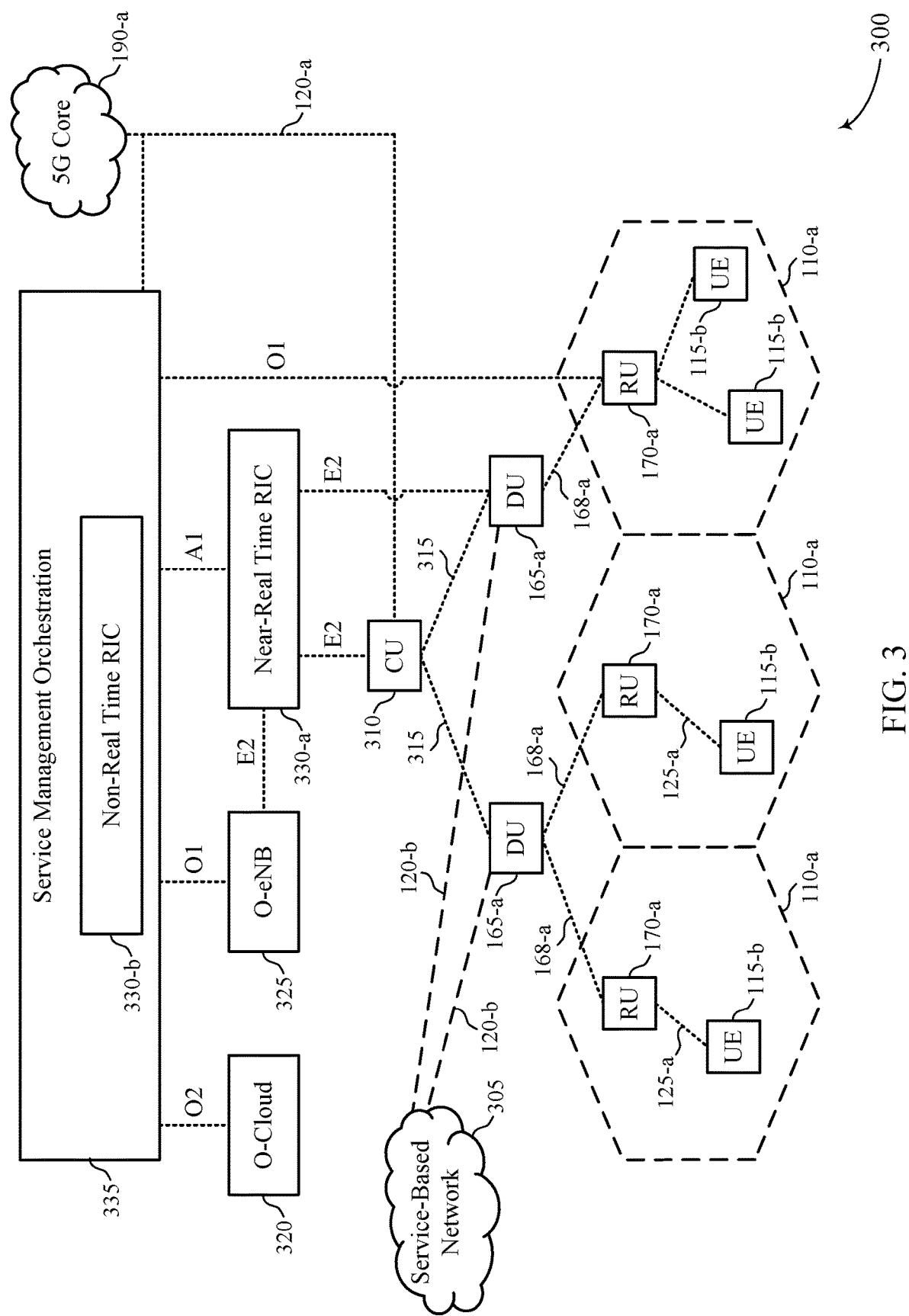
FIG. 3 illustrates an example of a network architecture that supports techniques for connected state mobility in a service-based wireless system in accordance with one or more aspects of the present disclosure.

FIG. 3 illustrates an example of a network architecture 300 (e.g., a disaggregated base station architecture, a disaggregated RAN architecture) that supports techniques for techniques for system information broadcast in a service-based wireless system in accordance with one or more aspects of the present disclosure. The network architecture 300 may illustrate an example for implementing one or more aspects of the wireless communications system 100. The network architecture 300 may include a service-based network 305, which may be an example of a service-based network 130 or 205, that communicates with DUs 165-*a* via links 120-*b*. In this example, DUs 165 may also communicate with one or more CUs 310 that may communicate directly with a 5G core 190-*a* via a backhaul communication link 120-*a*, or indirectly with the 5G core 190-*a* through one or more disaggregated network entities 105 (e.g., a Near-RT RIC 330-*a* via an E2 link, or a Non-RT RIC 330-*b* associated with an SMO 335 (e.g., an SMO Framework), or both). A CU 310 may communicate with one or more DUs 165-*a* via respective midhaul communication links 315 (e.g., an F1 interface). The DUs 165-*a* may communicate with one or more RUs 170-*a* via respective fronthaul communication links 168-*a*. The RUs 170-*a* may be associated with respective coverage areas 110-*a* and may communicate with UEs 115-*b* via one or more communication links 125-*a*. In some implementations, a UE 115-*b* may be simultaneously served by multiple RUs 170-*a*.

Each of the network entities 105 of the network architecture 300 (e.g., CUs 310, DUs 165-*a*, RUs 170-*a*, Non-RT RICs 330-*a*, Near-RT RICs 330-*b*, SMOs 335, Open Clouds (O-Clouds) 320, Open eNBs (O-eNBs) 325) may include one or more interfaces or may be coupled with one or more interfaces configured to receive or transmit signals (e.g., data, information) via a wired or wireless transmission medium. Each network entity 105, or an associated processor (e.g., controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (e.g., an RF transceiver) configured to receive or transmit signals, or both, over a wireless transmission medium to one or more of the other network entities 105.

In some examples, a CU 310 may host one or more higher layer control functions. Such control functions may include RRC, PDCP, SDAP, or the like. Each control function may be implemented with an interface configured to communicate signals with other control functions hosted by the CU 310. A CU 310 may be configured to handle user plane functionality (e.g., CU-UP), control plane functionality (e.g., CU-CP), or a combination thereof. In some examples, a CU 310 may be logically split into one or more CU-UP units and one or more CU-CP units. A CU-UP unit may communicate bidirectionally with the CU-CP unit via an interface, such as an E1 interface when implemented in an O-RAN configuration. A CU 310 may be implemented to communicate with a DU 165-a, as necessary, for network control and signaling.

A DU 165-a may correspond to a logical unit that includes one or more functions (e.g., base station functions, RAN functions) to control the operation of one or more RUs 170-a. In some examples, when interfacing with service-based network 305, a DU 165-a may host one or more APIs for one or more services of the service-based network 305 and one or more corresponding services at one or more UEs 115-b. In some examples, when interfacing with CUs 310, a DU 165-a may host, at least partially, one or more of an RLC layer, a MAC layer, and one or more aspects of a PHY layer (e.g., a high PHY layer, such as modules for FEC encoding and decoding, scrambling, modulation and demodulation, or the like) depending, at least in part, on a functional split, such as those defined by the 3rd Generation Partnership Project (3GPP). In some examples, a DU 165-a may further host one or more low PHY layers. Each layer may be implemented with an interface configured to communicate signals with other layers hosted by the DU 165-a, or with control functions hosted by a CU 310.

In some examples, lower-layer functionality may be implemented by one or more RUs 170-a. For example, an RU 170-a, controlled by a DU 165-a, may correspond to a logical node that hosts RF processing functions, or low-PHY layer functions (e.g., performing fast Fourier transform (FFT), inverse FFT (iFFT), digital beamforming, physical random access channel (PRACH) extraction and filtering, or the like), or both, based at least in part on the functional split, such as a lower-layer functional split. In such an architecture, an RU 170-a may be implemented to handle over the air (OTA) communication with one or more UEs 115-b. In some implementations, real-time and non-real-time aspects of control and user plane communication with the RU(s) 170-a may be controlled by the corresponding DU 165-a. In some examples, such a configuration may enable a DU 165-a and a CU 310 to be implemented in a cloud-based RAN architecture, such as a vRAN architecture.

The SMO 335 may be configured to support RAN deployment and provisioning of non-virtualized and virtualized network entities 105. For non-virtualized network entities 105, the SMO 335 may be configured to support the deployment of dedicated physical resources for RAN coverage requirements which may be managed via an operations and maintenance interface (e.g., an O1 interface). For virtualized network entities 105, the SMO 335 may be configured to interact with a cloud computing platform (e.g., an O-Cloud 320) to perform network entity life cycle management (e.g., to instantiate virtualized network entities 105) via a cloud computing platform interface (e.g., an O2 interface). Such virtualized network entities 105 can include, but are not limited to, CUs 310, DUs 165-a, RUs 170-a, and Near-RT RICs 330-a. In some implementations, the SMO 335 may communicate with components configured in accordance with a 4G RAN (e.g., via an O1 interface). Additionally, or alternatively, in some implementations, the SMO 335 may communicate directly with one or more RUs 170-a via an O1 interface. The SMO 335 also may include a Non-RT RIC 330-b configured to support functionality of the SMO 335.

The Non-RT RIC 330-b may be configured to include a logical function that enables non-real-time control and optimization of RAN elements and resources, Artificial Intelligence (AI) or Machine Learning (ML) workflows including model training and updates, or policy-based guidance of applications/features in the Near-RT RIC 330-a. The Non-RT RIC 330-b may be coupled to or communicate with (e.g., via an A1 interface) the Near-RT RIC 330-a. The Near-RT RIC 330-a may be configured to include a logical function that enables near-real-time control and optimization of RAN elements and resources via data collection and actions over an interface (e.g., via an E2 interface) connecting one or more CUs 310, one or more DUs 165-a, or both, as well as an O-eNB 325, with the Near-RT RIC 330-a.

In some examples, to generate AI/ML models to be deployed in the Near-RT RIC 330-b, the Non-RT RIC 330-b may receive parameters or external enrichment information from external servers. Such information may be utilized by the Near-RT RIC 330-a and may be received at the SMO 335 or the Non-RT RIC 330-b from non-network data sources or from network functions. In some examples, the Non-RT RIC 330-b or the Near-RT RIC 330-a may be configured to tune RAN behavior or performance. For example, the Non-RT RIC 330-b may monitor long-term trends and patterns for performance and employ AI or ML models to perform corrective actions through the SMO (e.g., reconfiguration via O1) or via generation of RAN management policies (e.g., A1 policies).

In some implementations, as will be described in further detail herein, the network architecture 300 may support signaling for handover procedures in the service-based wireless system. In particular, aspects of the present disclosure are directed to signaling that enables UEs 115 to perform handover procedures from one network entity 105 to another (or from one DU 165 to another) in such a manner at to minimize disruptions to active core network services at the UEs 115.

Figure 4:
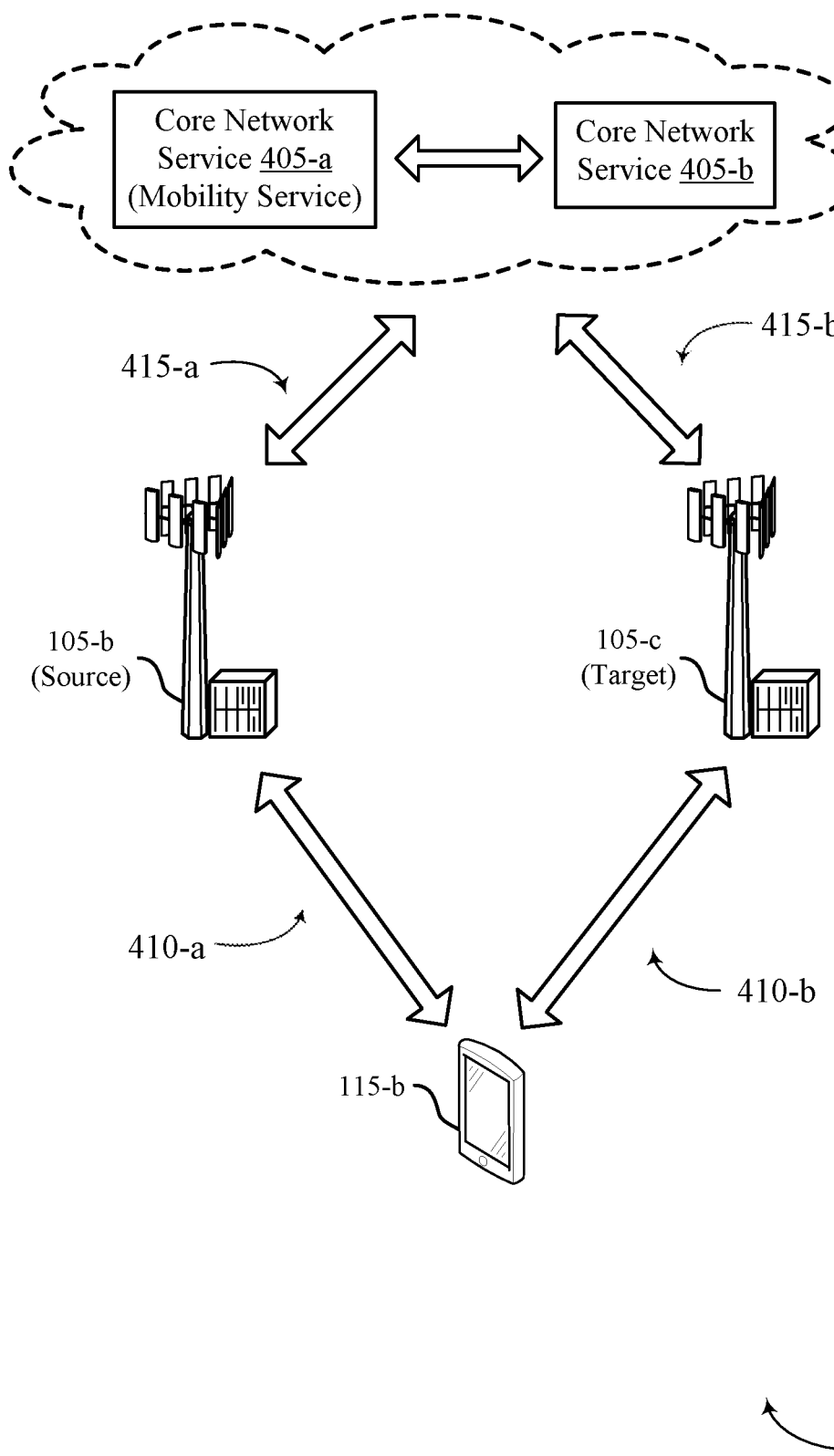
FIG. 4 illustrates an example of a wireless communications system that supports techniques for connected state mobility in a service-based wireless system in accordance with one or more aspects of the present disclosure.

FIG. 4 illustrates an example of a wireless communications system 400 that supports techniques for connected state mobility in a service-based wireless system in accordance with one or more aspects of the present disclosure. In some examples, aspects of the wireless communications system 400 may implement, or be implemented by, aspects of the wireless communications system 100, the wireless communications system 200, the network architecture 300, or any combination thereof. In particular, the wireless communications system 400 may support signaling, configurations, and other mechanisms which enable UEs 115 to perform handover procedures from one network entity 105 to another (or from one DU to another) in such a manner at to minimize disruptions to active core network services 405 at the UEs 115, as described with respect to FIG. 1.

The wireless communications system 400 may include a UE 115-*b*, a first network entity 105-*b* (e.g., source network entity 105-*b*), a second network entity 105-*c* (e.g., target network entity 105-*c*), a first core network service 405-*a*, and a second core network service 405-*b*. In some implementations, the network entities 105-*b*, 105-*c* may include examples of O-RAN entities which include multiple components, such as one or more DUs, as shown and described in FIG. 3. In this regard, the network entities 105-*b*, 105-*c* illustrated in FIG. 4 may additionally or alternatively be referred to as DUs or eDUs (e.g., first/source DU, second/target DU).

The first core network service 405-*a* and the second core network service 405-*b* may be associated with a service-based network, such as the service-based network 205 illustrated in FIG. 2. In some aspects, the service-based network including the core network services 405-*a*, 405-*b* may be configured to communicate or interface with a RAN of the wireless communications system 400, where the RAN includes the one or more network entities (e.g., first network entity 105-*b*, second network entity 105-*c*). In some implementations, the core network services 405-*a*, 405-*b* may be associated with, or hosted by, a cloud platform, where the respective core network services 405 are hosted at respective network addressees in the cloud platform.

The UE 115-*b* may communicate with the respective network entities 105 using communication links 410 (e.g., first communication link 410-*a*, second communication link 410-*b*), which may be an example of NR, LTE, or 6G links between the UE 115-*b* and the respective network entities 105. In some cases, the communication links 410 may include examples of an access links (e.g., Uu links) which may include bi-directional links that enable both uplink and downlink communication. Similarly, the network entities 105 of the RAN may be configured to communicate with (e.g., interface with) the core network services 405 of the service-based network via communication links 415-*a*, 415-*b*, where the communication links 415 may be configured to facilitate bi-directional communications between the respective network entities 105 and each of the respective core network services 405. In some aspects, each core network service 405-*a*, 405-*b* may include a respective API configured to facilitate wireless communications with the network entities 105 and the UE 115-*b*, such as the network service APIs 180 illustrated in FIG. 1.

In some aspects, the network entities 105 (e.g., DUs, eDUs) may facilitate traffic routing (e.g., service data unit routing) from the UE 115-*b* to the core network services 405, and vice versa. In other words, the network entities 105 may be configured to relay communications (e.g., service messages) from the UE 115-*b* to the core network services 405, and vice versa. The network entities 105 may facilitate traffic routing between the respective devices directly, via other network entities 105, via proxy, or any combination thereof.

In the context of a service-based wireless system, the UE 115-*b* may subscribe to various core network services 405 offered by the service-based network. However, as the UE 115-*b* moves around within the network, the UE 115-*b* may perform handover procedures from one cell to another and/or from one network entity 105 to another (e.g., handover from the first network entity 105-*b* to the second network entity 105-*c*). In the context of service-based networks, such as a 6G network, performance of handovers between network entities 105 may disrupt ongoing communications between the UE 115-*b* and core network services 405 to which the UE 115-*b* subscribes (e.g., disrupt active core network services 405).

Accordingly, the wireless communications system 400 may support signaling for handover procedures in a service-based network. In particular, the wireless communications system 400 may support signaling that enables the UE 115-*b* to perform a handover procedure from the first network entity 105-*b* (e.g., source DU) to the second network entity 105-*c* (e.g., target DU) in such a manner at to minimize disruptions to active core network services 405 at the UE 115-*a*.

In some implementations, the service-based network may offer or support a mobility service (e.g., core network mobility service) that controls and handles mobility and connectivity management for UEs 115 within the wireless communications system 400. For example, the first core network service 405-*a* may include a mobility service, where UEs 115 which move around within the network subscribe to the mobility service so that the mobility service can manage handover procedures and connectivity for the UEs 115 as the UEs 115 move around within the network.

In some aspects, the mobility service (e.g., first core network service 405-*a*) may maintain UE context information related to mobility when the UE 115-*b* is connected to the network. For example, the mobility service may maintain access and roaming restrictions (e.g., mobility restriction list), which may include a list of the list of public land mobile networks (PLMNs), radio access technologies (RATs) within each PLMN, and respective service areas that the UE 115-*b* can or cannot access. In some aspects, the mobility service may maintain or receive information from a UE subscription services to determine the access and roaming restrictions for the UE 115-*b*. In this regard, network elements such as eDU, a mobility service (e.g., core network mobility service), a capabilities service (e.g., core network capabilities service), and a UE subscription service (e.g., core network subscription service) may be offered by a service-based network and/or implemented in a cloud platform.

In some aspects, in order to facilitate mobility and handovers of the UE 115-*b* within the network, the mobility service may store or retrieve capability information associated with mobility at the UE 115-*b* from the UE 115-*b*, the first network entity 105-*b*, and/or another core network service 405, such as a core network capabilities service. Capabilities that may be reported by the UE 115-*b* and/or maintained at a core network service 405 (e.g., mobility service and/or a capability service) may include radio access capabilities related to mobility (e.g., capabilities for each supported RAT).

In some aspects, subscription-notification mechanisms may be used by the mobility service and the source network entity 105-*b* to obtain access and roaming restrictions and UE radio access capabilities related to mobility and Access Stratum (AS) protocol layer configuration from the UE subscription and capabilities services. For example, a capabilities service (e.g., core network service 405) may maintain UE radio access capabilities related to AS protocol layer configurations, and the mobility service may retrieve the UE capabilities from the capabilities service (e.g., by subscribing, notifying, or querying the capabilities service).

The source network entity 105-*b* (e.g., source eDU communicatively coupled to the UE 115-*b*) may be configured to obtain UE-related capabilities (e.g., from the UE 115-*b*, the mobility service, the capability service, etc.) and determine the RLC, MAC, and PHY layer configurations for the UE 115-*b* when the UE 115-*b* operates in a serving cell supported by the first network entity 105-*b*.

In some aspects, both the UE 115-*b* and the source network entity 105-*b* may be aware of the connectivity state of the UE 115-*b* (e.g., whether the UE is connected to the network (eDU) or not). That is, the UE 115-*b* and the source network entity 105-*b* may be configured to maintain connectivity state information for the UE 115-*b*. For example, the source network entity 105-*b* may maintain a list of all UEs 115 that are currently connected to the network entity 105-*b*, and may additionally maintain a list of all UEs 115 that have been previously connected to the network entity 105-*b*.

For each UE 115 connected to the network (and/or for each UE 115 that subscribes to the mobility service), the mobility service may maintain information regarding the network entity 105 (e.g., DU, eDU) and the cell(s) supported by the network entities 105 that are serving the respective UEs 115. In other words, for each UE 115 in the network (or for each UE 115 that subscribes to the mobility service), the mobility service may maintain historical mobility information associated with past and current network entities 105, DUs, serving cells, etc., to which the UE 115 has been connected. The mobility service may also maintain (e.g., store) load information associated with network entities or cells (e.g., quantity of UEs 115 supported by each network entity 105 or serving cell), traffic load associated with each such UE 115, and the like. As will be described in further detail herein, such historical mobility information, load information, and the like, may be used by the mobility service (e.g., first core network service 405-*a*) to select target cells/DUs/network entities 105 to which the UE 115-*b* will be handed over to.

An example may prove to be illustrative. Referring to the wireless communications system 400 illustrated in FIG. 4, the UE 115-*b* may perform communications with the first network entity 105-*b*. For example, the UE 115-*b* may communicate, via the first network entity 105-*b*, service messages with one or more core network services 405 that are active at the UE 115-*b*, where the core network services 405 are offered by a service-based network. In other words, the first network entity 105-*b* may relay service messages between the UE 115-*b* and the one or more core network services 405 that are active at the UE 115-*b*.

The UE 115-*b* may establish communications with the mobility service (e.g., first core network service 405-*a*). In other words, the UE 115-*b* may subscribe to the mobility service so that the mobility service can manage mobility and connectivity management (e.g., manage handover procedures) for the UE 115-*b* within the wireless communications system 400. For example, the UE 115-*b* may transmit, to a network address associated with the mobility service (e.g., first core network service 405-*a*), a service request for establishing service with the mobility service, and may receive control signaling indicating a service context for communicating with the mobility service based on the service request. The service context may include various communications parameters for communicating with the mobility service. In this example, the first network entity 105-*b* may relay the respective communications between the UE 115-*b* and the mobility service. Moreover, subsequent communications between the UE 115-*b* and the mobility service 605 may be performed in accordance with the service context.

In some aspects, the UE 115-*b* may transmit capability information associated with the UE 115-*b* to the first network entity 105-*b*, the mobility service, an additional core network service 405 (e.g., a core network capabilities service), or any combination thereof. Capability information may include supported RATs, capabilities related to AS protocol layer configurations, PLMNs and/or serving cells that the UE 115-*b* is or is not able to access, etc. Similarly, the first network entity 105-*b*, the second network entity 105-*c*, or both, may transmit capability information to the mobility service, another core network service 405 (e.g., a core network capabilities service), or both. Capability information associated with the network entities 105 may include core network services that are supported by the respective network entities 105 (e.g., each eDU may provide information on the overall set of services/slices that it supports).

In cases where the UE 115-*b* and/or the network entities 105 transmit the capability information to a capabilities service (e.g., core network capabilities service), the mobility service 605 may be configured to retrieve the capability information from the capabilities service in order to facilitate handover procedures for the UE 115-*b*. As noted previously herein, such capability information may be used by the mobility service 605 to select target network entities 105 and/or target cells for the UE 115-*b*.

In some implementations, the UE 115-*b* may be configured with a measurement configuration including one or more trigger conditions associated with performance of handover procedures at the UE 115-*b*. The measurement configuration may be related to mobility for both the source eDU (e.g., first network entity 105-*b*) and the UE 115-*b*. By way of another example, the UE 115-*b* may be configured with a measurement configuration for cell-level (e.g., Layer 3 (L3)) measurements, where the L3 reports may be transmitted to the first network entity 105-*b* and/or mobility service. Moreover, the first network entity 105-*b* and/or the mobility service may make handover decisions based on the received cell-level (e.g., L3) measurement reports.

In some aspects, the measurement configuration may be configured by the first network entity 105-*b*, the mobility service (e.g., first core network service 405-*a*), or both. Moreover, handover decisions for the UE 115-*b* may be made by the first network entity 105-*b*, the mobility service (e.g., first core network service 405-*a*), or both. In other words, there may be two (or more) alternative approaches for inter-eDU handover depending on whether mobility service or the source eDU configures the measurement configuration, processes measurement reports, and makes handover decisions. Two separate approaches for inter-eDU handover will be further shown and described with reference to FIGS. 5 and 6.

In some aspects, the measurement configuration may include or indicate a configuration of downlink reference signals that the UE 115-*b* should measure for mobility purposes (e.g., for determination of handover procedures), and a configuration of uplink reference signals that the first network entity 105-*b* should measure for mobility purposes. Additionally, the measurement configuration may indicate measurement gaps, and trigger conditions (e.g., event triggers) for reporting measurement reports if a trigger condition is satisfied.

In cases where the mobility service configures the measurement configuration, the mobility service (e.g., core network mobility service, or first core network service 405-*a*) may be configured to use the stored UE context information (e.g., UE 115-*b* capability information, access and mobility restrictions, etc.) to determine and configure the measurement configuration. In some cases, the measurement configuration (e.g., measurement reporting) may take the form of a subscribe-notify mechanism, where subscription to the mobility service and mobility-related reporting events is defined, and, if trigger condition for handover is satisfied, the source eDU or the UE 115-b notifies to the mobility service.

In some aspects, the UE 115-b, the first network entity 105-b, or both, may perform measurements on signals (e.g., reference signals) in accordance with the measurement configuration. In particular, the UE 115-b and/or the first network entity 105-b may perform measurements on received reference signals in order to identify a satisfaction of a trigger condition for a handover procedure, where the trigger conditions may be identified by the measurement configuration.

The UE 115-b may transmit a measurement report to the first network entity 105-b and/or the mobility service. The UE 115-b may transmit the measurement report in accordance with the measurement configuration received. For example, the UE 115-b may transmit the measurement report according to a defined periodicity or frequency, based on a satisfaction of a trigger condition, or both. In some cases, the measurement report may indicate a satisfaction of a trigger condition for performing a handover procedure.

Subsequently, the first network entity 105-b, the mobility service, or both, may perform a handover decision. In particular, the first network entity 105-b and/or the mobility service may be configured to receive and process the measurement or event reports (e.g., event report indicating a satisfaction of a trigger condition) from the UE 115-b in order to make a handover decision (e.g., determine whether or not to initiate a handover procedure at the UE 115-b).

In cases where the network entity 105-b makes the handover decision, the first network entity 105-b may transmit a handover request to the mobility service. The handover request message may indicate candidate target network entities 105. For example, the UE 115-b may measure reference signals received from multiple candidate target network entities 105 (e.g., the second network entity 105-c), and may indicate one or more of the candidate target network entities 105 in the measurement report, where the first network entity 105-b relays the indication of the candidate target network entities 105 via the handover request message. The handover request message (or other message indicating a satisfaction of a trigger condition for handovers) may indicate a list of core network services 405 that are currently active at the UE 115-b. Such information may enable the mobility service to perform handover decisions and/or select target network entities 105/target DUs/target cells for a potential handover procedure.

Once a handover decision has been made, the mobility service may select a target network entity 105 to which the UE 115-b will be handed over. For example, as shown in FIG. 4, the mobility service (e.g., core network mobility service, or first core network service 405-a) may select the second network entity 105-c as the target for a handover procedure at the UE 115-b. Further, in some aspects, the mobility service may select a serving cell of the second network entity 105-c to which the UE 115-b will be handed over.

The mobility service may select the target network entity 105-c and/or target serving cell for the handover procedure based on a number of parameters or factors including, but not limited to, the capability information associated with the UE 115-b, active core network services 405 at the UE 115-b (e.g., core network services 405 that the target network entity 105 supports), an indication of candidate target network entities 105 indicated via the handover request, a mobility history of the UE 115-b, a traffic load associated with the candidate network entities 105 and/or target serving cells, or any combination thereof. For example, the mobility service may select a target network entity 105 (e.g., second network entity 105-c) that supports at least one core network service 405 that is currently active at the UE 115-b.

In some aspects, the mobility service may transmit a handover request to the second network entity 105-c. The mobility service may transmit the handover based on selecting the second network entity 105-c as the target for a handover procedure. In some implementations, the handover request may indicate the set of core network services 405 that are active at the UE 115-b, the access and roaming access restrictions information associated with the UE 115-b, or both.

In some implementations, the second network entity 105-c may perform admission control to determine which of the active core network services 405 at the UE 115-b are supported by the second network entity 105-c (e.g., determine list of accepted services among those indicated in the handover request). For example, in the case of a slice, the list of active core network services 405 that the second network entity 105-c may accept/support may be based on the QoS requirements of the flows associated with the slice.

The mobility service may receive an acknowledgment (ACK) message from the second network entity 105-c based on (e.g., in response to) the handover request. In some implementations, the ACK message may indicate one or more active core network services 405 at the UE 115-b that are supported and/or accepted by the second network entity 105-c. In other words, the ACK message may indicate a list of accepted/supported core network services 405.

In some aspects, the second network entity 105-c may indicate a communication configuration for communications with the second network entity 105-c in the ACK message (e.g., for relay to the UE 115-b). For example, the target network entity 105-c may determines a target cell AS protocol layer configuration and a configuration(s) related to the accepted core network services 405, and indicate such configurations to the mobility service. In such cases, the mobility service may determine a measurement configuration for the target network entity 105-c and/or target cell for mobility purposes (e.g., a new measurement configuration for the target cell).

In alternative implementations, the second network entity 105-c may reject the handover request (e.g., transmit a NACK message). For example, the second network entity 105-c may reject the handover request in cases where the second network entity 105-c does not support any core network services 405 that are currently active at the UE 115-b. In such cases, the mobility service may reselect a new target for the handover procedure and transmit a new handover request to the newly selected target.

Subsequently, the mobility service may transmit a handover command to the first network entity 105-b and/or the UE 115-b (e.g., for relay to the UE 115-b), along with an instruction for the UE 115-b to perform the handover procedure from the first network entity 105-b to the second network entity 105-c. The handover command may include various information associated with the second network entity 105-c including, but not limited to, an identifier associated with the second network entity 105-c and/or a serving cell (e.g., target cell) supported by the second network entity 105-c, communication parameters for communicating with the second network entity 105-c (e.g., communication configuration, such as a target cell AS protocol layer configuration), the list of core network services 405 that are active at the UE 115-b and supported/ accepted by the second network entity 105-c, the new measurement configuration associated with the second network entity 105-c, and the like.

In some aspects, the first network entity 105-b and the second network entity 105-c may establish a communication tunnel (e.g., IP tunnel) between the respective devices. In some aspects, the communication tunnel may be configured for relaying data packets intended for the UE 115-b between the respective devices during the performance of the handover procedure. In other words, during handover execution, direct forwarding may be performed from the source eDU to the target eDU on the established IP tunnel for flows for which data forwarding applies.

For example, during execution of the handover procedure (e.g., prior to completion), the first network entity 105-b may receive a message from a core network service 405, and may relay one or more packets associated to the second network entity 105-c via the communication tunnel based on (e.g., in response to) receiving the message so that the second network entity 105-c may relay the data packets to the UE 115-b after (or during) performance of the handover procedure.

The UE 115-b may establish communications with the second network entity 105-c. The UE 115-b may establish communications with the second network entity 105-c based on receiving the handover command (e.g., in accordance with information included within the handover command). Subsequently, the second network entity 105-c may transmit a message to the mobility service that indicates a completion of the handover procedure. For example, the target eDU (e.g., second network entity 105-c) may indicate the target cell ID to the mobility service upon completion of the handover. In some cases, the mobility service may provide a notification to other core network services 405 (e.g., other core network services 405 that are active at the UE 115-b) of the completed handover procedure. Additionally, upon handover completion, the target eDU may request the access gateway (e.g., UPF), to switch the path to the target eDU.

The UE 115-b may perform communications with the second network entity 105-c upon completion of the handover procedure. For example, the UE 115-b may communicate, via the second network entity 105-c, service messages with one or more core network services 405 that are active at the UE 115-b. In other words, the first network entity 105-b may relay service messages between the UE 115-b and the one or more core network services 405 that are active at the UE 115-b.

Techniques described herein may enable the UE 115-b to perform handover procedures between DUs and/or between network entities 105 of a service-based wireless system while minimizing disruptions to active core network services 405 at the UE 115-c. In particular, aspects of the present disclosure support techniques which enable the UE 115-b to perform handover procedures to target DUs/target network entities 105 which support at least some of the active core network services 405 at the UE 115-b. As such, aspects, of the present disclosure may reduce interruptions to communications performed with core network services 405, thereby preventing the need for the UE 115-b to continually re-establish communications with core network services 405. In this regard, techniques described herein may reduce signaling associated with the UE 115-b subscribing to core network services 405, reduce interruptions, and improve overall user experience.

Figure 5:
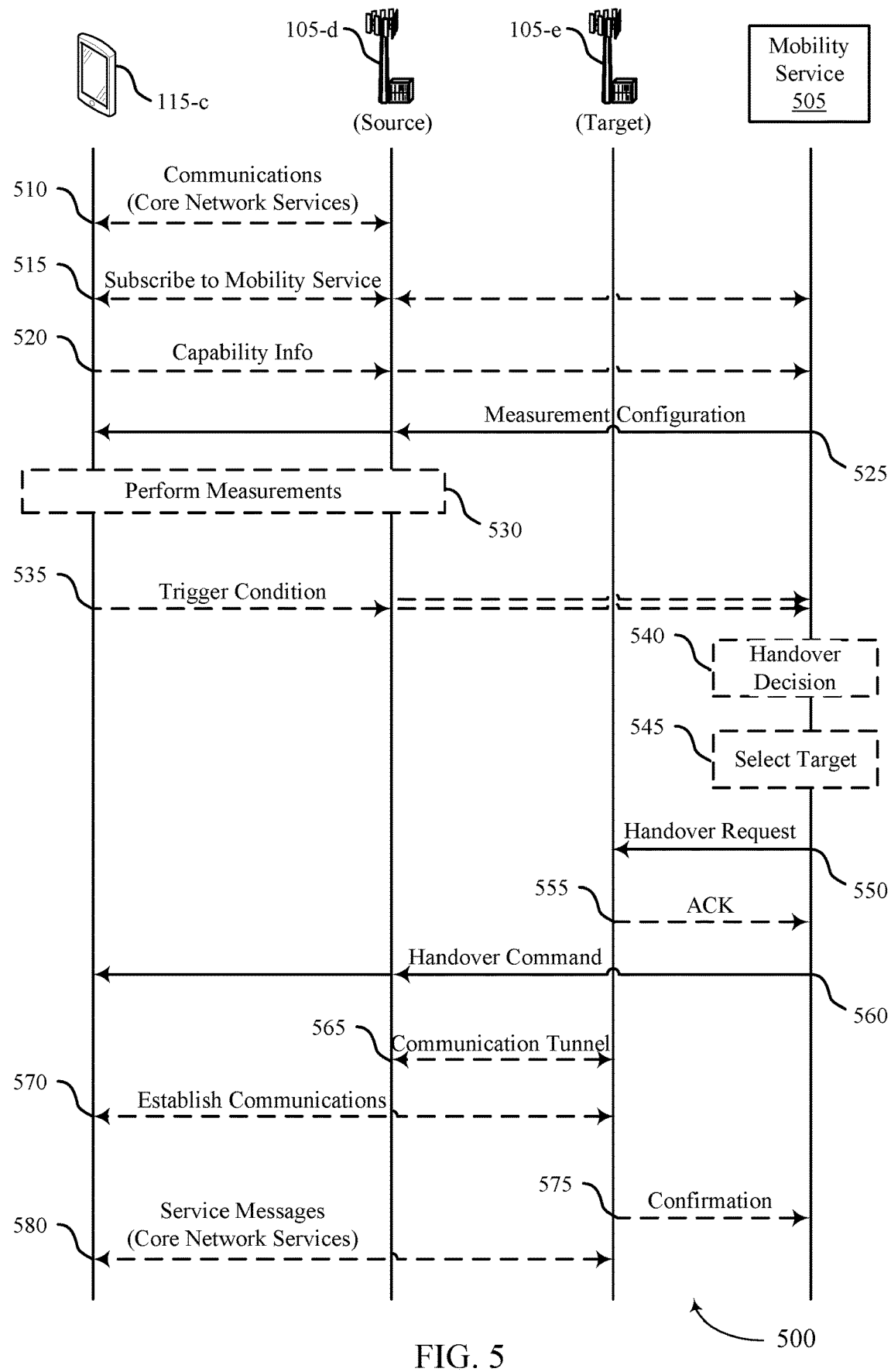
FIG. 5 illustrates an example of a process flow that supports techniques for connected state mobility in a service-based wireless system in accordance with one or more aspects of the present disclosure.

FIG. 5 illustrates an example of a process flow 500 that supports techniques for connected state mobility in a service-based wireless system in accordance with one or more aspects of the present disclosure. In some examples, aspects of the process flow 500 may implement, or be implemented by, aspects of the wireless communications system 100, the wireless communications system 200, the network architecture 300, the wireless communications system 400, or any combination thereof. In particular, the process flow 500 illustrates signaling that enables a UE 115-c to perform handover procedures from one network entity 105 to another (or from one DU to another) in such a manner at to minimize disruptions to active core network services at the UE 115-c, as described with reference to FIGS. 1-4, among other aspects.

The process flow 500 may include a UE 115-c, a first network entity 105-d (e.g., source network entity 105-d), a second network entity 105-e (e.g., target network entity 105-e), and a mobility service 505 (e.g., core network service, or core network mobility service), which may be examples of UEs 115, network entities 105, core network services, and other wireless devices described with reference to FIGS. 1-4. In some aspects, the mobility service 505 may controls and handle mobility and connectivity management for UEs 115 within the wireless communications system.

In some aspects, the mobility service 505 may be included within a set of services offered or provided by a service-based network, such as the service-based network 205 illustrated in FIG. 2. In such cases, the service-based network including the mobility service 505 may be configured to interface with (e.g., communicate with) a RAN including the network entities 105-d, 105-e (e.g., DUs, eDUs) in order to facilitate communications between the service-based network and the UE 115-c. In this regard, the signaling illustrated in FIG. 5 may include example signaling within a network with a service-based architecture, such as a 6G system.

In some examples, the operations illustrated in process flow 500 may be performed by hardware (e.g., including circuitry, processing blocks, logic components, and other components), code (e.g., software) executed by a processor, or any combination thereof. Alternative examples of the following may be implemented, where some steps are performed in a different order than described or are not performed at all. In some cases, steps may include additional features not mentioned below, or further steps may be added.

At 510, the UE 115-c may perform communications with the first network entity 105-d. For example, the UE 115-c may communicate, via the first network entity 105-d, service messages with one or more core network services that are active at the UE 115-c, where the core network services are offered by a service-based network. In other words, the first network entity 105-d may relay service messages between the UE 115-c and the one or more core network services that are active at the UE 115-c.

At 515, the UE 115-c may establish communications with the mobility service 505 (e.g., core network mobility service). In other words, the UE 115-c may subscribe to the mobility service 505 so that the mobility service 505 can manage mobility and connectivity management (e.g., manage handover procedures) for the UE 115-c within the wireless communications system.

For example, the UE 115-c may transmit, to a network address associated with the mobility service 505, a service request for establishing service with the mobility service 505, and may receive control signaling indicating a service context for communicating with the mobility service 505 based on the service request. In this example, the first network entity 105-d may relay the respective communications between the UE 115-c and the mobility service. Moreover, subsequent communications between the UE 115-c and the mobility service 505 may be performed in accordance with the service context.

At 520, the UE 115-c may transmit capability information associated with the UE 115-c to the first network entity 105-d, the mobility service 505, an additional core network service (e.g., a core network capabilities service), or any combination thereof. Capability information may include supported RATs, capabilities related to AS protocol layer configurations, PLMNs and/or serving cells that the UE 115-c is or is not able to access, etc.

In cases where the UE 115-c transmits the capability information to a capabilities service (e.g., core network capabilities service), the mobility service 505 may be configured to retrieve the capability information from the capabilities service in order to facilitate handover procedures for the UE 115-c. As noted previously herein, such capability information may be used by the mobility service 505 to select target network entities 105 and/or target cells for the UE 115-c.

At 525, the UE 115-c may receive, from the mobility service 505 (and via the first network entity 105-d), a measurement configuration indicating one or more trigger conditions associated with performance of handover procedures at the UE 115-c. The measurement configuration may be related to mobility for both the source eDU (e.g., first network entity 105-d) and the UE 115-c.

In some aspects, the measurement configuration may include or indicate a configuration of downlink reference signals that the UE 115-c should measure for mobility purposes (e.g., for determination of handover procedures), and a configuration of uplink reference signals that the first network entity 105-d should measure for mobility purposes. Additionally, the measurement configuration may indicate measurement gaps, and trigger conditions (e.g., event triggers) for reporting measurement reports if a trigger condition is satisfied.

At 530, the UE 115-c, the first network entity 105-d, or both, may perform measurements on signals (e.g., reference signals) in accordance with the measurement configuration received at 525. In particular, the UE 115-c and/or the first network entity 105-d may perform measurements on received reference signals in order to identify a satisfaction of a trigger condition for a handover procedure, where the trigger conditions may be identified by the measurement configuration.

For example, the UE 115-c may perform measurements on reference signals received from the first network entity 105-d and other potential target network entities 105 (e.g., second network entity 105-e) in accordance with the measurement configuration in order to facilitate handover determinations. Moreover, the first network entity 105-d may perform measurements on uplink reference signals received from the UE 115-c in accordance with the measurement configuration to facilitate handover determinations. In some aspects, the UE 115-c may identify a trigger condition for a handover procedure if a quality, strength, or performance of reference signals from the first network entity 105-d fail to satisfy a threshold, if a quality, strength, or performance of reference signals from the second network entity 105-e satisfy an additional threshold, or both. Similarly, the first network entity 105-d may identify a trigger condition for a handover procedure if a quality, strength, or performance of reference signals from the UE 115-c fail to satisfy a threshold.

At 535, the UE 115-c, the first network entity 105-d, or both, may transmit a message to the mobility service 505 which indicates a satisfaction of a trigger condition for performance of a handover procedure. In this regard, the UE 115-c and/or the first network entity 105-d may transmit the message at 535 based on receiving the measurement configuration at 525, performing the measurements at 530, identifying a satisfaction of a trigger condition based on the measurements, or any combination thereof.

In some aspects, the message indicating the trigger condition may additionally or alternatively indicate candidate target network entities 105. For example, the UE 115-c may measure reference signals received from multiple candidate target network entities 105 (e.g., the second network entity 105-e), and may indicate one or more of the candidate target network entities 105 in the message/event report (e.g., indicate candidate network entities 105 that exhibit sufficient performance).

Additionally, or alternatively, the UE 115-c and/or the first network entity 105-d may indicate, via the message at 535, a list of core network services that are currently active at the UE 115-c. Such information may enable the mobility service 505 to perform handover decisions and select target network entities 105/target DUs/target cells for a potential handover procedure.

At 540, the mobility service 505 may perform a handover decision. In particular, the mobility service 505 may be configured to receive and process the measurement or event reports (e.g., event report indicating a satisfaction of a trigger condition) from the UE 115-c and/or the first network entity 105-d in order to make a handover decision (e.g., determine whether or not to initiate a handover procedure at the UE 115-c).

At 545, in cases where the mobility service 505 determines to trigger a handover procedure, the mobility service 505 may select a target network entity 105 to which the UE 115-c will be handed over. For example, as shown in FIG. 5, the mobility service 505 may select the second network entity 105-e as the target for a handover procedure at the UE 115-c. Further, in some aspects, the mobility service 505 may select a serving cell of the second network entity 105-e to which the UE 115-c will be handed over.

The mobility service 505 may select the target network entity 105-e and/or target serving cell for the handover procedure based on a number of parameters or factors including, but not limited to, the capability information associated with the UE 115-c received at 520, active core network services at the UE 115-c (e.g., core network services that the target network entity 105 supports), an indication of candidate target network entities 105 indicated in an event report/measurement report at 535, a mobility history of the UE 115-c, a traffic load associated with the candidate network entities 105 and/or target serving cells, or any combination thereof.

For example, the mobility service 505 may select a target network entity 105 (e.g., second network entity 105-e) that supports at least one core network service that is currently active at the UE 115-c. Moreover, in cases where multiple candidate network entities 105 support one or more core network services that are active at the UE 115-c, the mobility service 505 may select the network entity 105 that supports the highest proportion of active core network services at the UE 115-c. By way of another example, in cases where the message indicating the trigger condition at 535 indicates a set of candidate network entities 105, the mobility service 505 may select one of the candidate network entities 105 (and a serving cell supported by the selected network entity 105).

At 550, the mobility service 505 may transmit a handover request to the second network entity 105-*e* (e.g., the selected target network entity 105-*e*). The mobility service 505 may transmit the handover request at 550 based on selecting the second network entity 105-*e* as the target for a handover procedure at 545. In some implementations, the handover request may indicate the set of core network services that are active at the UE 115-*c*.

In some implementations, the second network entity 105-*e* may perform admission control to determine which of the active core network services at the UE 115-*c* are supported by the second network entity 105-*e* (e.g., determine list of accepted services among those indicated in the handover request). For example, in the case of a slice, the list of active core network services that the second network entity 105-*e* may accept/support may be based on the QoS requirements of the flows associated with the slice.

At 555, the mobility service 505 may receive an ACK message from the second network entity 105-*e*. The mobility service 505 may receive the ACK message from the second network entity 105-*e* based on (e.g., in response to) the handover request at 550. In some implementations, the ACK message may indicate one or more active core network services at the UE 115-*c* that are supported and/or accepted by the second network entity 105-*e*. In other words, the ACK message may indicate a list of accepted/supported core network services.

In some aspects, the second network entity 105-*e* may indicate a communication configuration for communications with the second network entity 105-*e* in the ACK message (e.g., for relay to the UE 115-*c*). For example, the target network entity 105-*e* may determines a target cell AS protocol layer configuration and a configuration(s) related to the accepted core network services, and indicate such configurations to the mobility service 505. In such cases, the mobility service 505 may determine a measurement configuration for the target network entity 105-*e* and/or target cell for mobility purposes (e.g., a new measurement configuration for the target cell, as shown and described at 525).

In alternative implementations, the second network entity 105-*e* may reject the handover request (e.g., transmit a NACK message). For example, the second network entity 105-*e* may reject the handover request in cases where the second network entity 105-*e* does not support any core network services that are currently active at the UE 115-*c*. In such cases, the mobility service 505 may reselect a new target for the handover procedure and transmit a new handover request to the newly selected target.

At 560, the mobility service 505 may transmit a handover command to the first network entity 105-*d* and/or the UE 115-*c* (e.g., for relay to the UE 115-*c*), along with an instruction for the UE 115-*c* to perform the handover procedure from the first network entity 105-*d* to the second network entity 105-*e*. The mobility service 505 may transmit the handover command based on performing the handover decision at 540, selecting the target cell/network entity 105-*e* at 545, transmitting the handover request at 550, receiving the ACK message at 555, or any combination thereof.

The handover command may include various information associated with the second network entity 105-*e* including, but not limited to, an identifier associated with the second network entity 105-*e* and/or a serving cell (e.g., target cell) supported by the second network entity 105-*e*, communication parameters for communicating with the second network entity 105-*e* (e.g., communication configuration, such as a target cell AS protocol layer configuration), the list of core network services that are active at the UE 115-*c* and supported/accepted by the second network entity 105-*e*, the new measurement configuration associated with the second network entity 105-*e*, and the like.

At 565, the first network entity 105-*d* and the second network entity 105-*e* may establish a communication tunnel (e.g., IP tunnel) between the respective devices. In some aspects, the communication tunnel may be configured for relaying data packets intended for the UE 115-*c* between the respective devices during the performance of the handover procedure. In other words, during handover execution, direct forwarding may be performed from the source eDU to the target eDU on the established IP tunnel for flows for which data forwarding applies.

For example, during execution of the handover procedure (e.g., prior to completion), the first network entity 105-*d* may receive a message from a core network service, and may relay one or more packets associated with the message to the second network entity 105-*e* via the communication tunnel so that the second network entity 105-*e* may relay the data packets to the UE 115-*c* after (or during) performance of the handover procedure.

At 570, the UE 115-*c* may establish communications with the second network entity 105-*e*. The UE 115-*c* may establish communications with the second network entity 105-*e* based on receiving the handover command (e.g., in accordance with information included within the handover command).

At 575, the second network entity 105-*e* may transmit a message to the mobility service 505 that indicates a completion of the handover procedure. For example, the target eDU (e.g., second network entity 105-*e*) may indicate the target cell ID to the mobility service 505 upon completion of the handover. In some cases, the mobility service 505 may provide a notification to other core network services (e.g., other core network services that are active at the UE 115-*c*) of the completed handover procedure. Additionally, upon handover completion, the target eDU may request the access gateway (e.g., UPF), to switch the path to the target eDU.

At 580, the UE 115-*c* may perform communications with the second network entity 105-*e*. For example, the UE 115-*c* may communicate, via the second network entity 105-*e*, service messages with one or more core network services that are active at the UE 115-*c*. In other words, the first network entity 105-*d* may relay service messages between the UE 115-*c* and the one or more core network services that are active at the UE 115-*c*. The UE 115-*c* may communicate with the second network entity 105-*e* (and active core network services) at 580 based on receiving the handover command at 560, establishing communications at 570, transmitting the confirmation of the handover procedure at 575, or any combination thereof.

Figure 6:
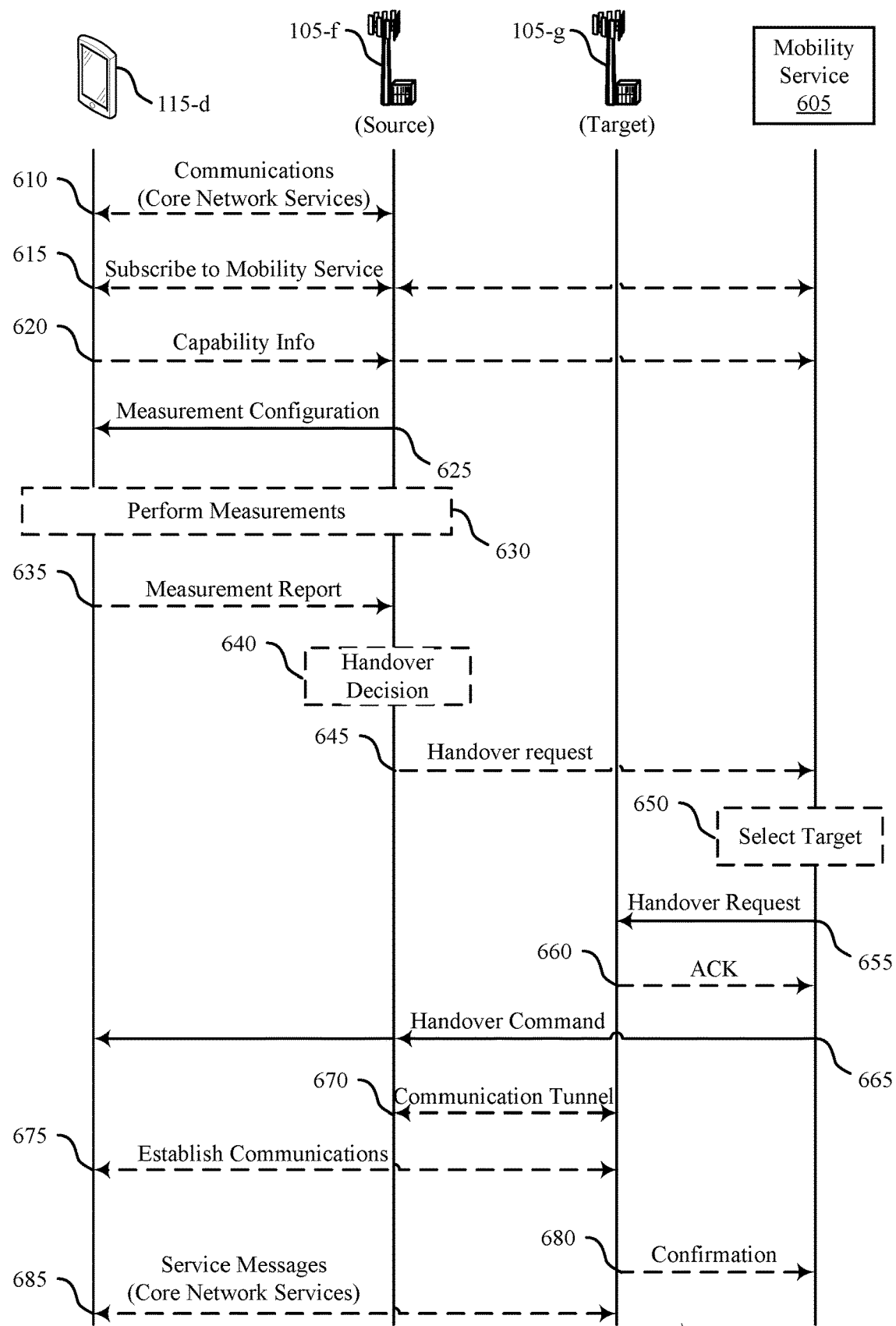
FIG. 6 illustrates an example of a process flow that supports techniques for connected state mobility in a service-based wireless system in accordance with one or more aspects of the present disclosure.

FIG. 6 illustrates an example of a process flow 600 that supports techniques for connected state mobility in a service-based wireless system in accordance with one or more aspects of the present disclosure. In some examples, aspects of the process flow 600 may implement, or be implemented by, aspects of the wireless communications system 100, the wireless communications system 200, the network architecture 300, the wireless communications system 400, the process flow 600, or any combination thereof. In particular, the process flow 600 illustrates signaling that enables a UE 115-*d* to perform handover procedures from one network entity 105 to another (or from one DU to another) in such a manner at to minimize disruptions to active core network services at the UE 115-*d*, as described with reference to FIGS. 1-5, among other aspects.

The process flow 600 may include a UE 115-d, a first network entity 105-f (e.g., source network entity 105-f), a second network entity 105-g (e.g., target network entity 105-g), and a mobility service 605 (e.g., core network service, or core network mobility service), which may be examples of UEs 115, network entities 105, core network services, and other wireless devices described with reference to FIGS. 1-5. In some aspects, the mobility service 605 may controls and handle mobility and connectivity management for UEs 115 within the wireless communications system.

In some aspects, the mobility service 605 may be included within a set of services offered or provided by a service-based network, such as the service-based network 205 illustrated in FIG. 2. In such cases, the service-based network including the mobility service 605 may be configured to interface with (e.g., communicate with) a RAN including the network entities 105-f, 105-g (e.g., DUs, eDUs) in order to facilitate communications between the service-based network and the UE 115-d. In this regard, the signaling illustrated in FIG. 6 may include example signaling within a network with a service-based architecture, such as a 6G system.

In some examples, the operations illustrated in process flow 600 may be performed by hardware (e.g., including circuitry, processing blocks, logic components, and other components), code (e.g., software) executed by a processor, or any combination thereof. Alternative examples of the following may be implemented, where some steps are performed in a different order than described or are not performed at all. In some cases, steps may include additional features not mentioned below, or further steps may be added.

At 610, the UE 115-d may perform communications with the first network entity 105-f. For example, the UE 115-d may communicate, via the first network entity 105-f, service messages with one or more core network services that are active at the UE 115-d, where the core network services are offered by a service-based network. In other words, the first network entity 105-f may relay service messages between the UE 115-d and the one or more core network services that are active at the UE 115-d.

At 615, the UE 115-d may establish communications with the mobility service 605 (e.g., core network mobility service). In other words, the UE 115-d may subscribe to the mobility service 605 so that the mobility service 605 can manage mobility and connectivity management (e.g., manage handover procedures) for the UE 115-d within the wireless communications system.

For example, the UE 115-d may transmit, to a network address associated with the mobility service 605, a service request for establishing service with the mobility service 605, and may receive control signaling indicating a service context for communicating with the mobility service 605 based on the service request. In this example, the first network entity 105-f may relay the respective communications between the UE 115-d and the mobility service. Moreover, subsequent communications between the UE 115-d and the mobility service 605 may be performed in accordance with the service context.

At 620, the UE 115-d may transmit capability information associated with the UE 115-d to the first network entity 105-f, the mobility service 605, an additional core network service (e.g., a core network capabilities service), or any combination thereof. Capability information may include supported RATs, capabilities related to AS protocol layer configurations, PLMNs and/or serving cells that the UE 115-d is or is not able to access, etc.

In cases where the UE 115-d transmits the capability information to a capabilities service (e.g., core network capabilities service), the mobility service 605 may be configured to retrieve the capability information from the capabilities service in order to facilitate handover procedures for the UE 115-d. As noted previously herein, such capability information may be used by the mobility service 605 to select target network entities 105 and/or target cells for the UE 115-d.

At 625, the UE 115-d may receive, from the first network entity 105-f, a measurement configuration indicating one or more trigger conditions associated with performance of handover procedures at the UE 115-d. In other words, the first network entity 105-f may configure the measurement configuration. The measurement configuration may be related to mobility for both the source eDU (e.g., first network entity 105-f) and the UE 115-d.

As compared to the process flow 500 illustrated in FIG. 5, in which case the mobility service 505 configures the measurement configuration and performs handover decisions, the source network entity 105-f illustrated in FIG. 6 may configure the measurement configuration and make handover decisions. In this case, the mobility service may forward access and roaming access restrictions information to the source and target eDUs. In some cases, enabling the source eDU to configure the measurement configuration and the measurement reporting may enable the source eDU to update measurement gaps frequently. Moreover, enabling the source eDU (e.g., first network entity 105-f) to configure the measurement configuration may provide some efficiencies due to the fact that the source eDU may have complete and up-to-date knowledge of the time-frequency resources consumed by data and control signaling.

In additional or alternative implementations, the source eDU and the mobility service 605 may implement various hybrid schemes in which the measurement configurations and other information associated with mobility are split across the respective devices. For example, according to one hybrid scheme, the mobility service 605 may determine the type of events and trigger conditions for handover procedures, where the source eDU (e.g., first network entity 105-f) may configure the actual measurement configuration (e.g., measurement object, frequency to be measured), measurement reporting, and associated measurement gap configuration. In this example, the mobility service may indicate information regarding the event types and trigger conditions to the source eDU.

In some aspects, the measurement configuration may include or indicate a configuration of downlink reference signals that the UE 115-d should measure for mobility purposes (e.g., for determination of handover procedures), and a configuration of uplink reference signals that the first network entity 105-f should measure for mobility purposes. Additionally, the measurement configuration may indicate measurement gaps, and trigger conditions (e.g., event triggers) for reporting measurement reports if a trigger condition is satisfied.

At 630, the UE 115-d, the first network entity 105-f, or both, may perform measurements on signals (e.g., reference signals) in accordance with the measurement configuration communicated at 625. In particular, the UE 115-d and/or the first network entity 105-f may perform measurements on received reference signals in order to identify a satisfaction of a trigger condition for a handover procedure, where the trigger conditions may be identified by the measurement configuration.

At 635, the UE 115-*d* may transmit a measurement report to the first network entity 105-*f*. The UE 115-*d* may transmit the measurement report in accordance with the measurement configuration received at 625. For example, the UE 115-*d* may transmit the measurement report according to a defined periodicity or frequency, based on a satisfaction of a trigger condition, or both.

At 640, the first network entity 105-*f* may perform a handover decision. In particular, the first network entity 105-*f* may be configured to receive and process the measurement or event reports (e.g., event report indicating a satisfaction of a trigger condition) from the UE 115-*d* in order to make a handover decision (e.g., determine whether or not to initiate a handover procedure at the UE 115-*d*).

At 645, in cases where the first network entity 105-*f* determines to trigger a handover procedure, the first network entity 105-*f* may transmit a handover request message to the mobility service 605. In this regard, the first network entity 105-*f* may transmit the handover request based on transmitting the measurement configuration at 625, performing the measurements at 630, receiving the measurement report at 635, identifying a satisfaction of a trigger condition, performing the handover decision at 640, or any combination thereof.

In some aspects, the handover request message may additionally or alternatively indicate candidate target network entities 105. For example, the UE 115-*d* may measure reference signals received from multiple candidate target network entities 105 (e.g., the second network entity 105-*g*), and may indicate one or more of the candidate target network entities 105 in the measurement report, where the first network entity 105-*f* relays the indication of the candidate target network entities 105 via the handover request message. In additional or alternative implementations, the UE 115-*d* may indicate target cells associated with the target eDUs in the handover request.

Additionally, or alternatively, the first network entity 105-*f* may indicate, via the handover request message at 645, a list of core network services that are currently active at the UE 115-*d*. Such information may enable the mobility service 605 to perform handover decisions and select target network entities 105/target DUs/target cells for a potential handover procedure.

At 650, the mobility service 605 may select a target network entity 105 to which the UE 115-*d* will be handed over. For example, as shown in FIG. 6, the mobility service 605 may select the second network entity 105-*g* as the target for a handover procedure at the UE 115-*d*. Further, in some aspects, the mobility service 605 may select a serving cell of the second network entity 105-*g* to which the UE 115-*d* will be handed over.

The mobility service 605 may select the target network entity 105-*g* and/or target serving cell for the handover procedure based on a number of parameters or factors including, but not limited to, the capability information associated with the UE 115-*d* received at 620, active core network services at the UE 115-*d* (e.g., core network services that the target network entity 105 supports), an indication of candidate target network entities 105 indicated in the handover request at 645, a mobility history of the UE 115-*d*, a traffic load associated with the candidate network entities 105 and/or target serving cells, or any combination thereof. For example, the mobility service 605 may select a target network entity 105 (e.g., second network entity 105-*g*) that supports at least one core network service that is currently active at the UE 115-*d*.

At 655, the mobility service 605 may transmit a handover request to the second network entity 105-*g* (e.g., the selected target network entity 105-*g*). The mobility service 605 may transmit the handover request at 655 based on selecting the second network entity 105-*g* as the target for a handover procedure at 650. In some implementations, the handover request may indicate the set of core network services that are active at the UE 115-*d*, the access and roaming access restrictions information associated with the UE 115-*d*, or both.

In some implementations, the second network entity 105-*g* may perform admission control to determine which of the active core network services at the UE 115-*d* are supported by the second network entity 105-*g* (e.g., determine list of accepted services among those indicated in the handover request). For example, in the case of a slice, the list of active core network services that the second network entity 105-*g* may accept/support may be based on the QoS requirements of the flows associated with the slice.

At 660, the mobility service 605 may receive an ACK message from the second network entity 105-*g*. The mobility service 605 may receive the ACK message from the second network entity 105-*g* based on (e.g., in response to) the handover request at 655. In some implementations, the ACK message may indicate one or more active core network services at the UE 115-*d* that are supported and/or accepted by the second network entity 105-*g*. In other words, the ACK message may indicate a list of accepted/supported core network services.

In some aspects, the second network entity 105-*g* may indicate a communication configuration for communications with the second network entity 105-*g* in the ACK message (e.g., for relay to the UE 115-*d*). For example, the target network entity 105-*g* may determines a target cell AS protocol layer configuration and a configuration related to the accepted core network services, and indicate such configurations to the mobility service 605. In such cases, the target network entity 105-*g* may determine a measurement configuration for the target network entity 105-*g* and/or target cell for mobility purposes (e.g., a new measurement configuration for the target cell), and may indicate the measurement configuration to the mobility service 605 (for relay to the UE 115-*d*).

In alternative implementations, the second network entity 105-*g* may reject the handover request (e.g., transmit a NACK message). For example, the second network entity 105-*g* may reject the handover request in cases where the second network entity 105-*g* does not support any core network services that are currently active at the UE 115-*d*. In such cases, the mobility service 605 may reselect a new target for the handover procedure and transmit a new handover request to the newly selected target.

At 665, the mobility service 605 may transmit a handover command to the first network entity 105-*f* and/or the UE 115-*d* (e.g., for relay to the UE 115-*d*), along with an instruction for the UE 115-*d* to perform the handover procedure from the first network entity 105-*f* to the second network entity 105-*g*. The mobility service 605 may transmit the handover command based on performing the handover decision at 640, selecting the target cell/network entity 105-*g* at 650, transmitting the handover request at 655, receiving the ACK message at 660, or any combination thereof.

The handover command may include various information associated with the second network entity 105-*g* including, but not limited to, an identifier associated with the second network entity 105-*g* and/or a serving cell (e.g., target cell)

supported by the second network entity 105-*g*, communication parameters for communicating with the second network entity 105-*g* (e.g., communication configuration, such as a target cell AS protocol layer configuration), the list of core network services that are active at the UE 115-*d* and supported/accepted by the second network entity 105-*g*, the new measurement configuration associated with the second network entity 105-*g*, and the like.

At 670, the first network entity 105-*f* and the second network entity 105-*g* may establish a communication tunnel (e.g., IP tunnel) between the respective devices. In some aspects, the communication tunnel may be configured for relaying data packets intended for the UE 115-*d* between the respective devices during the performance of the handover procedure. In other words, during handover execution, direct forwarding may be performed from the source eDU to the target eDU on the established IP tunnel for flows for which data forwarding applies.

For example, during execution of the handover procedure (e.g., prior to completion), the first network entity 105-*f* may receive a message from a core network service, and may relay one or more packets associated with the message to the second network entity 105-*g* via the communication tunnel so that the second network entity 105-*g* may relay the data packets to the UE 115-*d* after (or during) performance of the handover procedure.

At 675, the UE 115-*d* may establish communications with the second network entity 105-*g*. The UE 115-*d* may establish communications with the second network entity 105-*g* based on receiving the handover command (e.g., in accordance with information included within the handover command).

At 680, the second network entity 105-*g* may transmit a message to the mobility service 605 that indicates a completion of the handover procedure. For example, the target eDU (e.g., second network entity 105-*g*) may indicate the target cell ID to the mobility service 605 upon completion of the handover. In some cases, the mobility service 605 may provide a notification to other core network services (e.g., other core network services that are active at the UE 115-*d*) of the completed handover procedure. Additionally, upon handover completion, the target eDU may request the access gateway (e.g., UPF), to switch the path to the target eDU.

At 685, the UE 115-*d* may perform communications with the second network entity 105-*g*. For example, the UE 115-*d* may communicate, via the second network entity 105-*g*, service messages with one or more core network services that are active at the UE 115-*d*. In other words, the first network entity 105-*f* may relay service messages between the UE 115-*d* and the one or more core network services that are active at the UE 115-*d*. The UE 115-*d* may communicate with the second network entity 105-*g* (and active core network services) at 685 based on receiving the handover command at 665, establishing communications at 675, transmitting the confirmation of the handover procedure at 680, or any combination thereof.

Figure 7:
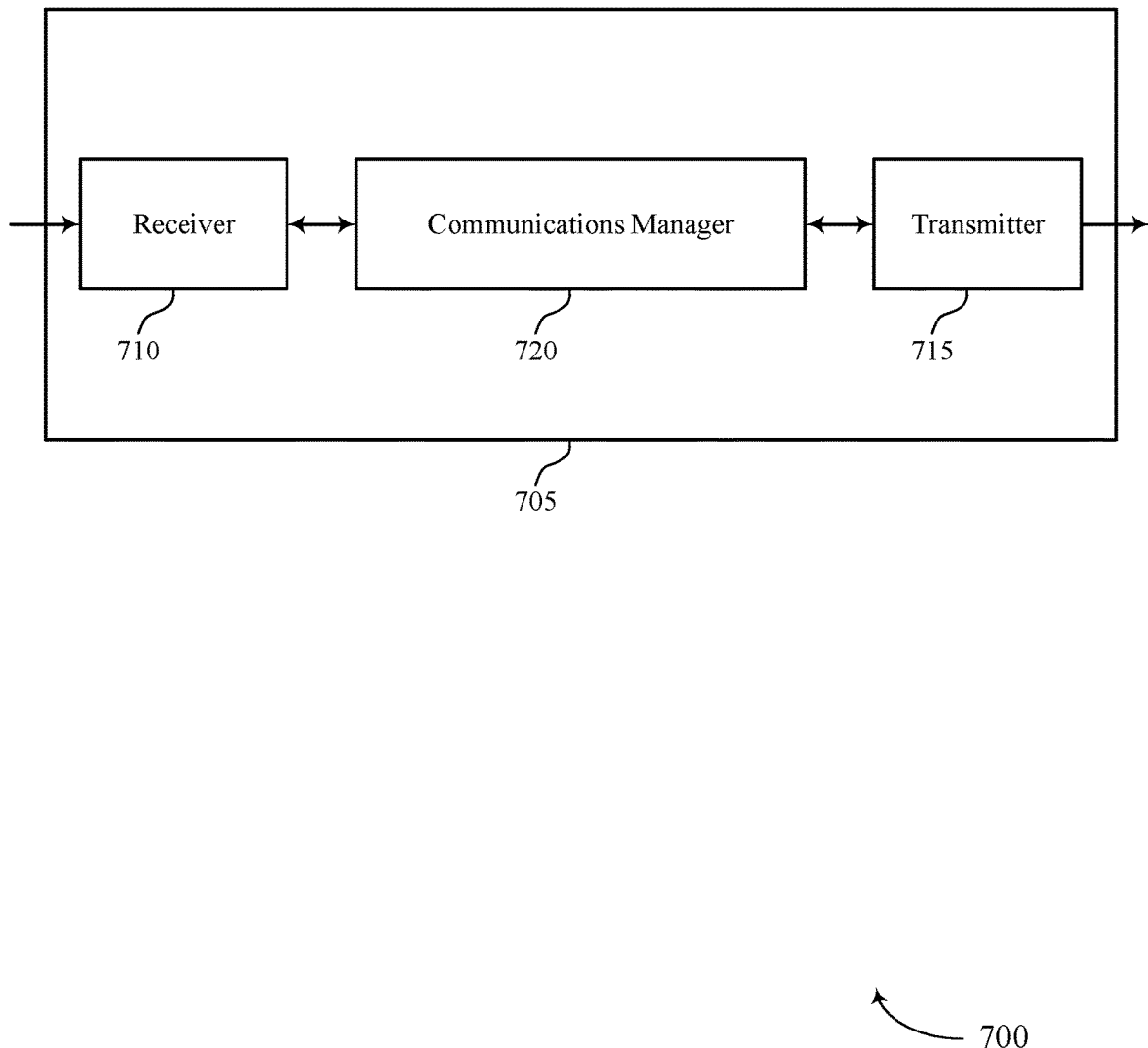
FIGS. 7 and 8 show block diagrams of devices that support techniques for connected state mobility in a service-based wireless system in accordance with one or more aspects of the present disclosure.

FIG. 7 shows a block diagram 700 of a device 705 that supports techniques for connected state mobility in a service-based wireless system in accordance with one or more aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for connected state mobility in a service-based wireless system). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for connected state mobility in a service-based wireless system). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of techniques for connected state mobility in a service-based wireless system as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a UE in accordance with examples as disclosed herein. For example, the communications manager 720 may be configured as or otherwise support a means for communicating a set of multiple service messages with a first DU, the set of multiple service messages associated with a set of multiple core network services that are offered by a service-based network and are active at the UE. The communications manager 720 may be configured as or otherwise support a means for receiving, from a core network mobility service of the set of multiple core network services and via the first DU, a measurement configuration indicating one or more trigger conditions associated with a handover procedure at the UE. The communications manager 720 may be configured as or otherwise support a means for transmitting, to the first DU for relay to the core network mobility service, a second message indicating a satisfaction of a trigger condition of the one or more trigger conditions. The communications manager 720 may be configured as or otherwise support a means for receiving a handover command from the core network mobility service via the first DU based on the satisfaction of the trigger condition, the handover command indicating a second DU that supports at least one core network service of the set of multiple core network services that are active at the UE. The communications manager 720 may be configured as or otherwise support a means for communicating with the second DU based on receiving the handover command.

By including or configuring the communications manager 720 in accordance with examples as described herein, the device 705 (e.g., a processor controlling or otherwise coupled with the receiver 710, the transmitter 715, the communications manager 720, or a combination thereof) may support techniques that enable UEs 115 to perform handover procedures between DUs 165 and/or between network entities 105 of a service-based wireless system while minimizing disruptions to active core network services at the UE 115. In particular, aspects of the present disclosure support techniques which enable UEs 115 to perform handover procedures to target DUs/target network entities which support at least some of the active core network services at the UE 115. As such, aspects, of the present disclosure may reduce interruptions to communications performed with core network services, thereby preventing the need for UEs 115 to continually re-establish communications with core network services. In this regard, techniques described herein may reduce signaling associated with UEs 115 subscribing to core network services, reduce interruptions, and improve overall user experience.

Figure 8:
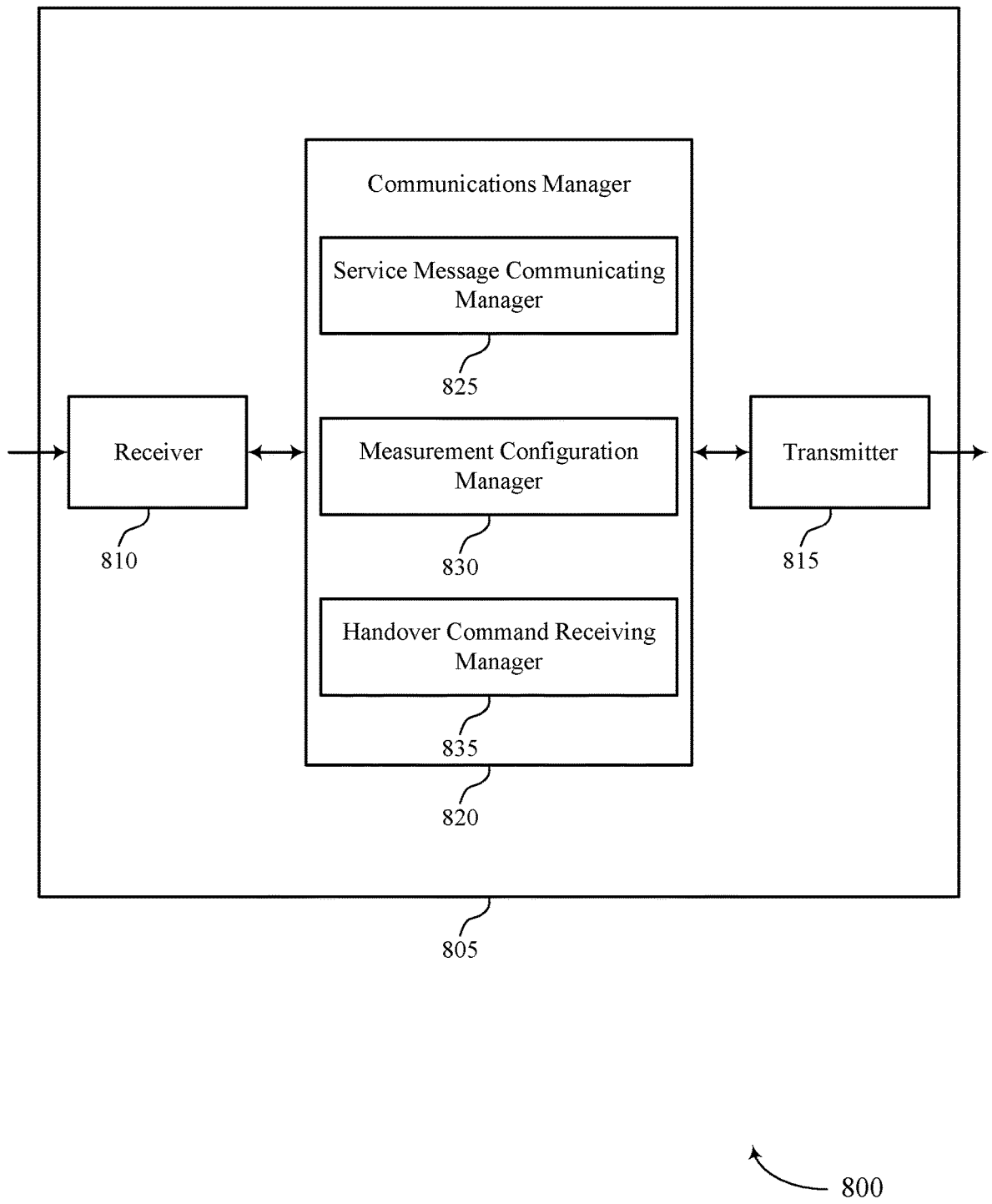

FIG. 8 shows a block diagram 800 of a device 805 that supports techniques for connected state mobility in a service-based wireless system in accordance with one or more aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for connected state mobility in a service-based wireless system). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for connected state mobility in a service-based wireless system). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of techniques for connected state mobility in a service-based wireless system as described herein. For example, the communications manager 820 may include a service message communicating manager 825, a measurement configuration manager 830, a handover command receiving manager 835, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication at a UE in accordance with examples as disclosed herein. The service message communicating manager 825 may be configured as or otherwise support a means for communicating a set of multiple service messages with a first DU, the set of multiple service messages associated with a set of multiple core network services that are offered by a service-based network and are active at the UE. The measurement configuration manager 830 may be configured as or otherwise support a means for receiving, from a core network mobility service of the set of multiple core network services and via the first DU, a measurement configuration indicating one or more trigger conditions associated with a handover procedure at the UE. The measurement configuration manager 830 may be configured as or otherwise support a means for transmitting, to the first DU for relay to the core network mobility service, a second message indicating a satisfaction of a trigger condition of the one or more trigger conditions. The handover command receiving manager 835 may be configured as or otherwise support a means for receiving a handover command from the core network mobility service via the first DU based on the satisfaction of the trigger condition, the handover command indicating a second DU that supports at least one core network service of the set of multiple core network services that are active at the UE. The service message communicating manager 825 may be configured as or otherwise support a means for communicating with the second DU based on receiving the handover command.

Figure 9:
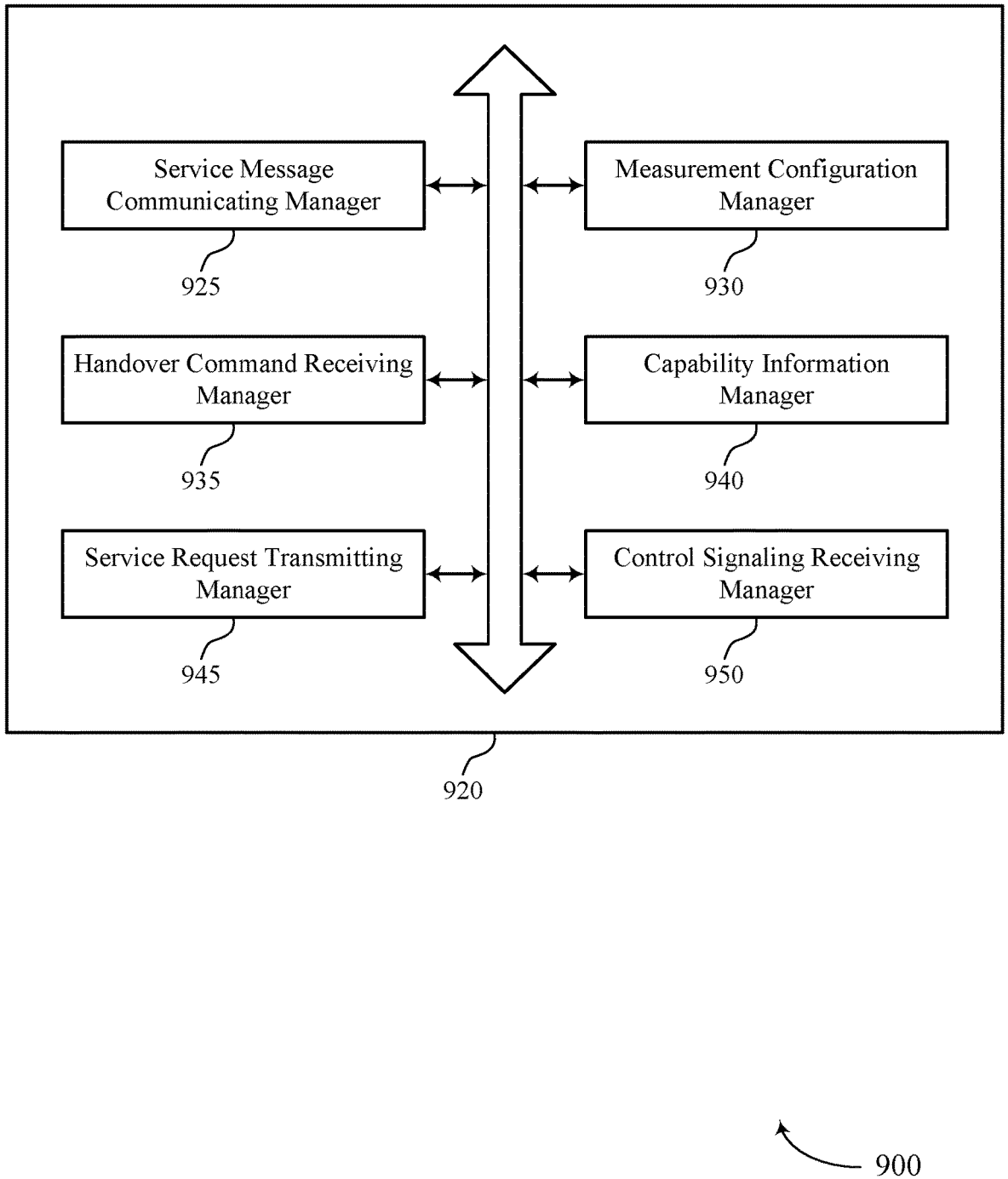
FIG. 9 shows a block diagram of a communications manager that supports techniques for connected state mobility in a service-based wireless system in accordance with one or more aspects of the present disclosure.

FIG. 9 shows a block diagram 900 of a communications manager 920 that supports techniques for connected state mobility in a service-based wireless system in accordance with one or more aspects of the present disclosure. The communications manager 920 may be an example of aspects of a communications manager 720, a communications manager 820, or both, as described herein. The communications manager 920, or various components thereof, may be an example of means for performing various aspects of techniques for connected state mobility in a service-based wireless system as described herein. For example, the communications manager 920 may include a service message communicating manager 925, a measurement configuration manager 930, a handover command receiving manager 935, a capability information manager 940, a service request transmitting manager 945, a control signaling receiving manager 950, or any combination thereof. Each of these components may communicate, directly or indirectly, with one another (e.g., via one or more buses).

The communications manager 920 may support wireless communication at a UE in accordance with examples as disclosed herein. The service message communicating manager 925 may be configured as or otherwise support a means for communicating a set of multiple service messages with a first DU, the set of multiple service messages associated with a set of multiple core network services that are offered by a service-based network and are active at the UE. The measurement configuration manager 930 may be configured as or otherwise support a means for receiving, from a core network mobility service of the set of multiple core network services and via the first DU, a measurement configuration indicating one or more trigger conditions associated with a handover procedure at the UE. In some examples, the measurement configuration manager 930 may be configured as or otherwise support a means for transmitting, to the first DU for relay to the core network mobility service, a second message indicating a satisfaction of a trigger condition of the one or more trigger conditions. The handover command receiving manager 935 may be configured as or otherwise support a means for receiving a handover command from the core network mobility service via the first DU based on the satisfaction of the trigger condition, the handover command indicating a second DU that supports at least one core network service of the set of multiple core network services that are active at the UE. In some examples, the service message communicating manager 925 may be configured as or otherwise support a means for communicating with the second DU based on receiving the handover command.

In some examples, the capability information manager 940 may be configured as or otherwise support a means for transmitting capability information associated with the UE to the first DU, the core network mobility service, an additional core network service of the set of multiple core network services, or any combination thereof, where receiving the handover command is based on the capability information.

In some examples, the handover command receiving manager 935 may be configured as or otherwise support a means for receiving, via the handover command, a cell identifier associated with a serving cell supported by the second DU and a set of communication parameters for communicating with the serving cell, where communicating with the second DU is based on the cell identifier and the set of communication parameters.

In some examples, the service request transmitting manager 945 may be configured as or otherwise support a means for transmitting, to a network address associated with the core network mobility service, a service request for establishing service with the core network mobility service. In some examples, the control signaling receiving manager 950 may be configured as or otherwise support a means for receiving control signaling indicating a service context for communicating with the core network mobility service based on the service request, where transmitting the second message, receiving the handover command, or both, is based on the service context.

In some examples, the measurement configuration manager 930 may be configured as or otherwise support a means for performing measurements on signals received from the first DU and one or more candidate DUs including the second DU, where the measurements are performed in accordance with the measurement configuration, and where transmitting the second message is based on performing the measurements.

Figure 10:
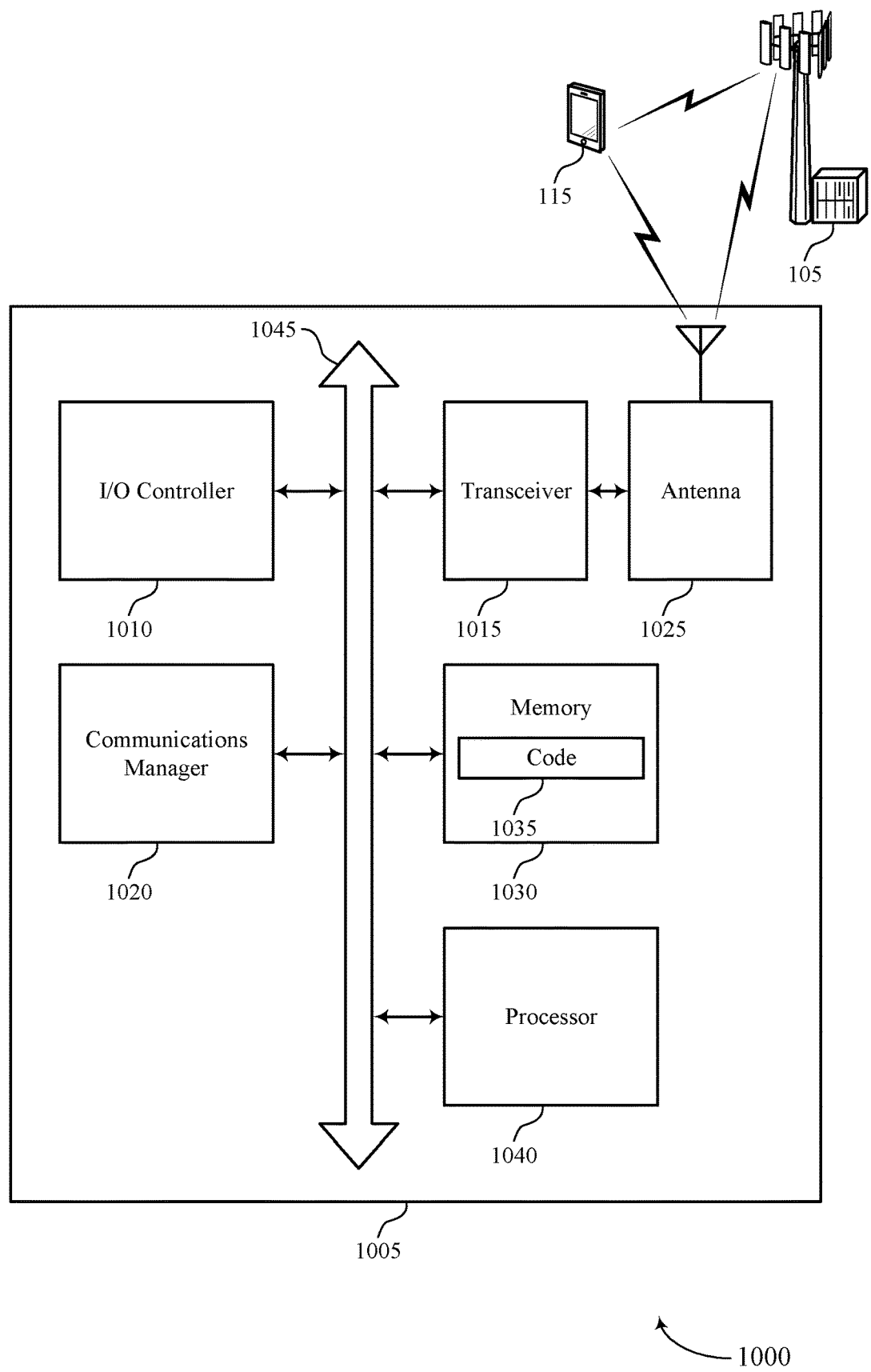
FIG. 10 shows a diagram of a system including a device that supports techniques for connected state mobility in a service-based wireless system in accordance with one or more aspects of the present disclosure.

FIG. 10 shows a diagram of a system 1000 including a device 1005 that supports techniques for connected state mobility in a service-based wireless system in accordance with one or more aspects of the present disclosure. The device 1005 may be an example of or include the components of a device 705, a device 805, or a UE 115 as described herein. The device 1005 may communicate (e.g., wirelessly) with one or more network entities 105, one or more UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally, or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting techniques for connected state mobility in a service-based wireless system). For example, the device 1005 or a component of the device 1005 may include a processor 1040 and memory 1030 coupled with or to the processor 1040, the processor 1040 and memory 1030 configured to perform various functions described herein.

The communications manager 1020 may support wireless communication at a UE in accordance with examples as disclosed herein. For example, the communications manager 1020 may be configured as or otherwise support a means for communicating a set of multiple service messages with a first DU, the set of multiple service messages associated with a set of multiple core network services that are offered by a service-based network and are active at the UE. The communications manager 1020 may be configured as or otherwise support a means for receiving, from a core network mobility service of the set of multiple core network services and via the first DU, a measurement configuration indicating one or more trigger conditions associated with a handover procedure at the UE. The communications manager 1020 may be configured as or otherwise support a means for transmitting, to the first DU for relay to the core network mobility service, a second message indicating a satisfaction of a trigger condition of the one or more trigger conditions. The communications manager 1020 may be configured as or otherwise support a means for receiving a handover command from the core network mobility service via the first DU based on the satisfaction of the trigger condition, the handover command indicating a second DU that supports at least one core network service of the set of multiple core network services that are active at the UE. The communications manager 1020 may be configured as or otherwise support a means for communicating with the second DU based on receiving the handover command.

By including or configuring the communications manager 1020 in accordance with examples as described herein, the device 1005 may support techniques that enable UEs 115 to perform handover procedures between DUs 165 and/or between network entities 105 of a service-based wireless system while minimizing disruptions to active core network services at the UE 115. In particular, aspects of the present disclosure support techniques which enable UEs 115 to perform handover procedures to target DUs/target network entities which support at least some of the active core network services at the UE 115. As such, aspects, of the present disclosure may reduce interruptions to communications performed with core network services, thereby preventing the need for UEs 115 to continually re-establish communications with core network services. In this regard, techniques described herein may reduce signaling associated with UEs 115 subscribing to core network services, reduce interruptions, and improve overall user experience.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of techniques for connected state mobility in a service-based wireless system as described herein, or the processor 1040 and the memory 1030 may be otherwise configured to perform or support such operations.

Figure 11:
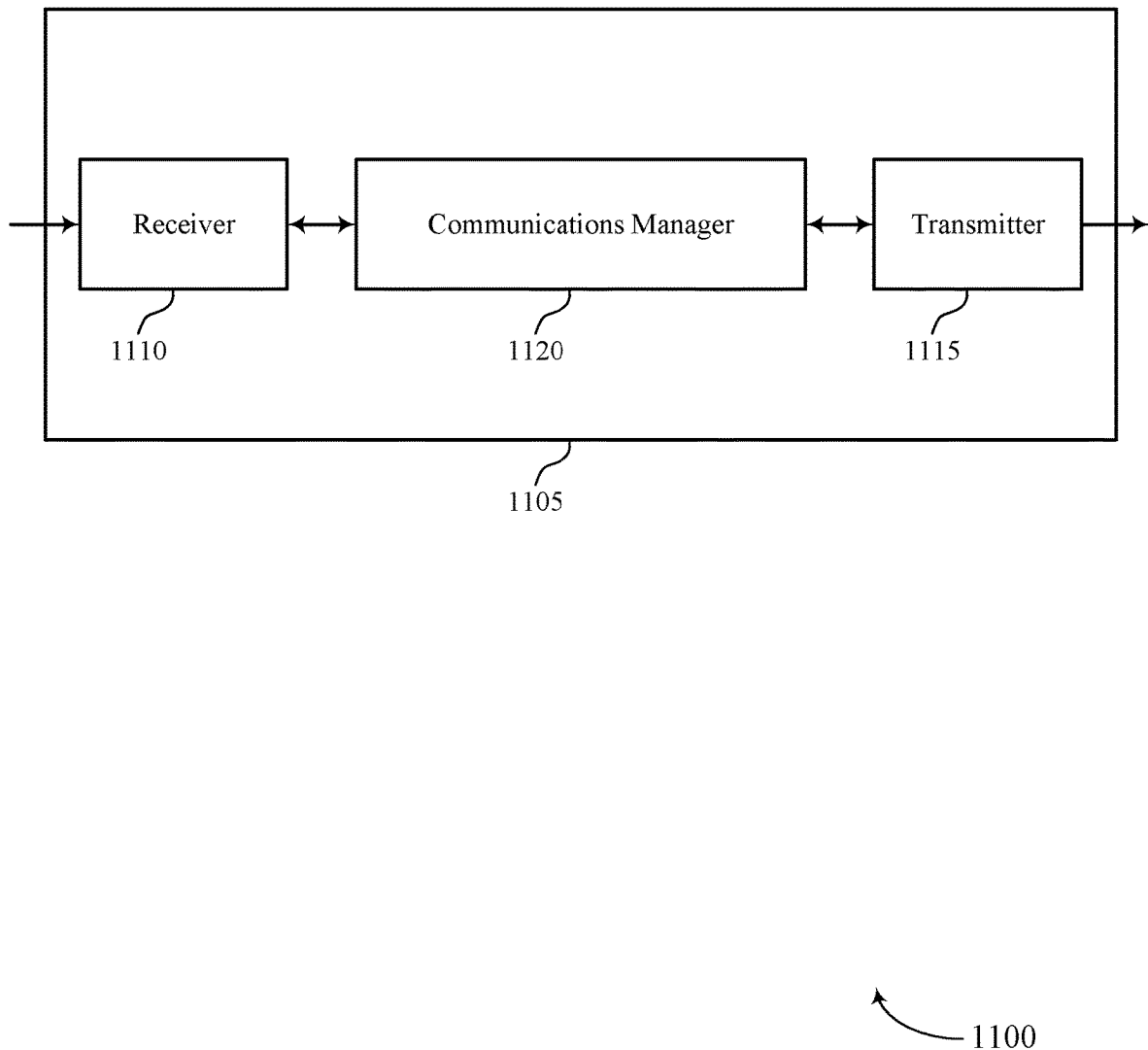
FIGS. 11 and 12 show block diagrams of devices that support techniques for connected state mobility in a service-based wireless system in accordance with one or more aspects of the present disclosure.

FIG. 11 shows a block diagram 1100 of a device 1105 that supports techniques for connected state mobility in a service-based wireless system in accordance with one or more aspects of the present disclosure. The device 1105 may be an example of aspects of a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The communications manager 1120, the receiver 1110, the transmitter 1115, or various combinations thereof or various components thereof may be examples of means for performing various aspects of techniques for connected state mobility in a service-based wireless system as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication at a core network mobility service in accordance with examples as disclosed herein. For example, the communications manager 1120 may be configured as or otherwise support a means for receiving, from a first DU configured to communicate with a UE, a message associated with a satisfaction of a trigger condition for a handover procedure at the UE. The communications manager 1120 may be configured as or otherwise support a means for selecting, based on the message, a second DU from a set of multiple candidate DUs based on the second DU being configured to support at least one core network service that is active at the UE of a set of multiple core network services of a service-based network. The communications manager 1120 may be configured as or otherwise support a means for transmitting, to the first DU for relay to the UE and based on selecting the second DU, a handover command indicating the second DU and an instruction to perform the handover procedure from the first DU to the second DU.

Additionally, or alternatively, the communications manager 1120 may support wireless communication at a first DU in accordance with examples as disclosed herein. For example, the communications manager 1120 may be configured as or otherwise support a means for communicating a set of multiple service messages between a UE and a set of multiple core network services of a service-based network that are active at the UE. The communications manager 1120 may be configured as or otherwise support a means for transmitting, to a core network mobility service of the set of multiple core network services, a message associated with a satisfaction of a trigger condition for a handover procedure at the UE. The communications manager 1120 may be configured as or otherwise support a means for receiving, from the core network mobility service based on the message, a handover command indicating a second DU that supports at least one core network service of a set of multiple core network services that are active at the UE. The communications manager 1120 may be configured as or otherwise support a means for transmitting the handover command to the UE, the handover command including an instruction for the UE to perform the handover procedure from the first DU to the second DU.

Additionally, or alternatively, the communications manager 1120 may support wireless communication at a second DU in accordance with examples as disclosed herein. For example, the communications manager 1120 may be configured as or otherwise support a means for receiving, from a core network mobility service of a service-based network, a handover request associated with a handover procedure at a UE from a first DU to the second DU. The communications manager 1120 may be configured as or otherwise support a means for transmitting an ACK message to the core network mobility service based on the handover request, the ACK message indicating at least one core network service of a set of multiple core network services that is active at the UE and supported by the second DU. The communications manager 1120 may be configured as or otherwise support a means for communicating with the UE based on the handover request and the ACK message. The communications manager 1120 may be configured as or otherwise support a means for transmitting, to the core network mobility service based on communicating with the UE, a second message indicating a completion of the handover procedure.

By including or configuring the communications manager 1120 in accordance with examples as described herein, the device 1105 (e.g., a processor controlling or otherwise coupled with the receiver 1110, the transmitter 1115, the communications manager 1120, or a combination thereof) may support techniques that enable UEs 115 to perform handover procedures between DUs 165 and/or between network entities 105 of a service-based wireless system while minimizing disruptions to active core network services at the UE 115. In particular, aspects of the present disclosure support techniques which enable UEs 115 to perform handover procedures to target DUs/target network entities which support at least some of the active core network services at the UE 115. As such, aspects, of the present disclosure may reduce interruptions to communications performed with core network services, thereby preventing the need for UEs 115 to continually re-establish communications with core network services. In this regard, techniques described herein may reduce signaling associated with UEs 115 subscribing to core network services, reduce interruptions, and improve overall user experience.

Figure 12:
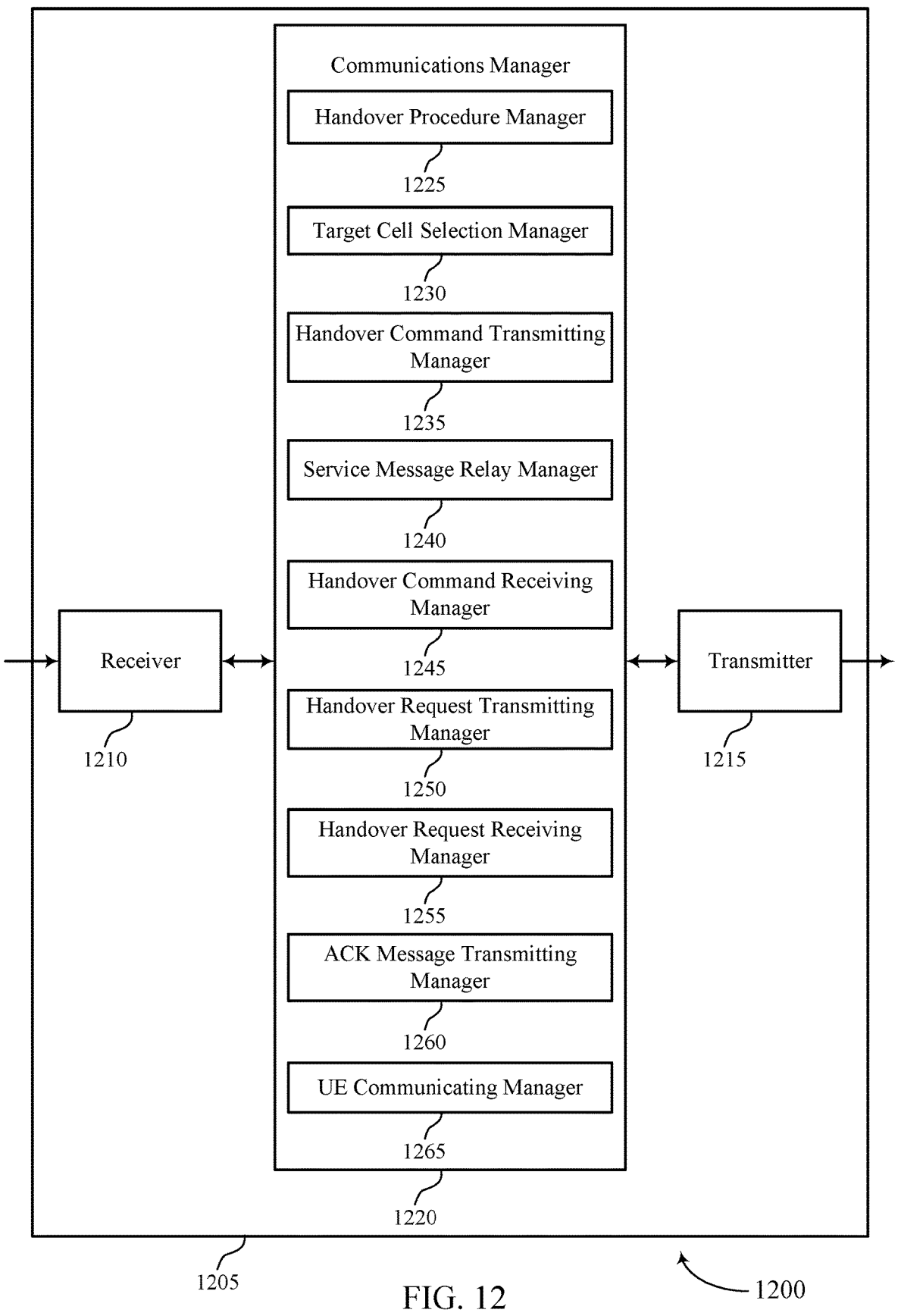

FIG. 12 shows a block diagram 1200 of a device 1205 that supports techniques for connected state mobility in a service-based wireless system in accordance with one or more aspects of the present disclosure. The device 1205 may be an example of aspects of a device 1105 or a network entity 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The device 1205, or various components thereof, may be an example of means for performing various aspects of techniques for connected state mobility in a service-based wireless system as described herein. For example, the communications manager 1220 may include a handover procedure manager 1225, a target cell selection manager 1230, a handover command transmitting manager 1235, a service message relay manager 1240, a handover command receiving manager 1245, a handover request transmitting manager 1250, a handover request receiving manager 1255, an ACK message transmitting manager 1260, a UE communicating manager 1265, or any combination thereof. The communications manager 1220 may be an example of aspects of a communications manager 1120 as described herein. In some examples, the communications manager 1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communication at a core network mobility service in accordance with examples as disclosed herein. The handover procedure manager 1225 may be configured as or otherwise support a means for receiving, from a first DU configured to communicate with a UE, a message associated with a satisfaction of a trigger condition for a handover procedure at the UE. The target cell selection manager 1230 may be configured as or otherwise support a means for selecting, based on the message, a second DU from a set of multiple candidate DUs based on the second DU being configured to support at least one core network service that is active at the UE of a set of multiple core network services of a service-based network. The handover command transmitting manager 1235 may be configured as or otherwise support a means for transmitting, to the first DU for relay to the UE and based on selecting the second DU, a handover command indicating the second DU and an instruction to perform the handover procedure from the first DU to the second DU.

Additionally, or alternatively, the communications manager 1220 may support wireless communication at a first DU in accordance with examples as disclosed herein. The service message relay manager 1240 may be configured as or otherwise support a means for communicating a set of multiple service messages between a UE and a set of multiple core network services of a service-based network that are active at the UE. The handover procedure manager 1225 may be configured as or otherwise support a means for transmitting, to a core network mobility service of the set of multiple core network services, a message associated with a satisfaction of a trigger condition for a handover procedure at the UE. The handover command receiving manager 1245 may be configured as or otherwise support a means for receiving, from the core network mobility service based on the message, a handover command indicating a second DU that supports at least one core network service of a set of multiple core network services that are active at the UE. The handover request transmitting manager 1250 may be configured as or otherwise support a means for transmitting the handover command to the UE, the handover command including an instruction for the UE to perform the handover procedure from the first DU to the second DU.

Additionally, or alternatively, the communications manager 1220 may support wireless communication at a second DU in accordance with examples as disclosed herein. The handover request receiving manager 1255 may be configured as or otherwise support a means for receiving, from a core network mobility service of a service-based network, a handover request associated with a handover procedure at a UE from a first DU to the second DU. The ACK message transmitting manager 1260 may be configured as or otherwise support a means for transmitting an ACK message to the core network mobility service based on the handover request, the ACK message indicating at least one core network service of a set of multiple core network services that is active at the UE and supported by the second DU. The UE communicating manager 1265 may be configured as or otherwise support a means for communicating with the UE based on the handover request and the ACK message. The handover procedure manager 1225 may be configured as or otherwise support a means for transmitting, to the core network mobility service based on communicating with the UE, a second message indicating a completion of the handover procedure.

Figure 13:
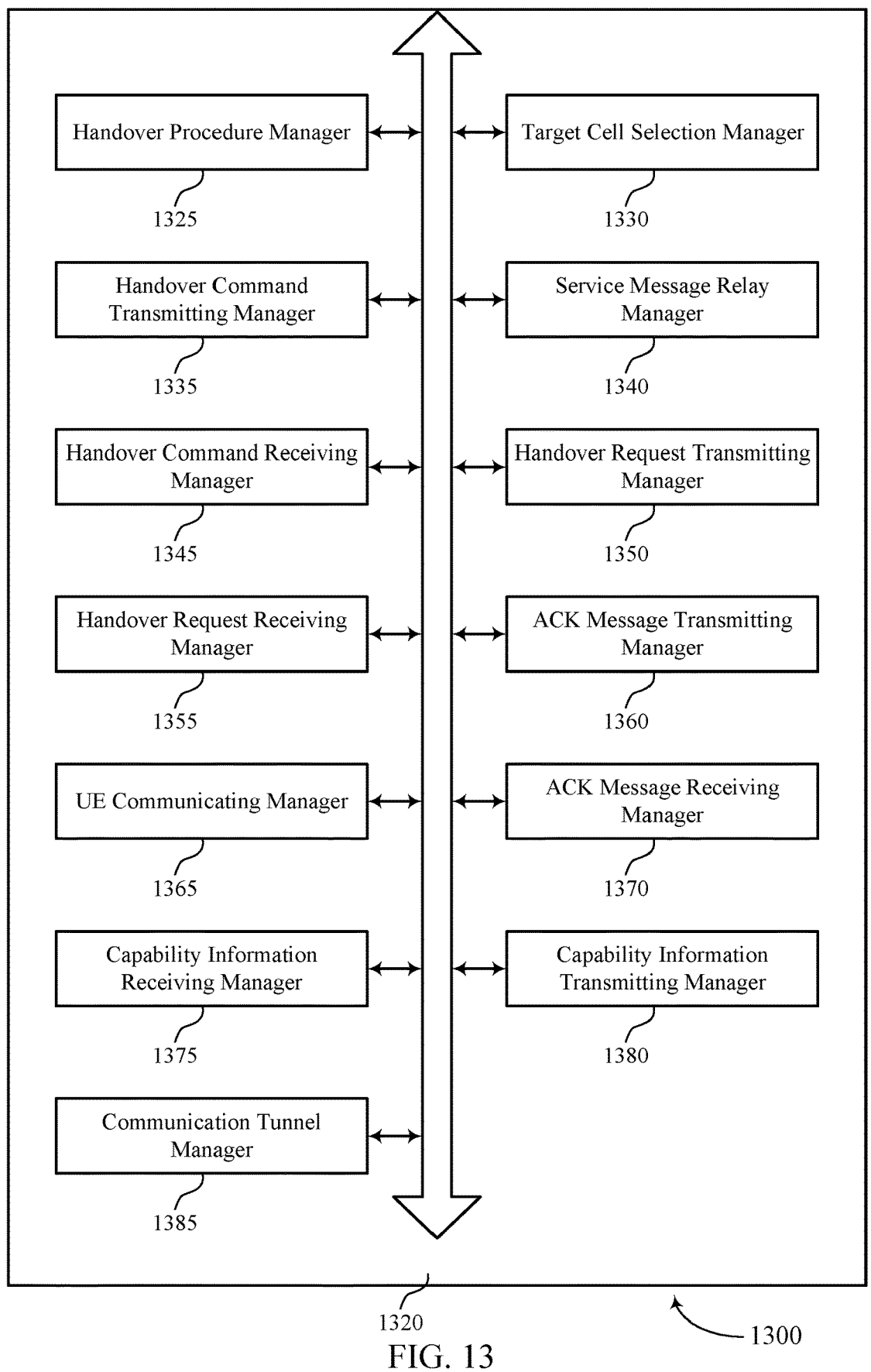
FIG. 13 shows a block diagram of a communications manager that supports techniques for connected state mobility in a service-based wireless system in accordance with one or more aspects of the present disclosure.

FIG. 13 shows a block diagram 1300 of a communications manager 1320 that supports techniques for connected state mobility in a service-based wireless system in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of techniques for connected state mobility in a service-based wireless system as described herein. For example, the communications manager 1320 may include a handover procedure manager 1325, a target cell selection manager 1330, a handover command transmitting manager 1335, a service message relay manager 1340, a handover command receiving manager 1345, a handover request transmitting manager 1350, a handover request receiving manager 1355, an ACK message transmitting manager 1360, a UE communicating manager 1365, an ACK message receiving manager 1370, a capability information receiving manager 1375, a capability information transmitting manager 1380, a communication tunnel manager 1385, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1320 may support wireless communication at a core network mobility service in accordance with examples as disclosed herein. The handover procedure manager 1325 may be configured as or otherwise support a means for receiving, from a first DU configured to communicate with a UE, a message associated with a satisfaction of a trigger condition for a handover procedure at the UE. The target cell selection manager 1330 may be configured as or otherwise support a means for selecting, based on the message, a second DU from a set of multiple candidate DUs based on the second DU being configured to support at least one core network service that is active at the UE of a set of multiple core network services of a service-based network. The handover command transmitting manager 1335 may be configured as or otherwise support a means for transmitting, to the first DU for relay to the UE and based on selecting the second DU, a handover command indicating the second DU and an instruction to perform the handover procedure from the first DU to the second DU.

In some examples, the handover request transmitting manager 1350 may be configured as or otherwise support a means for transmitting a handover request to the second DU based on the message. In some examples, the ACK message receiving manager 1370 may be configured as or otherwise support a means for receiving an ACK message from the second DU based on the handover request, where transmitting the handover command is based on the ACK message.

In some examples, the handover command transmitting manager 1335 may be configured as or otherwise support a means for transmitting, via the handover request, an indication of the set of multiple core network services that are active at the UE, where the ACK message is based on the set of multiple core network services that are active at the UE.

In some examples, the ACK message receiving manager 1370 may be configured as or otherwise support a means for receiving, via the ACK message, an indication of the at least one core network service supported by the second DU, where transmitting the handover command is based on receiving the indication of the at least one core network service.

In some examples, the capability information receiving manager 1375 may be configured as or otherwise support a means for receiving capability information associated with the UE, where selecting the second DU from the set of multiple candidate DUs is based on the capability information.

In some examples, the capability information is received from a core network capability service included within the set of multiple core network services.

In some examples, selecting the second DU from the set of multiple candidate DUs is based on a mobility history of the UE, a traffic load associated with the second DU, or both.

In some examples, the handover procedure manager 1325 may be configured as or otherwise support a means for receiving, via the message, an indication of the set of multiple candidate DUs, where selecting the second DU is based on receiving the indication of the set of multiple candidate DUs.

In some examples, to support selecting the second DU, the target cell selection manager 1330 may be configured as or otherwise support a means for selecting a serving cell supported by the second DU, where the handover command includes a cell identifier associated with the selected serving cell.

In some examples, the handover procedure manager 1325 may be configured as or otherwise support a means for receiving, from the second DU, a second message indicating a completion of the handover procedure. In some examples, the UE communicating manager 1365 may be configured as or otherwise support a means for communicating with the UE via the second DU based on the second message.

In some examples, the handover procedure manager 1325 may be configured as or otherwise support a means for transmitting, to the first DU for relay to the UE, a measurement configuration indicating one or more trigger conditions including the trigger condition, where receiving the message is based on the measurement configuration.

Additionally, or alternatively, the communications manager 1320 may support wireless communication at a first DU in accordance with examples as disclosed herein. The service message relay manager 1340 may be configured as or otherwise support a means for communicating a set of multiple service messages between a UE and a set of multiple core network services of a service-based network that are active at the UE. In some examples, the handover procedure manager 1325 may be configured as or otherwise support a means for transmitting, to a core network mobility service of the set of multiple core network services, a message associated with a satisfaction of a trigger condition for a handover procedure at the UE. The handover command receiving manager 1345 may be configured as or otherwise support a means for receiving, from the core network mobility service based on the message, a handover command indicating a second DU that supports at least one core network service of a set of multiple core network services that are active at the UE. The handover request transmitting manager 1350 may be configured as or otherwise support a means for transmitting the handover command to the UE, the handover command including an instruction for the UE to perform the handover procedure from the first DU to the second DU.

In some examples, the capability information transmitting manager 1380 may be configured as or otherwise support a means for transmitting capability information associated with the UE to the core network mobility service, an additional core network service of the set of multiple core network services, or both, where receiving the handover command is based on the capability information.

In some examples, the handover procedure manager 1325 may be configured as or otherwise support a means for transmitting, to the core network mobility service, an additional core network service of the set of multiple core network services, or both, an indication of the set of multiple core network services that are active at the UE, where receiving the handover command is based on transmitting the indication of the set of multiple core network services that are active at the UE.

In some examples, the communication tunnel manager 1385 may be configured as or otherwise support a means for establishing a communication tunnel with the second DU based on the handover command. In some examples, the service message relay manager 1340 may be configured as or otherwise support a means for receiving a second message for the UE prior to a completion of the handover procedure. In some examples, the service message relay manager 1340 may be configured as or otherwise support a means for transmitting one or more packets associated with the second message to the second DU via the communication tunnel for relay to the UE.

In some examples, the handover procedure manager 1325 may be configured as or otherwise support a means for transmitting, via the message, an indication of a set of multiple candidate DUs including the second DU and one or more cell identifiers associated with one or more serving cells supported by the second DU, where receiving the handover command is based on transmitting the indication of the set of multiple candidate DUs.

In some examples, the handover command receiving manager 1345 may be configured as or otherwise support a means for receiving, via the handover command, an indication of the at least one core network service supported by the second DU. In some examples, the handover command transmitting manager 1335 may be configured as or otherwise support a means for transmitting, to the UE via the handover command, the indication of the at least one core network service supported by the second DU.

In some examples, the handover procedure manager 1325 may be configured as or otherwise support a means for receiving, from the core network mobility service, a measurement configuration indicating one or more trigger conditions including the trigger condition. In some examples, the handover procedure manager 1325 may be configured as or otherwise support a means for transmitting the measurement configuration to the UE, where transmitting the message associated with the satisfaction of the trigger condition is based on the measurement configuration.

In some examples, the handover procedure manager 1325 may be configured as or otherwise support a means for receiving, from the UE based on the measurement configuration, a measurement report, a second message indicating the trigger condition, or both, where transmitting the message associated with the satisfaction of the trigger condition is based on receiving the measurement report, the second message indicating the trigger condition, or both.

Additionally, or alternatively, the communications manager 1320 may support wireless communication at a second DU in accordance with examples as disclosed herein. The handover request receiving manager 1355 may be configured as or otherwise support a means for receiving, from a core network mobility service of a service-based network, a handover request associated with a handover procedure at a UE from a first DU to the second DU. The ACK message transmitting manager 1360 may be configured as or otherwise support a means for transmitting an ACK message to the core network mobility service based on the handover request, the ACK message indicating at least one core network service of a set of multiple core network services that is active at the UE and supported by the second DU. The UE communicating manager 1365 may be configured as or otherwise support a means for communicating with the UE based on the handover request and the ACK message. In some examples, the handover procedure manager 1325 may be configured as or otherwise support a means for transmitting, to the core network mobility service based on communicating with the UE, a second message indicating a completion of the handover procedure.

In some examples, the handover request receiving manager 1355 may be configured as or otherwise support a means for receiving, via the handover request, an indication of the set of multiple core network services that are active at the UE, where transmitting the ACK message is based on the set of multiple core network services that are active at the UE.

In some examples, the communication tunnel manager 1385 may be configured as or otherwise support a means for establishing a communication tunnel with the first DU based on the handover request, the ACK message, or both. In some examples, the service message relay manager 1340 may be configured as or otherwise support a means for receiving, from the first DU via the communication tunnel, one or more data packets associated with a second message for the UE prior to a completion of the handover procedure. In some examples, the service message relay manager 1340 may be configured as or otherwise support a means for transmitting the one or more data packets associated with the second message to the UE based on receiving the one or more data packets via the communication tunnel.

In some examples, the ACK message transmitting manager 1360 may be configured as or otherwise support a means for transmitting, to the core network mobility service via the ACK message, a set of communication parameters for communications between the UE and the second DU, where communicating with the UE is based on the set of communication parameters.

Figure 14:
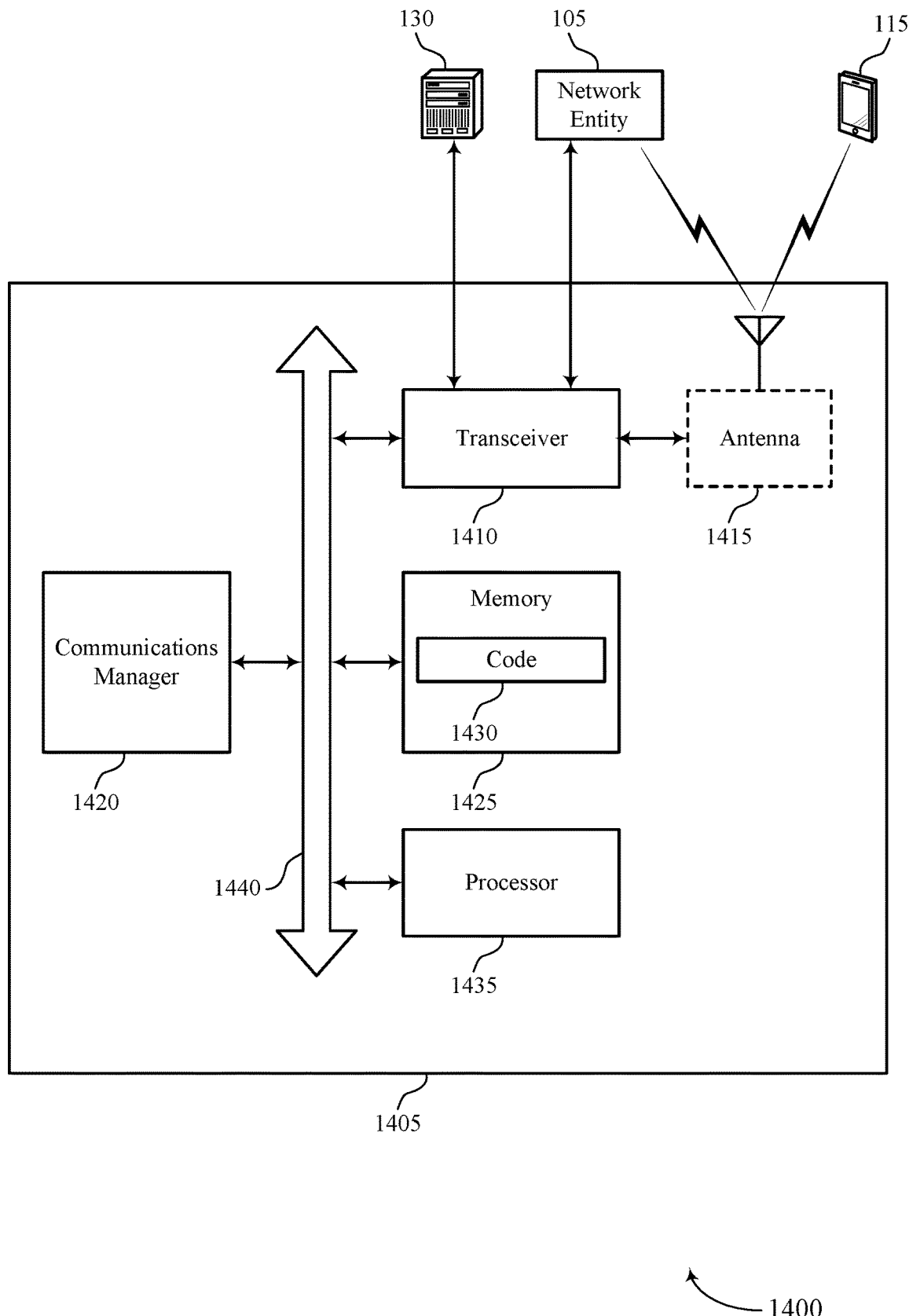
FIG. 14 shows a diagram of a system including a device that supports techniques for connected state mobility in a service-based wireless system in accordance with one or more aspects of the present disclosure.

FIG. 14 shows a diagram of a system 1400 including a device 1405 that supports techniques for connected state mobility in a service-based wireless system in accordance with one or more aspects of the present disclosure. The device 1405 may be an example of or include the components of a device 1105, a device 1205, or a network entity 105 as described herein. The device 1405 may communicate with one or more network entities 105, one or more UEs 115, or any combination thereof, which may include communications over one or more wired interfaces, over one or more wireless interfaces, or any combination thereof. The device 1405 may include components that support outputting and obtaining communications, such as a communications manager 1420, a transceiver 1410, an antenna 1415, a memory 1425, code 1430, and a processor 1435. These components may be in electronic communication or otherwise coupled (e.g., operatively, communicatively, functionally, electronically, electrically) via one or more buses (e.g., a bus 1440).

The transceiver 1410 may support bi-directional communications via wired links, wireless links, or both as described herein. In some examples, the transceiver 1410 may include a wired transceiver and may communicate bi-directionally with another wired transceiver. Additionally, or alternatively, in some examples, the transceiver 1410 may include a wireless transceiver and may communicate bi-directionally with another wireless transceiver. In some examples, the device 1405 may include one or more antennas 1415, which may be capable of transmitting or receiving wireless transmissions (e.g., concurrently). The transceiver 1410 may also include a modem to modulate signals, to provide the modulated signals for transmission (e.g., by one or more antennas 1415, by a wired transmitter), to receive modulated signals (e.g., from one or more antennas 1415, from a wired receiver), and to demodulate signals. In some implementations, the transceiver 1410 may include one or more interfaces, such as one or more interfaces coupled with the one or more antennas 1415 that are configured to support various receiving or obtaining operations, or one or more interfaces coupled with the one or more antennas 1415 that are configured to support various transmitting or outputting operations, or a combination thereof. In some implementations, the transceiver 1410 may include or be configured for coupling with one or more processors or memory components that are operable to perform or support operations based on received or obtained information or signals, or to generate information or other signals for transmission or other outputting, or any combination thereof. In some implementations, the transceiver 1410, or the transceiver 1410 and the one or more antennas 1415, or the transceiver 1410 and the one or more antennas 1415 and one or more processors or memory components (for example, the processor 1435, or the memory 1425, or both), may be included in a chip or chip assembly that is installed in the device 1405. In some examples, the transceiver may be operable to support communications via one or more communications links (e.g., a communication link 125, a backhaul communication link 120, a midhaul communication link, a fronthaul communication link 168).

The memory 1425 may include RAM and ROM. The memory 1425 may store computer-readable, computer-executable code 1430 including instructions that, when executed by the processor 1435, cause the device 1405 to perform various functions described herein. The code 1430 may be stored in a non-transitory computer-readable medium such as system memory or another type of memory. In some cases, the code 1430 may not be directly executable by the processor 1435 but may cause a computer (e.g., when compiled and executed) to perform functions described herein. In some cases, the memory 1425 may contain, among other things, a BIOS which may control basic hardware or software operation such as the interaction with peripheral components or devices.

The processor 1435 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1435 may be configured to operate a memory array using a memory controller. In some other cases, a memory controller may be integrated into the processor 1435. The processor 1435 may be configured to execute computer-readable instructions stored in a memory (e.g., the memory 1425) to cause the device 1405 to perform various functions (e.g., functions or tasks supporting techniques for connected state mobility in a service-based wireless system). For example, the device 1405 or a component of the device 1405 may include a processor 1435 and memory 1425 coupled with the processor 1435, the processor 1435 and memory 1425 configured to perform various functions described herein. The processor 1435 may be an example of a cloud-computing platform (e.g., one or more physical nodes and supporting software such as operating systems, virtual machines, or container instances) that may host the functions (e.g., by executing code 1430) to perform the functions of the device 1405. The processor 1435 may be any one or more suitable processors capable of executing scripts or instructions of one or more software programs stored in the device 1405 (such as within the memory 1425). In some implementations, the processor 1435 may be a component of a processing system. A processing system may generally refer to a system or series of machines or components that receives inputs and processes the inputs to produce a set of outputs (which may be passed to other systems or components of, for example, the device 1405). For example, a processing system of the device 1405 may refer to a system including the various other components or subcomponents of the device 1405, such as the processor 1435, or the transceiver 1410, or the communications manager 1420, or other components or combinations of components of the device 1405. The processing system of the device 1405 may interface with other components of the device 1405, and may process information received from other components (such as inputs or signals) or output information to other components. For example, a chip or modem of the device 1405 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1405 may transmit information output from the chip or modem. Additionally, or alternatively, in some implementations, the one or more interfaces may refer to an interface between the processing system of the chip or modem and a receiver, such that the device 1405 may obtain information or signal inputs, and the information may be passed to the processing system. A person having ordinary skill in the art will readily recognize that a first interface also may obtain information or signal inputs, and a second interface also may output information or signal outputs.

In some examples, a bus 1440 may support communications of (e.g., within) a protocol layer of a protocol stack. In some examples, a bus 1440 may support communications associated with a logical channel of a protocol stack (e.g., between protocol layers of a protocol stack), which may include communications performed within a component of the device 1405, or between different components of the device 1405 that may be co-located or located in different locations (e.g., where the device 1405 may refer to a system in which one or more of the communications manager 1420, the transceiver 1410, the memory 1425, the code 1430, and the processor 1435 may be located in one of the different components or divided between different components).

In some examples, the communications manager 1420 may manage aspects of communications with a core network (e.g., via one or more wired or wireless backhaul links). For example, the communications manager 1420 may manage the transfer of data communications for client devices, such as one or more UEs 115. In some examples, the communications manager 1420 may manage communications with other network entities 105, and may include a controller or scheduler for controlling communications with UEs 115 in cooperation with other network entities 105. In some examples, the communications manager 1420 may support an X2 interface within an LTE/LTE-A wireless communications network technology to provide communication between network entities 105.

The communications manager 1420 may support wireless communication at a core network mobility service in accordance with examples as disclosed herein. For example, the communications manager 1420 may be configured as or otherwise support a means for receiving, from a first DU configured to communicate with a UE, a message associated with a satisfaction of a trigger condition for a handover procedure at the UE. The communications manager 1420 may be configured as or otherwise support a means for selecting, based on the message, a second DU from a set of multiple candidate DUs based on the second DU being configured to support at least one core network service that is active at the UE of a set of multiple core network services of a service-based network. The communications manager 1420 may be configured as or otherwise support a means for transmitting, to the first DU for relay to the UE and based on selecting the second DU, a handover command indicating the second DU and an instruction to perform the handover procedure from the first DU to the second DU.

Additionally, or alternatively, the communications manager 1420 may support wireless communication at a first DU in accordance with examples as disclosed herein. For example, the communications manager 1420 may be configured as or otherwise support a means for communicating a set of multiple service messages between a UE and a set of multiple core network services of a service-based network that are active at the UE. The communications manager 1420 may be configured as or otherwise support a means for transmitting, to a core network mobility service of the set of multiple core network services, a message associated with a satisfaction of a trigger condition for a handover procedure at the UE. The communications manager 1420 may be configured as or otherwise support a means for receiving, from the core network mobility service based on the message, a handover command indicating a second DU that supports at least one core network service of a set of multiple core network services that are active at the UE. The communications manager 1420 may be configured as or otherwise support a means for transmitting the handover command to the UE, the handover command including an instruction for the UE to perform the handover procedure from the first DU to the second DU.

Additionally, or alternatively, the communications manager 1420 may support wireless communication at a second DU in accordance with examples as disclosed herein. For example, the communications manager 1420 may be configured as or otherwise support a means for receiving, from a core network mobility service of a service-based network, a handover request associated with a handover procedure at a UE from a first DU to the second DU. The communications manager 1420 may be configured as or otherwise support a means for transmitting an ACK message to the core network mobility service based on the handover request, the ACK message indicating at least one core network service of a set of multiple core network services that is active at the UE and supported by the second DU. The communications manager 1420 may be configured as or otherwise support a means for communicating with the UE based on the handover request and the ACK message. The communications manager 1420 may be configured as or otherwise support a means for transmitting, to the core network mobility service based on communicating with the UE, a second message indicating a completion of the handover procedure.

By including or configuring the communications manager 1420 in accordance with examples as described herein, the device 1405 may support techniques that enable UEs 115 to perform handover procedures between DUs 165 and/or between network entities 105 of a service-based wireless system while minimizing disruptions to active core network services at the UE 115. In particular, aspects of the present disclosure support techniques which enable UEs 115 to perform handover procedures to target DUs/target network entities which support at least some of the active core network services at the UE 115. As such, aspects, of the present disclosure may reduce interruptions to communications performed with core network services, thereby preventing the need for UEs 115 to continually re-establish communications with core network services. In this regard, techniques described herein may reduce signaling associated with UEs 115 subscribing to core network services, reduce interruptions, and improve overall user experience.

In some examples, the communications manager 1420 may be configured to perform various operations (e.g., receiving, obtaining, monitoring, outputting, transmitting) using or otherwise in cooperation with the transceiver 1410, the one or more antennas 1415 (e.g., where applicable), or any combination thereof. Although the communications manager 1420 is illustrated as a separate component, in some examples, one or more functions described with reference to the communications manager 1420 may be supported by or performed by the transceiver 1410, the processor 1435, the memory 1425, the code 1430, or any combination thereof. For example, the code 1430 may include instructions executable by the processor 1435 to cause the device 1405 to perform various aspects of techniques for connected state mobility in a service-based wireless system as described herein, or the processor 1435 and the memory 1425 may be otherwise configured to perform or support such operations.

Figure 15:
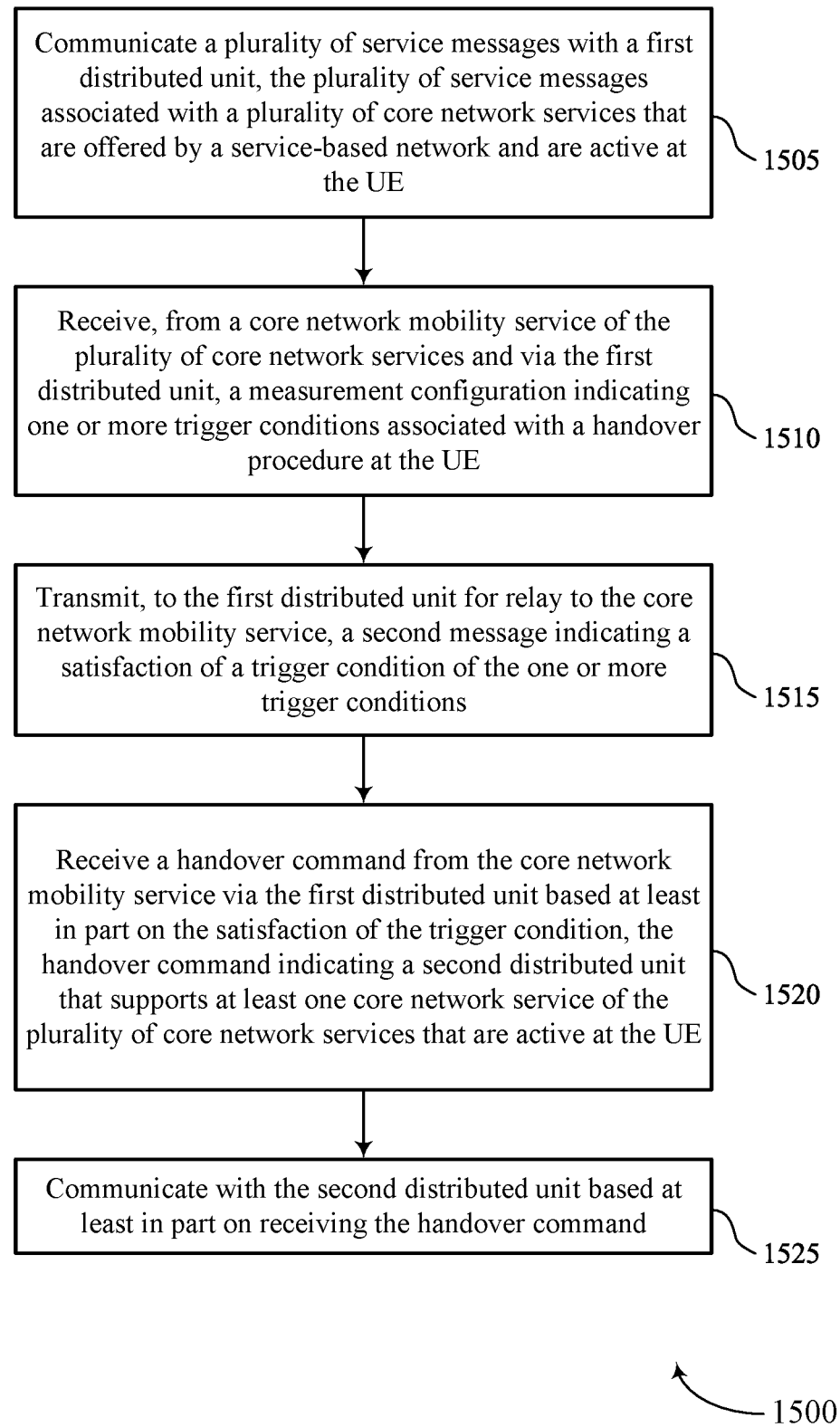
FIGS. 15 through 18 show flowcharts illustrating methods that support techniques for connected state mobility in a service-based wireless system in accordance with one or more aspects of the present disclosure.

FIG. 15 shows a flowchart illustrating a method 1500 that supports techniques for connected state mobility in a service-based wireless system in accordance with one or more aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1505, the method may include communicating a set of multiple service messages with a first DU, the set of multiple service messages associated with a set of multiple core network services that are offered by a service-based network and are active at the UE. The operations of 1505 may be performed in accordance with examples as disclosed herein. In some examples, aspects of the operations of 1505 may be performed by a service message communicating manager 925 as described with reference to FIG. 9.

At 1510, the method may include receiving, from a core network mobility service of the set of multiple core network services and via the first DU, a measurement configuration indicating one or more trigger conditions associated with a handover procedure at the UE. The operations of 1510 may be performed in accordance with examples as disclosed herein. In some examples, aspects of the operations of 1510 may be performed by a measurement configuration manager 930 as described with reference to FIG. 9.

At 1515, the method may include transmitting, to the first DU for relay to the core network mobility service, a second message indicating a satisfaction of a trigger condition of the one or more trigger conditions. The operations of 1515 may be performed in accordance with examples as disclosed herein. In some examples, aspects of the operations of 1515 may be performed by a measurement configuration manager 930 as described with reference to FIG. 9.

At 1520, the method may include receiving a handover command from the core network mobility service via the first DU based on the satisfaction of the trigger condition, the handover command indicating a second DU that supports at least one core network service of the set of multiple core network services that are active at the UE. The operations of 1520 may be performed in accordance with examples as disclosed herein. In some examples, aspects of the operations of 1520 may be performed by a handover command receiving manager 935 as described with reference to FIG. 9.

At 1525, the method may include communicating with the second DU based on receiving the handover command. The operations of 1525 may be performed in accordance with examples as disclosed herein. In some examples, aspects of the operations of 1525 may be performed by a service message communicating manager 925 as described with reference to FIG. 9.

Figure 16:
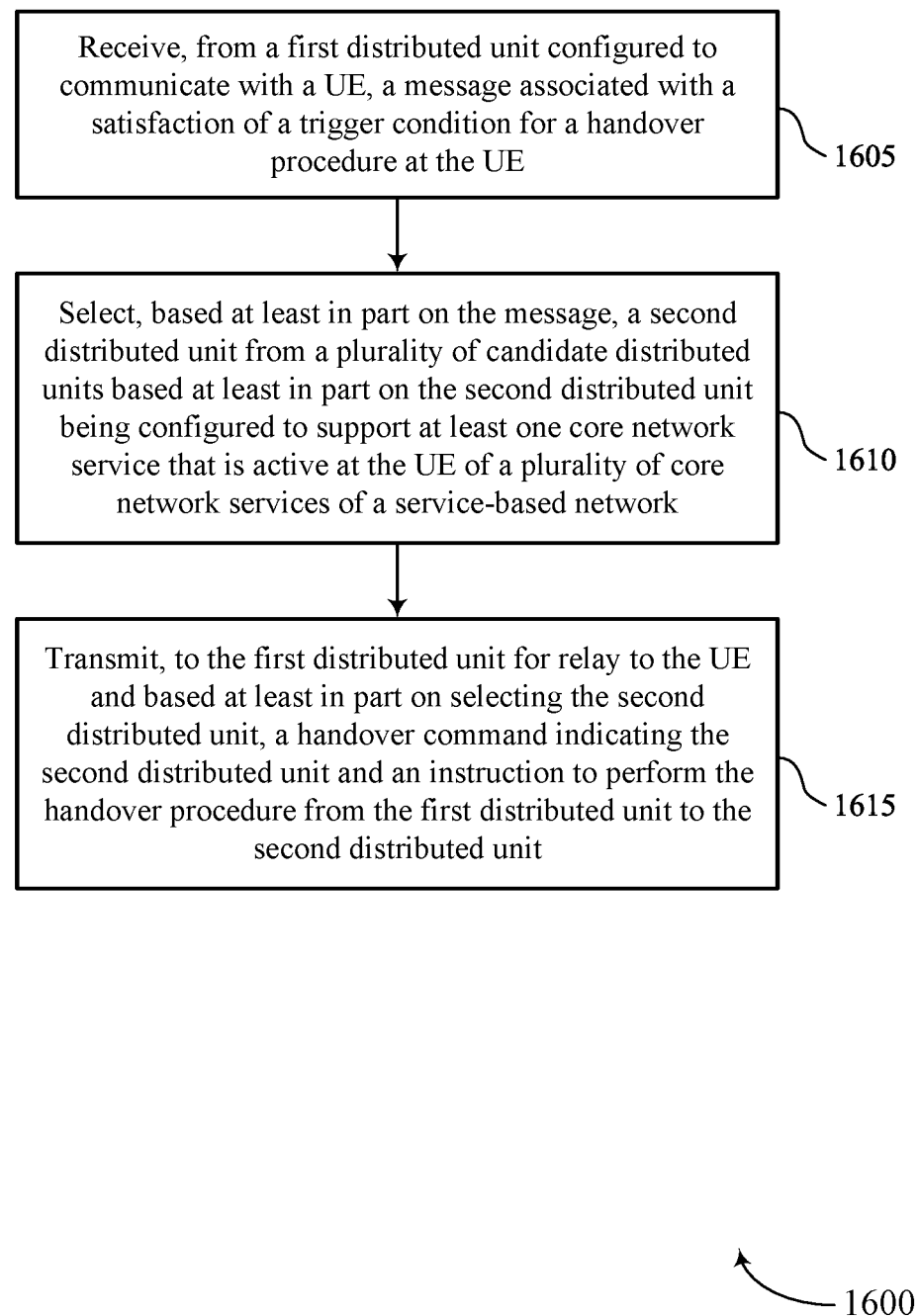

FIG. 16 shows a flowchart illustrating a method 1600 that supports techniques for connected state mobility in a service-based wireless system in accordance with one or more aspects of the present disclosure. The operations of the method 1600 may be implemented by a network entity or its components as described herein. For example, the operations of the method 1600 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 1605, the method may include receiving, from a first DU configured to communicate with a UE, a message associated with a satisfaction of a trigger condition for a handover procedure at the UE. The operations of 1605 may be performed in accordance with examples as disclosed herein. In some examples, aspects of the operations of 1605 may be performed by a handover procedure manager 1325 as described with reference to FIG. 13.

At 1610, the method may include selecting, based on the message, a second DU from a set of multiple candidate DUs based on the second DU being configured to support at least one core network service that is active at the UE of a set of multiple core network services of a service-based network. The operations of 1610 may be performed in accordance with examples as disclosed herein. In some examples, aspects of the operations of 1610 may be performed by a target cell selection manager 1330 as described with reference to FIG. 13.

At 1615, the method may include transmitting, to the first DU for relay to the UE and based on selecting the second DU, a handover command indicating the second DU and an instruction to perform the handover procedure from the first DU to the second DU. The operations of 1615 may be performed in accordance with examples as disclosed herein. In some examples, aspects of the operations of 1615 may be performed by a handover command transmitting manager 1335 as described with reference to FIG. 13.

Figure 17:
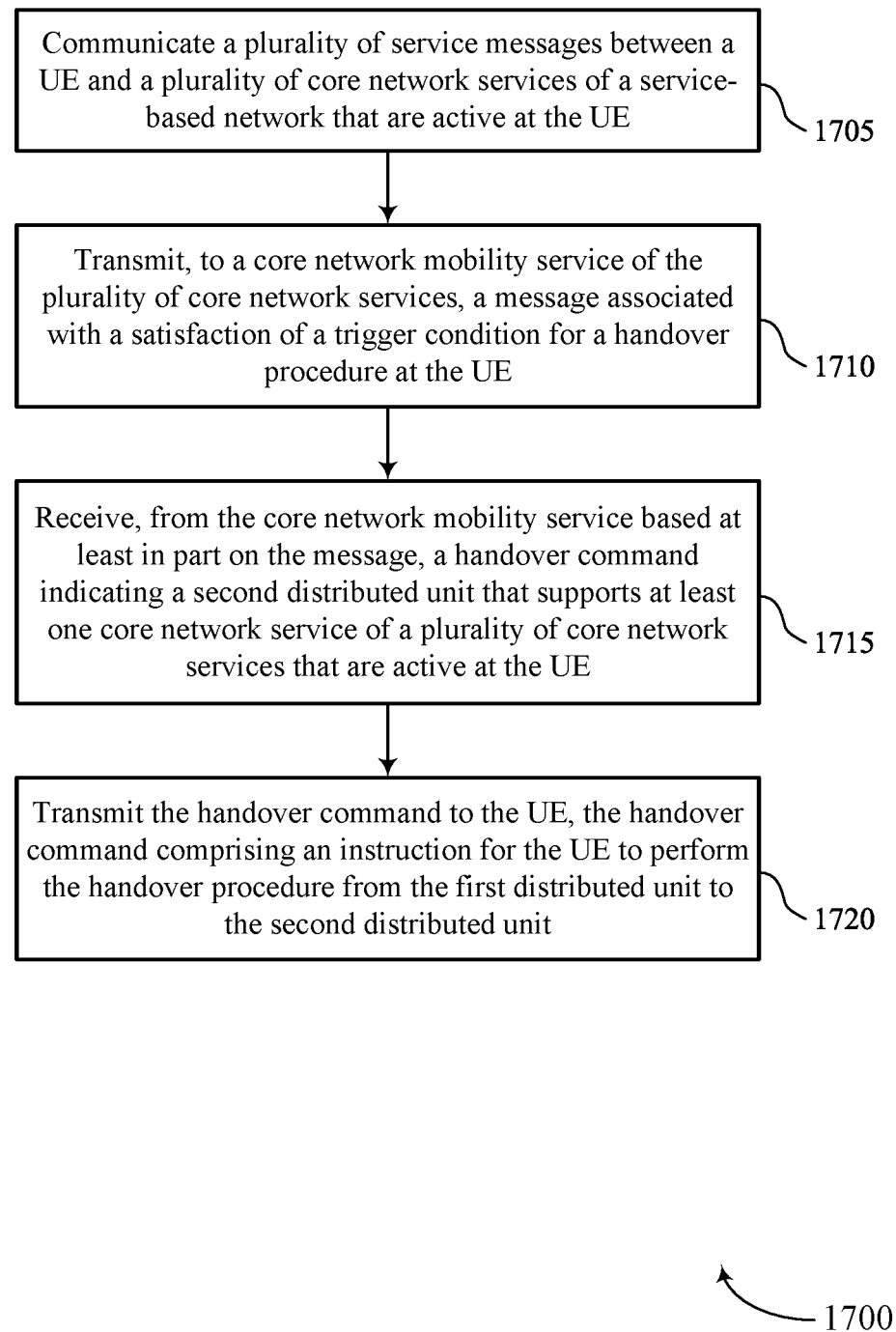

FIG. 17 shows a flowchart illustrating a method 1700 that supports techniques for connected state mobility in a service-based wireless system in accordance with one or more aspects of the present disclosure. The operations of the method 1700 may be implemented by a network entity or its components as described herein. For example, the operations of the method 1700 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 1705, the method may include communicating a set of multiple service messages between a UE and a set of multiple core network services of a service-based network that are active at the UE. The operations of 1705 may be performed in accordance with examples as disclosed herein. In some examples, aspects of the operations of 1705 may be performed by a service message relay manager 1340 as described with reference to FIG. 13.

At 1710, the method may include transmitting, to a core network mobility service of the set of multiple core network services, a message associated with a satisfaction of a trigger condition for a handover procedure at the UE. The operations of 1710 may be performed in accordance with examples as disclosed herein. In some examples, aspects of the operations of 1710 may be performed by a handover procedure manager 1325 as described with reference to FIG. 13.

At 1715, the method may include receiving, from the core network mobility service based on the message, a handover command indicating a second DU that supports at least one core network service of a set of multiple core network services that are active at the UE. The operations of 1715 may be performed in accordance with examples as disclosed herein. In some examples, aspects of the operations of 1715 may be performed by a handover command receiving manager 1345 as described with reference to FIG. 13.

At 1720, the method may include transmitting the handover command to the UE, the handover command including an instruction for the UE to perform the handover procedure from the first DU to the second DU. The operations of 1720 may be performed in accordance with examples as disclosed herein. In some examples, aspects of the operations of 1720 may be performed by a handover request transmitting manager 1350 as described with reference to FIG. 13.

Figure 18:
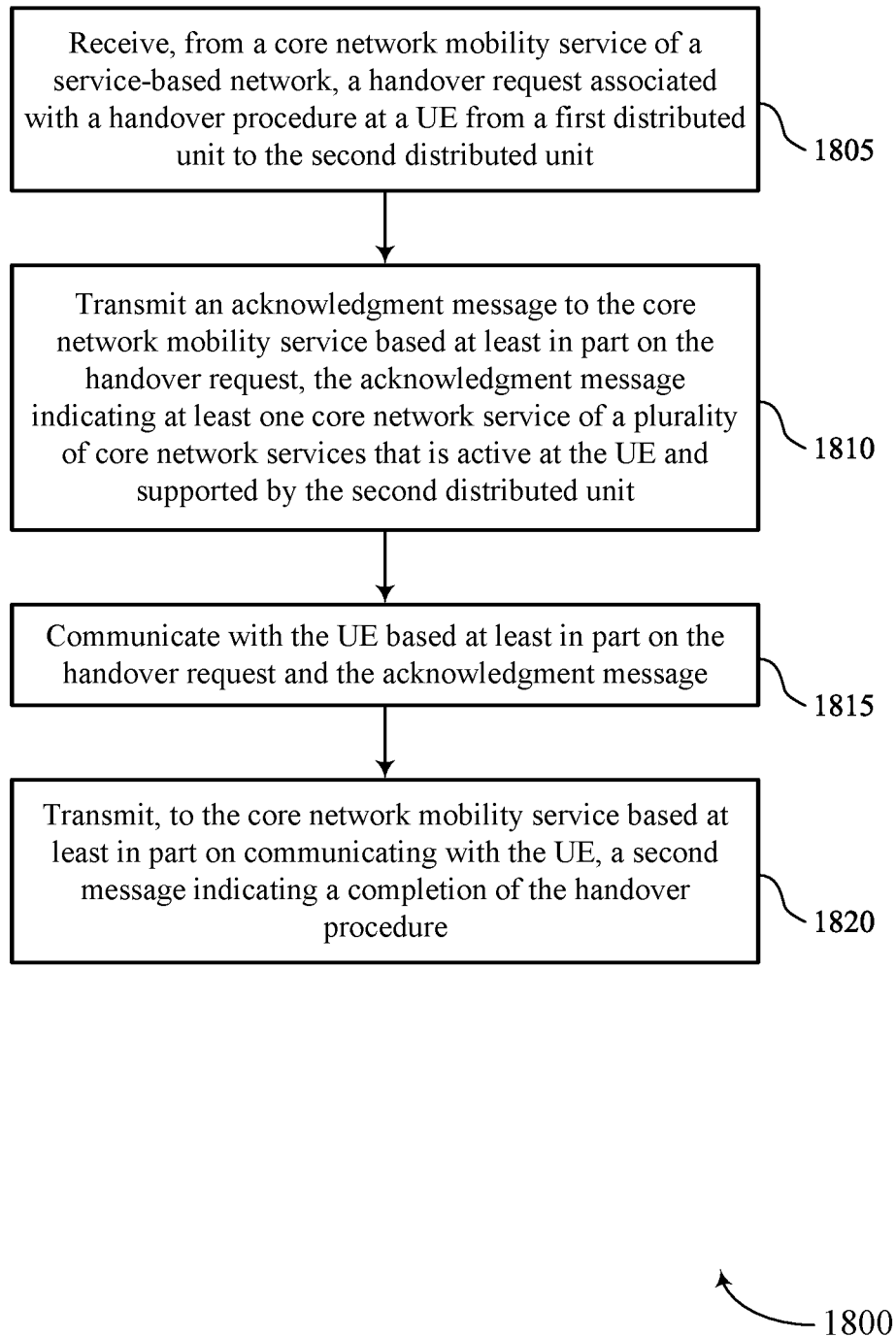

FIG. 18 shows a flowchart illustrating a method 1800 that supports techniques for connected state mobility in a service-based wireless system in accordance with one or more aspects of the present disclosure. The operations of the method 1800 may be implemented by a network entity or its components as described herein. For example, the operations of the method 1800 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 1805, the method may include receiving, from a core network mobility service of a service-based network, a handover request associated with a handover procedure at a UE from a first DU to the second DU. The operations of 1805 may be performed in accordance with examples as disclosed herein. In some examples, aspects of the operations of 1805 may be performed by a handover request receiving manager 1355 as described with reference to FIG. 13.

At 1810, the method may include transmitting an ACK message to the core network mobility service based on the handover request, the ACK message indicating at least one core network service of a set of multiple core network services that is active at the UE and supported by the second DU. The operations of 1810 may be performed in accordance with examples as disclosed herein. In some examples, aspects of the operations of 1810 may be performed by an ACK message transmitting manager 1360 as described with reference to FIG. 13.

At 1815, the method may include communicating with the UE based on the handover request and the ACK message. The operations of 1815 may be performed in accordance with examples as disclosed herein. In some examples, aspects of the operations of 1815 may be performed by a UE communicating manager 1365 as described with reference to FIG. 13.

At 1820, the method may include transmitting, to the core network mobility service based on communicating with the UE, a second message indicating a completion of the handover procedure. The operations of 1820 may be performed in accordance with examples as disclosed herein. In some examples, aspects of the operations of 1820 may be performed by a handover procedure manager 1325 as described with reference to FIG. 13.

The following provides an overview of aspects of the present disclosure:

Aspect 1: A method for wireless communication at a UE, comprising: communicating a plurality of service messages with a first DU, the plurality of service messages associated with a plurality of core network services that are offered by a service-based network and are active at the UE; receiving, from a core network mobility service of the plurality of core network services and via the first DU, a measurement configuration indicating one or more trigger conditions associated with a handover procedure at the UE; transmitting, to the first DU for relay to the core network mobility service, a second message indicating a satisfaction of a trigger condition of the one or more trigger conditions; receiving a handover command from the core network mobility service via the first DU based at least in part on the satisfaction of the trigger condition, the handover command indicating a second DU that supports at least one core network service of the plurality of core network services that are active at the UE; and communicating with the second DU based at least in part on receiving the handover command.

Aspect 2: The method of aspect 1, further comprising: transmitting capability information associated with the UE to the first DU, the core network mobility service, an additional core network service of the plurality of core network services, or any combination thereof, wherein receiving the handover command is based at least in part on the capability information.

Aspect 3: The method of any of aspects 1 through 2, further comprising: receiving, via the handover command, a cell identifier associated with a serving cell supported by the second DU and a set of communication parameters for communicating with the serving cell, wherein communicating with the second DU is based at least in part on the cell identifier and the set of communication parameters.

Aspect 4: The method of any of aspects 1 through 3, further comprising: transmitting, to a network address associated with the core network mobility service, a service request for establishing service with the core network mobility service; and receiving control signaling indicating a service context for communicating with the core network mobility service based at least in part on the service request, wherein transmitting the second message, receiving the handover command, or both, is based at least in part on the service context.

Aspect 5: The method of any of aspects 1 through 4, further comprising: performing measurements on signals received from the first DU and one or more candidate DUs including the second DU, wherein the measurements are performed in accordance with the measurement configuration, and wherein transmitting the second message is based at least in part on performing the measurements.

Aspect 6: A method for wireless communication at a core network mobility service, comprising: receiving, from a first DU in wireless communication with a UE, a message associated with a satisfaction of a trigger condition for a handover procedure at the UE; selecting, based at least in part on the message, a second DU from a plurality of candidate DUs based at least in part on the second DU being configured to support at least one core network service that is active at the UE of a plurality of core network services of a service-based network; and transmitting, to the first DU for relay to the UE and based at least in part on selecting the second DU, a handover command indicating the second DU and an instruction to perform the handover procedure from the first DU to the second DU.

Aspect 7: The method of aspect 6, further comprising: transmitting a handover request to the second DU based at least in part on the message; and receiving an ACK message from the second DU based at least in part on the handover request, wherein transmitting the handover command is based at least in part on the ACK message.

Aspect 8: The method of aspect 7, further comprising: transmitting, via the handover request, an indication of the plurality of core network services that are active at the UE, wherein the ACK message is based at least in part on the plurality of core network services that are active at the UE.

Aspect 9: The method of any of aspects 7 through 8, further comprising: receiving, via the ACK message, an indication of the at least one core network service supported by the second DU, wherein transmitting the handover command is based at least in part on receiving the indication of the at least one core network service.

Aspect 10: The method of any of aspects 6 through 9, further comprising: receiving capability information associated with the UE, wherein selecting the second DU from the plurality of candidate DUs is based at least in part on the capability information.

Aspect 11: The method of aspect 10, wherein the capability information is received from a core network capability service included within the plurality of core network services.

Aspect 12: The method of any of aspects 6 through 11, wherein selecting the second DU from the plurality of candidate DUs is based at least in part on a mobility history of the UE, a traffic load associated with the second DU, or both.

Aspect 13: The method of any of aspects 6 through 12, further comprising: receiving, via the message, an indication of the plurality of candidate DUs, wherein selecting the second DU is based at least in part on receiving the indication of the plurality of candidate DUs.

Aspect 14: The method of any of aspects 6 through 13, wherein selecting the second DU comprises: selecting a serving cell supported by the second DU, wherein the handover command comprises a cell identifier associated with the selected serving cell.

Aspect 15: The method of any of aspects 6 through 14, further comprising: receiving, from the second DU, a second message indicating a completion of the handover procedure; and communicating with the UE via the second DU based at least in part on the second message.

Aspect 16: The method of any of aspects 6 through 15, further comprising: transmitting, to the first DU for relay to the UE, a measurement configuration indicating one or more trigger conditions including the trigger condition, wherein receiving the message is based at least in part on the measurement configuration.

Aspect 17: A method for wireless communication at a first DU, comprising: communicating a plurality of service messages between a UE and a plurality of core network services of a service-based network that are active at the UE; transmitting, to a core network mobility service of the plurality of core network services, a message associated with a satisfaction of a trigger condition for a handover procedure at the UE; receiving, from the core network mobility service based at least in part on the message, a handover command indicating a second DU that supports at least one core network service of a plurality of core network services that are active at the UE; and transmitting the handover command to the UE, the handover command comprising an instruction for the UE to perform the handover procedure from the first DU to the second DU.

Aspect 18: The method of aspect 17, further comprising: transmitting capability information associated with the UE to the core network mobility service, an additional core network service of the plurality of core network services, or both, wherein receiving the handover command is based at least in part on the capability information.

Aspect 19: The method of any of aspects 17 through 18, further comprising: transmitting, to the core network mobility service, an additional core network service of the plurality of core network services, or both, an indication of the plurality of core network services that are active at the UE, wherein receiving the handover command is based at least in part on transmitting the indication of the plurality of core network services that are active at the UE.

Aspect 20: The method of any of aspects 17 through 19, further comprising: establishing a communication tunnel with the second DU based at least in part on the handover command; receiving a second message for the UE prior to a completion of the handover procedure; and transmitting one or more packets to the second DU via the communication tunnel for relay to the UE based at least in part on receiving the second message.

Aspect 21: The method of any of aspects 17 through 20, further comprising: transmitting, via the message, an indication of a plurality of candidate DUs including the second DU and one or more cell identifiers associated with one or more serving cells supported by the second DU, wherein receiving the handover command is based at least in part on transmitting the indication of the plurality of candidate DUs.

Aspect 22: The method of any of aspects 17 through 21, further comprising: receiving, via the handover command, an indication of the at least one core network service supported by the second DU; and transmitting, to the UE via the handover command, the indication of the at least one core network service supported by the second DU.

Aspect 23: The method of any of aspects 17 through 22, further comprising: receiving, from the core network mobility service, a measurement configuration indicating one or more trigger conditions including the trigger condition; and transmitting the measurement configuration to the UE, wherein transmitting the message associated with the satisfaction of the trigger condition is based at least in part on the measurement configuration.

Aspect 24: The method of aspect 23, further comprising: receiving, from the UE based at least in part on the measurement configuration, a measurement report, a second message indicating the trigger condition, or both, wherein transmitting the message associated with the satisfaction of the trigger condition is based at least in part on receiving the measurement report, the second message indicating the trigger condition, or both.

Aspect 25: A method for wireless communication at a second DU, comprising: receiving, from a core network mobility service of a service-based network, a handover request associated with a handover procedure at a UE from a first DU to the second DU; transmitting an ACK message to the core network mobility service based at least in part on the handover request, the ACK message indicating at least one core network service of a plurality of core network services that is active at the UE and supported by the second DU; communicating with the UE based at least in part on the handover request and the ACK message; and transmitting, to the core network mobility service based at least in part on communicating with the UE, a second message indicating a completion of the handover procedure.

Aspect 26: The method of aspect 25, further comprising: receiving, via the handover request, an indication of the plurality of core network services that are active at the UE, wherein transmitting the ACK message is based at least in part on the plurality of core network services that are active at the UE.

Aspect 27: The method of any of aspects 25 through 26, further comprising: establishing a communication tunnel with the first DU based at least in part on the handover request, the ACK message, or both; receiving, from the first DU via the communication tunnel, one or more data packets associated with a second message for the UE prior to a completion of the handover procedure; and transmitting the one or more data packets associated with the second message to the UE based at least in part on receiving the one or more data packets via the communication tunnel.

Aspect 28: The method of any of aspects 25 through 27, further comprising: transmitting, to the core network mobility service via the ACK message, a set of communication parameters for communications between the UE and the second DU, wherein communicating with the UE is based at least in part on the set of communication parameters.

Aspect 29: An apparatus for wireless communication at a UE, comprising a processor; memory coupled with the processor; and instructions stored in the memory and executable by the processor to cause the apparatus to perform a method of any of aspects 1 through 5.

Aspect 30: An apparatus for wireless communication at a UE, comprising at least one means for performing a method of any of aspects 1 through 5.

Aspect 31: A non-transitory computer-readable medium storing code for wireless communication at a UE, the code comprising instructions executable by a processor to perform a method of any of aspects 1 through 5.

Aspect 32: An apparatus for wireless communication at a core network mobility service, comprising a processor; memory coupled with the processor; and instructions stored in the memory and executable by the processor to cause the apparatus to perform a method of any of aspects 6 through 16.

Aspect 33: An apparatus for wireless communication at a core network mobility service, comprising at least one means for performing a method of any of aspects 6 through 16.

Aspect 34: A non-transitory computer-readable medium storing code for wireless communication at a core network mobility service, the code comprising instructions executable by a processor to perform a method of any of aspects 6 through 16.

Aspect 35: An apparatus for wireless communication at a first DU, comprising a processor; memory coupled with the processor; and instructions stored in the memory and executable by the processor to cause the apparatus to perform a method of any of aspects 17 through 24.

Aspect 36: An apparatus for wireless communication at a first DU, comprising at least one means for performing a method of any of aspects 17 through 24.

Aspect 37: A non-transitory computer-readable medium storing code for wireless communication at a first DU, the code comprising instructions executable by a processor to perform a method of any of aspects 17 through 24.

Aspect 38: An apparatus for wireless communication at a second DU, comprising a processor; memory coupled with the processor; and instructions stored in the memory and executable by the processor to cause the apparatus to perform a method of any of aspects 25 through 28.

Aspect 39: An apparatus for wireless communication at a second DU, comprising at least one means for performing a method of any of aspects 25 through 28.

Aspect 40: A non-transitory computer-readable medium storing code for wireless communication at a second DU, the code comprising instructions executable by a processor to perform a method of any of aspects 25 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   communicating a plurality of service messages with a first distributed unit, the plurality of service messages associated with a plurality of core network services that are offered by a service-based network via one or more application programming interfaces and that are active at the UE;
   receiving, from a core network mobility service of the plurality of core network services and via the first distributed unit, a measurement configuration indicating one or more trigger conditions associated with a handover procedure at the UE;
   transmitting, to the first distributed unit for relay to the core network mobility service, a second message indicating a satisfaction of a trigger condition of the one or more trigger conditions;
   receiving a handover command from the core network mobility service via the first distributed unit based at least in part on the satisfaction of the trigger condition, the handover command indicating a second distributed unit that supports at least one core network service of the plurality of core network services that are active at the UE; and
   communicating with the second distributed unit based at least in part on receiving the handover command.

2. The method of claim 1, further comprising:
   transmitting capability information associated with the UE to the first distributed unit, the core network mobility service, an additional core network service of the plurality of core network services, or any combination thereof, wherein receiving the handover command is based at least in part on the capability information.

3. The method of claim 1, further comprising:
   receiving, via the handover command, a cell identifier associated with a serving cell supported by the second distributed unit and a set of communication parameters for communicating with the serving cell, wherein communicating with the second distributed unit is based at least in part on the cell identifier and the set of communication parameters.

4. The method of claim 1, further comprising:
   transmitting, to a network address associated with the core network mobility service, a service request for establishing service with the core network mobility service; and
   receiving control signaling indicating a service context for communicating with the core network mobility service based at least in part on the service request, wherein transmitting the second message, receiving the handover command, or both, is based at least in part on the service context.

5. The method of claim 1, further comprising:
   performing measurements on signals received from the first distributed unit and one or more candidate distributed units including the second distributed unit, wherein the measurements are performed in accordance with the measurement configuration, and wherein transmitting the second message is based at least in part on performing the measurements.

6. A method for wireless communication at a core network mobility service, comprising:
   receiving, from a first distributed unit configured to communicate with a user equipment (UE) and based at least in part on one or more application programming interfaces, a message associated with a satisfaction of a trigger condition for a handover procedure at the UE;
   selecting, based at least in part on the message, a second distributed unit from a plurality of candidate distributed units based at least in part on the second distributed unit being configured to support at least one core network service that is active at the UE of a plurality of core network services of a service-based network; and
   transmitting, to the first distributed unit for relay to the UE and based at least in part on selecting the second distributed unit, a handover command indicating the second distributed unit and an instruction to perform the handover procedure from the first distributed unit to the second distributed unit.

7. The method of claim 6, further comprising:
   transmitting a handover request to the second distributed unit based at least in part on the message; and
   receiving an acknowledgment message from the second distributed unit based at least in part on the handover request, wherein transmitting the handover command is based at least in part on the acknowledgment message.

8. The method of claim 7, further comprising:
   transmitting, via the handover request, an indication of the plurality of core network services that are active at the UE, wherein the acknowledgment message is based at least in part on the plurality of core network services that are active at the UE.

9. The method of claim 7, further comprising:
receiving, via the acknowledgment message, an indication of the at least one core network service supported by the second distributed unit, wherein transmitting the handover command is based at least in part on receiving the indication of the at least one core network service.

10. The method of claim 6, further comprising:
receiving capability information associated with the UE, wherein selecting the second distributed unit from the plurality of candidate distributed units is based at least in part on the capability information.

11. The method of claim 10, wherein the capability information is received from a core network capability service included within the plurality of core network services.

12. The method of claim 6, wherein selecting the second distributed unit from the plurality of candidate distributed units is based at least in part on a mobility history of the UE, a traffic load associated with the second distributed unit, or both.

13. The method of claim 6, further comprising:
receiving, via the message, an indication of the plurality of candidate distributed units, wherein selecting the second distributed unit is based at least in part on receiving the indication of the plurality of candidate distributed units.

14. The method of claim 6, wherein selecting the second distributed unit comprises:
selecting a serving cell supported by the second distributed unit, wherein the handover command comprises a cell identifier associated with the selected serving cell.

15. The method of claim 6, further comprising:
receiving, from the second distributed unit, a second message indicating a completion of the handover procedure; and
communicating with the UE via the second distributed unit based at least in part on the second message.

16. The method of claim 6, further comprising:
transmitting, to the first distributed unit for relay to the UE, a measurement configuration indicating one or more trigger conditions including the trigger condition, wherein receiving the message is based at least in part on the measurement configuration.

17. A method for wireless communication at a first distributed unit, comprising:
communicating, using one or more application programming interfaces, a plurality of service messages between a user equipment (UE) and a plurality of core network services of a service-based network that are active at the UE;
transmitting, to a core network mobility service of the plurality of core network services, a message associated with a satisfaction of a trigger condition for a handover procedure at the UE;
receiving, from the core network mobility service based at least in part on the message, a handover command indicating a second distributed unit that supports at least one core network service of a plurality of core network services that are active at the UE; and
transmitting the handover command to the UE, the handover command comprising an instruction for the UE to perform the handover procedure from the first distributed unit to the second distributed unit.

18. The method of claim 17, further comprising:
transmitting capability information associated with the UE to the core network mobility service, an additional core network service of the plurality of core network services, or both, wherein receiving the handover command is based at least in part on the capability information.

19. The method of claim 17, further comprising:
transmitting, to the core network mobility service, an additional core network service of the plurality of core network services, or both, an indication of the plurality of core network services that are active at the UE, wherein receiving the handover command is based at least in part on transmitting the indication of the plurality of core network services that are active at the UE.

20. The method of claim 17, further comprising:
establishing a communication tunnel with the second distributed unit based at least in part on the handover command;
receiving a second message for the UE prior to a completion of the handover procedure; and
transmitting one or more packets to the second distributed unit via the communication tunnel for relay to the UE based at least in part on receiving the second message.

21. The method of claim 17, further comprising:
transmitting, via the message, an indication of a plurality of candidate distributed units including the second distributed unit and one or more cell identifiers associated with one or more serving cells supported by the second distributed unit, wherein receiving the handover command is based at least in part on transmitting the indication of the plurality of candidate distributed units.

22. The method of claim 17, further comprising:
receiving, via the handover command, an indication of the at least one core network service supported by the second distributed unit; and
transmitting, to the UE via the handover command, the indication of the at least one core network service supported by the second distributed unit.

23. The method of claim 17, further comprising:
receiving, from the core network mobility service, a measurement configuration indicating one or more trigger conditions including the trigger condition; and
transmitting the measurement configuration to the UE, wherein transmitting the message associated with the satisfaction of the trigger condition is based at least in part on the measurement configuration.

24. The method of claim 23, further comprising:
receiving, from the UE based at least in part on the measurement configuration, a measurement report, a second message indicating the trigger condition, or both, wherein transmitting the message associated with the satisfaction of the trigger condition is based at least in part on receiving the measurement report, the second message indicating the trigger condition, or both.

25. An apparatus for wireless communication at a user equipment (UE), comprising:
one or more processors;
one or more memories coupled with the one or more processors; and
instructions stored in the one or more memories memory and executable by the one or more processors to cause the apparatus to:
communicate a plurality of service messages with a first distributed unit, the plurality of service messages associated with a plurality of core network services that are offered by a service-based network via one or more application programming interfaces and that are active at the UE;

receive, from a core network mobility service of the plurality of core network services and via the first distributed unit, a measurement configuration indicating one or more trigger conditions associated with a handover procedure at the UE;

transmit, to the first distributed unit for relay to the core network mobility service, a second message indicating a satisfaction of a trigger condition of the one or more trigger conditions;

receive a handover command from the core network mobility service via the first distributed unit based at least in part on the satisfaction of the trigger condition, the handover command indicating a second distributed unit that supports at least one core network service of the plurality of core network services that are active at the UE; and communicate with the second distributed unit based at least in part on receiving the handover command.

26. The apparatus of claim 25, wherein the instructions are further executable by the one or more processors to cause the apparatus to:

transmit capability information associated with the UE to the first distributed unit, the core network mobility service, an additional core network service of the plurality of core network services, or any combination thereof, wherein receiving the handover command is based at least in part on the capability information.

27. The apparatus of claim 25, wherein the instructions are further executable by the one or more processors to cause the apparatus to:

receive, via the handover command, a cell identifier associated with a serving cell supported by the second distributed unit and a set of communication parameters for communicating with the serving cell, wherein communicating with the second distributed unit is based at least in part on the cell identifier and the set of communication parameters.

28. The apparatus of claim 25, wherein the instructions are further executable by the one or more processors to cause the apparatus to:

transmit, to a network address associated with the core network mobility service, a service request for establishing service with the core network mobility service; and receive control signaling indicating a service context for communicating with the core network mobility service based at least in part on the service request, wherein transmitting the second message, receiving the handover command, or both, is based at least in part on the service context.

29. The apparatus of claim 25, wherein the instructions are further executable by the one or more processors to cause the apparatus to:

perform measurements on signals received from the first distributed unit and one or more candidate distributed units including the second distributed unit, wherein the measurements are performed in accordance with the measurement configuration, and wherein transmitting the second message is based at least in part on performing the measurements.

* * * * *